(12) United States Patent
Koudo et al.

(10) Patent No.: US 7,657,152 B2
(45) Date of Patent: Feb. 2, 2010

(54) BROADCAST PLAYBACK AND/OR RECORDING APPARATUS

(75) Inventors: Toshikazu Koudo, Hyogo (JP);
Kazuhiro Mihara, Osaka (JP);
Masaharu Tsujimura, Osaka (JP);
Naoya Takao, Hyogo (JP)

(73) Assignee: Panasonic Corporation, Osaka (JP)

(*) Notice: Subject to any disclaimer, the term of this patent is extended or adjusted under 35 U.S.C. 154(b) by 1205 days.

(21) Appl. No.: 10/445,317

(22) Filed: May 27, 2003

(65) Prior Publication Data

US 2005/0100321 A1   May 12, 2005

(30) Foreign Application Priority Data

May 28, 2002 (JP) ............................ P2002-153380
Jun. 13, 2002 (JP) ............................ P2002-172369
Jan. 21, 2003 (JP) ............................ P2003-012239

(51) Int. Cl.
H04N 5/76 (2006.01)
H04N 7/087 (2006.01)

(52) U.S. Cl. ......................................... 386/46; 386/84

(58) Field of Classification Search .................... 386/1, 386/46, 84, 92, 95, 125–126
See application file for complete search history.

(56) References Cited

U.S. PATENT DOCUMENTS 6,434,326 B1* 8/2002 Kondo et al. ................ 386/125
6,577,812 B1* 6/2003 Kikuchi et al. .............. 386/105
6,983,482 B2 1/2006 Morita et al.
2002/0116407 A1* 8/2002 Negishi et al. .............. 707/203
2003/0103604 A1* 6/2003 Kato et al. .................... 379/68

FOREIGN PATENT DOCUMENTS

JP   10304325   11/1998

OTHER PUBLICATIONS

English Language Abstract of JP Appln. No. 10-304325.

* cited by examiner

*Primary Examiner*—Thai Tran
*Assistant Examiner*—Nigar Chowdhury
(74) *Attorney, Agent, or Firm*—Greenblum & Bernstein, P.L.C.

(57) ABSTRACT

A fixed form data broadcast playback apparatus 5 of the present invention has fixed form data broadcast playback means 108 that inserts predetermined data to fixed form data 300 from fixed form data storing means 111 with data inserting means 110, makes the resultant data into an MPEG transport stream by MPEG-TS means 109 and playbackly transmits the resultant to a digital broadcast receiver 3 via a digital interface 320. This construction enables to operate the fixed form data broadcast playback apparatus 5 even from a digital broadcast receiver that does not have a control function to the fixed form data broadcast playback apparatus 5, and further, enables to unify the operability of the screen and remote controller between the digital broadcast receiver 3 and the fixed form data broadcast playback apparatus.

22 Claims, 64 Drawing Sheets

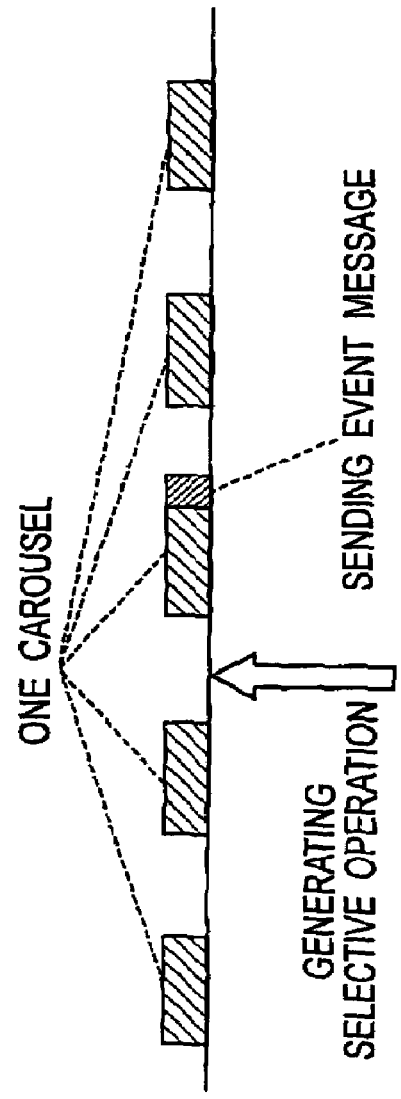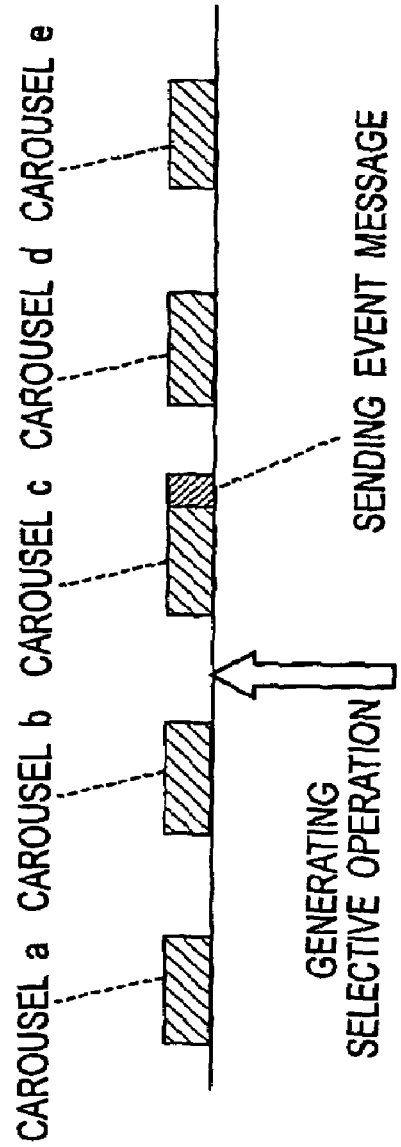
Fig. 6

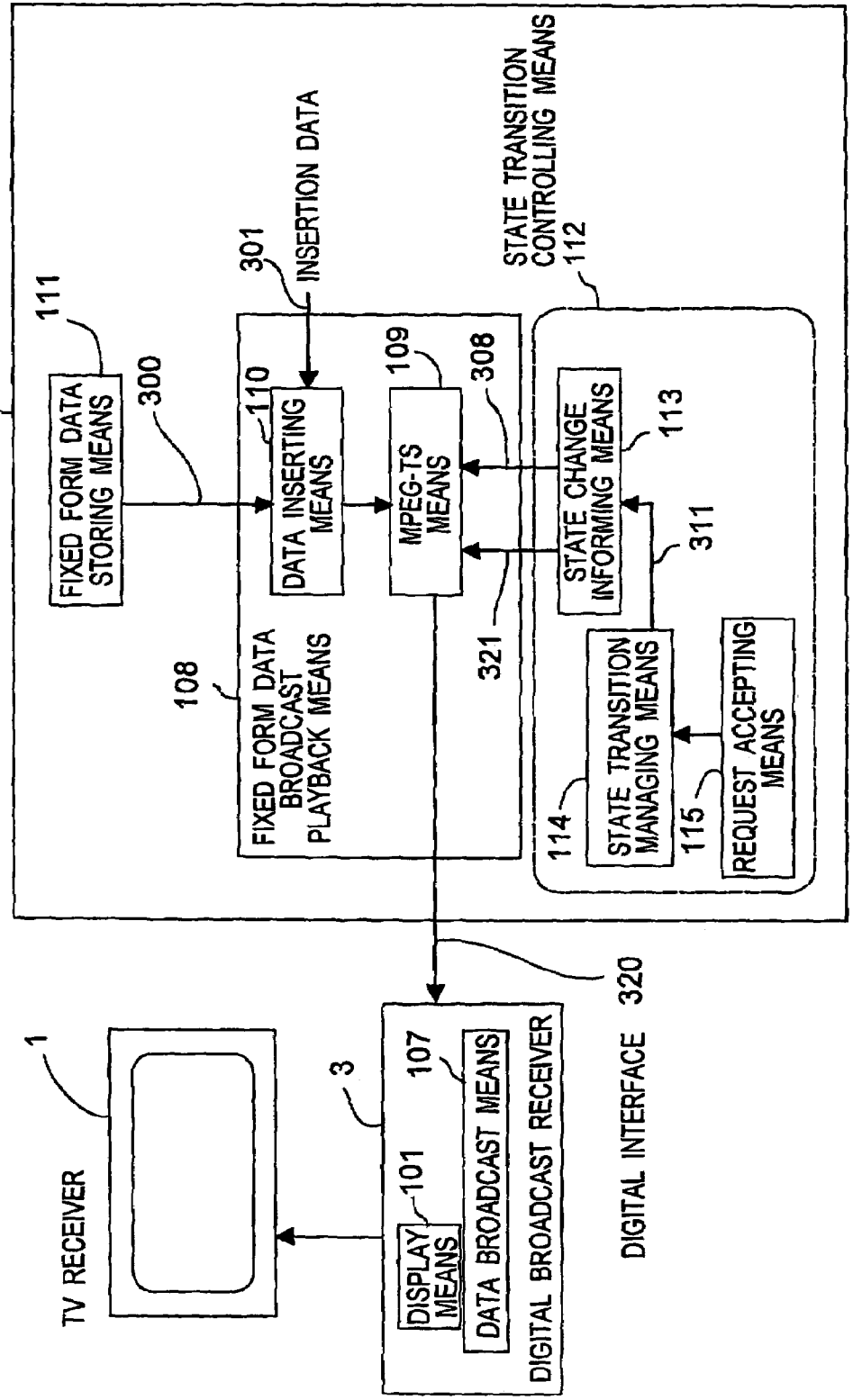

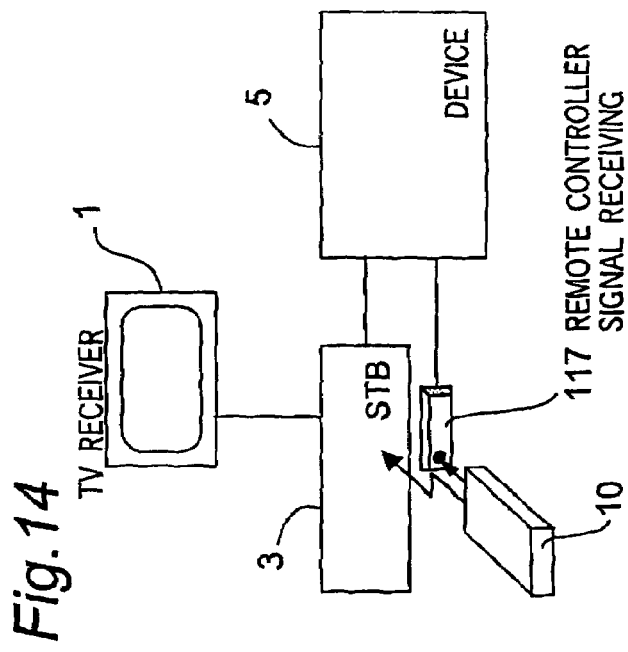
Fig. 14
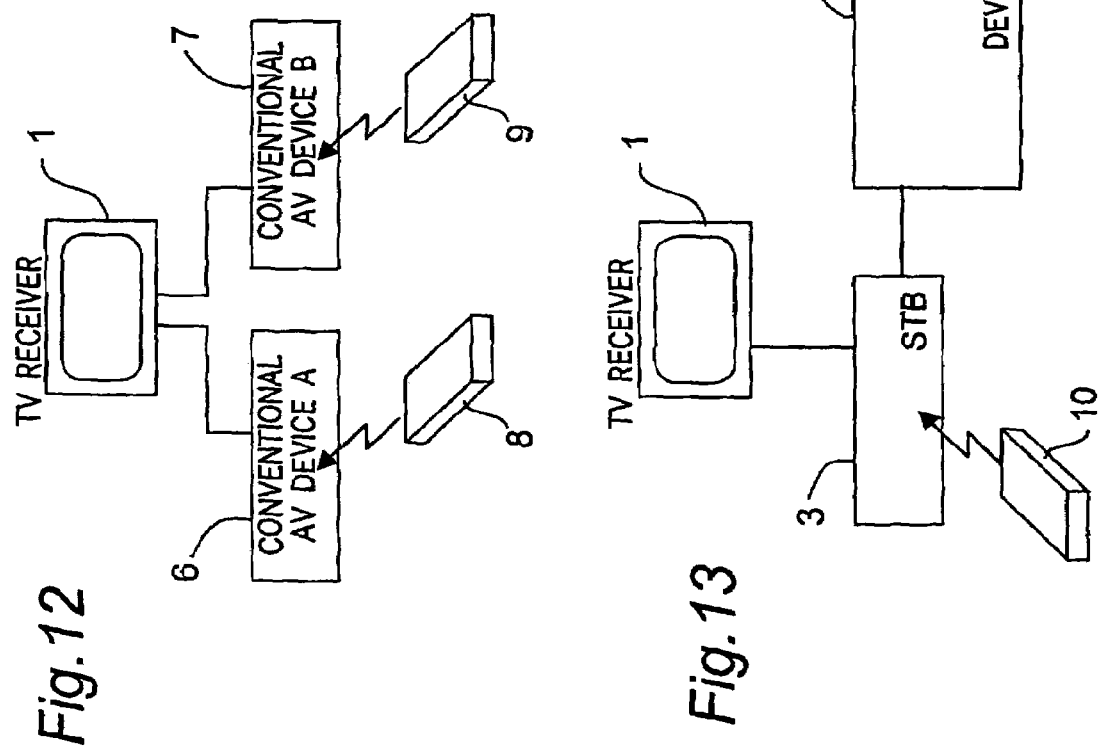
Fig. 12
Fig. 13

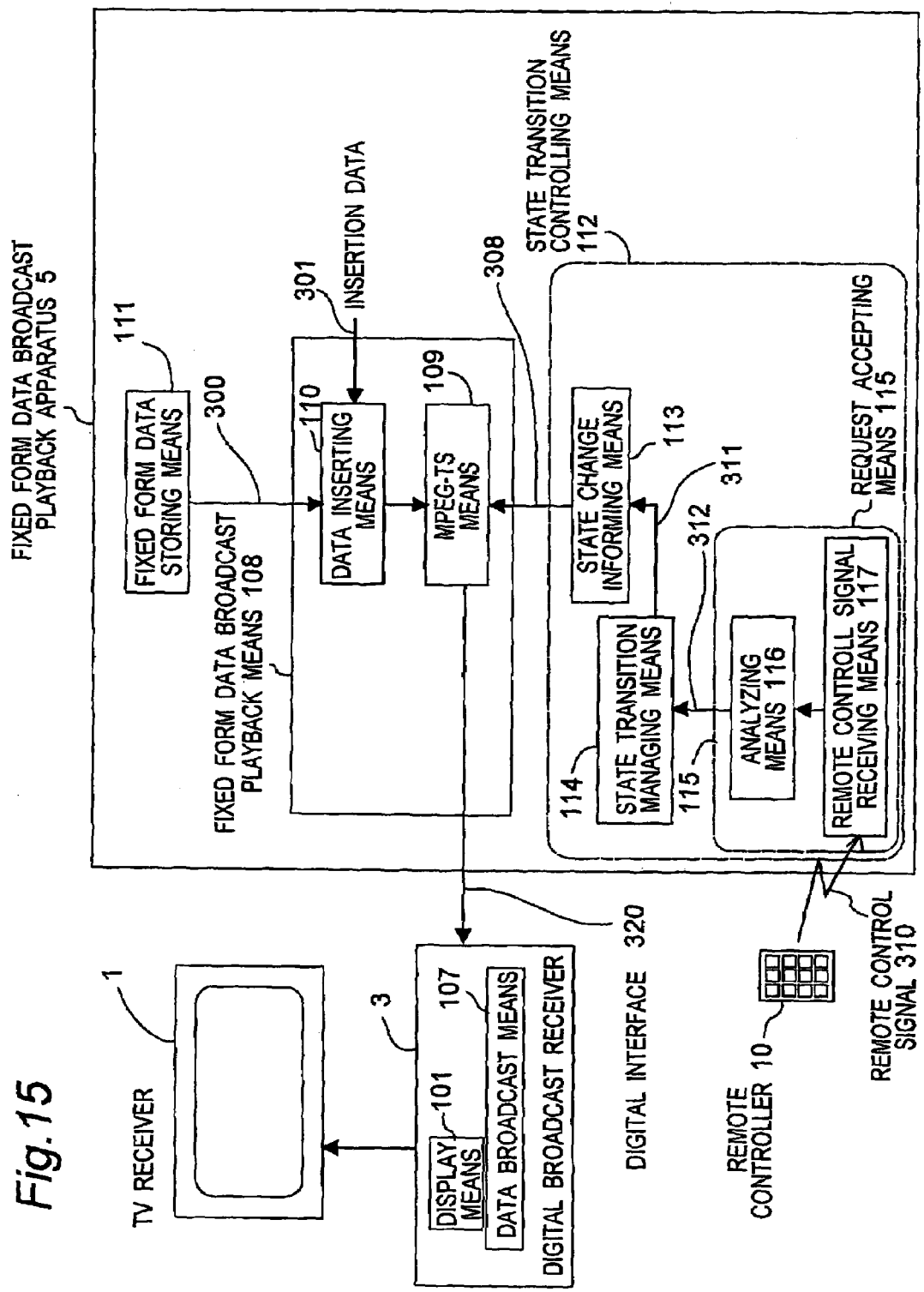

Fig.38

| DOCUMENT RESOLUTION IN PMT | <VALUE> |
|---|---|
| 960×540 (16:9) | : 0×3 |
| 720×480 (16:9) | : 0×3 |
| 720×480 (4:3) | : 0×5 |

Fig.39

| COMPONENT TYPE IN SIT | | <VALUE> |
|---|---|---|
| HIGH-ORDER 4 BITS: | AT 480i (525i) | : 0×0 |
| | AT 480p (525p) | : 0×A |
| | AT 1080i (1125i) | : 0×B |
| | AT 720p (750p) | : 0×C |
| | AT 240p | : 0×D |
| LOW-ORDER 4 BITS: | WHEN ASPECT RATIO IS 4:3 | : 0×1 |
| | WHEN ASPECT RATIO IS 16:9 WITH PAN VECTOR | : 0×2 |
| | WHEN ASPECT RATIO IS 16:9 WITHOUT PAN VECTOR | : 0×3 |
| | WHEN ASPECT RATIO > 16:9 | : 0×4 |

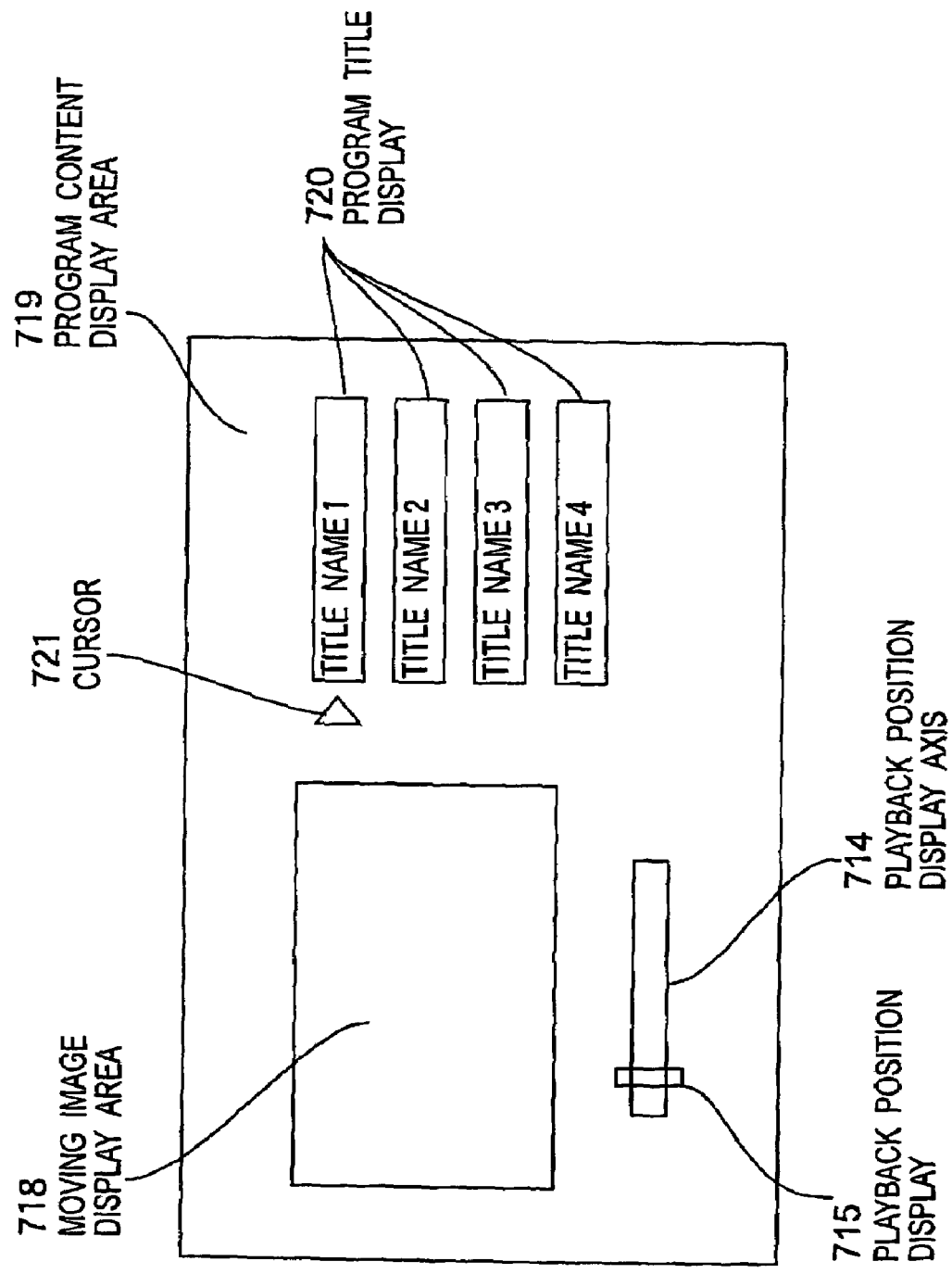

Fig.48

```
<? xml version="1.0" encoding="EUC-JP" ?>
<!DOCTYPE bml PUBLIC "+//ARIB STD-B24:1999//DTD BML Document//JA" "bml_1_0. dtd ">
<? bml bml -version="1.0" ?>
< bml >
    <head>
       <title/>
       <style>
       </style>
       <script>
                   function Get_Event_Msg (){
               v a r evt = document.getElementById ("eventmesg1");
               evt .subscribe = true;
                       }
                   event_handler () {
                   //   PROCESSING INVOLVING THE RECEIVING OF THE GENERAL-PURPOSE EVENT MESSAGE
               //  DISPLAYING THE CORRESPONDING SCREEN, WHILE NOT DISPLAYING NON-CORRESPONDING SCREEN
                   }
       </script>
       <bevent >
           <beitem  id="eventmesg1"    type=" EventMessageFired " message_id ="255 "
           message_version ="255 "  subscribe="subscribe" onoccur =" event_handler ();"/>
       </bevent >
    </head>
    <body>

<!- FIRST SCREEN ->
    <div>
    </div>

<!- SECOND SCREEN ->
    <div>
    </div>

<!- THIRD SCREEN ->
    <div>
    </div>

</body>
</bml >
```

Fig.56

| 1 CAROUSEL | D I I | VERSION NO. A |
| --- | --- | --- |
| | D D B | MODULE INCLUDING BML DOCUMENT CORRESPONDING TO START SCREEN |

| 1 CAROUSEL | D I I | VERSION NO. B |
| --- | --- | --- |
| | D D B | MODULE INCLUDING BML DOCUMENT CORRESPONDING TO SCREEN 1 |

| 1 CAROUSEL | D I I | VERSION NO. C |
| --- | --- | --- |
| | D D B | MODULE INCLUDING BML DOCUMENT CORRESPONDING TO SCREEN 2 |

| 1 CAROUSEL | D I I | VERSION NO. D |
| --- | --- | --- |
| | D D B | MODULE INCLUDING BML DOCUMENT CORRESPONDING TO SCREEN 3 |

| 1 CAROUSEL | D I I | VERSION NO. E |
| --- | --- | --- |
| | D D B | MODULE INCLUDING BML DOCUMENT CORRESPONDING TO SCREEN 4 |

| 1 CAROUSEL | D I I | VERSION NO. F |
| --- | --- | --- |
| | D D B | MODULE INCLUDING BML DOCUMENT CORRESPONDING TO SCREEN 5 |

| 1 CAROUSEL | D I I | VERSION NO. G |
| --- | --- | --- |
| | D D B | MODULE INCLUDING BML DOCUMENT CORRESPONDING TO SCREEN 6 |

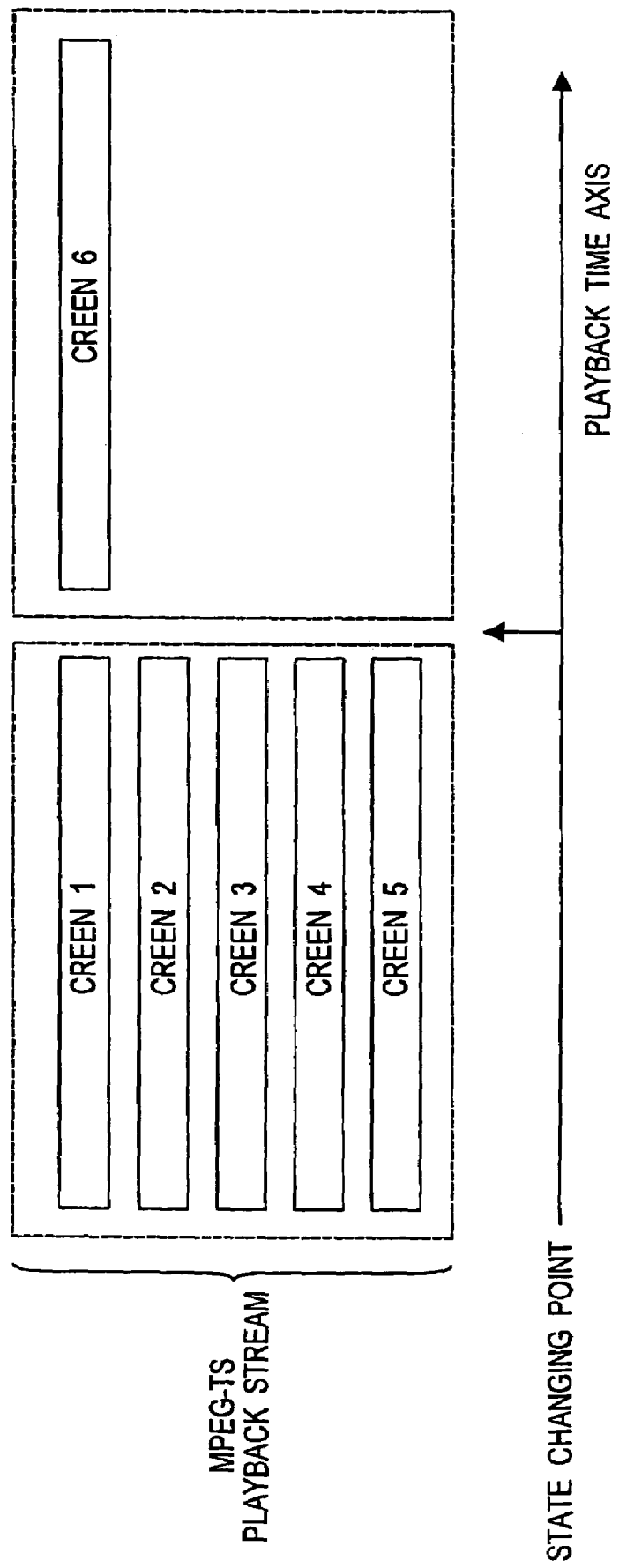

BROADCAST PLAYBACK AND/OR RECORDING APPARATUS

BACKGROUND OF THE INVENTION

1. Field of the Invention

The present invention relates to a fixed form data broadcast playback apparatus for recording and playback information received by a digital broadcast receiver.

2. Description of the Prior Arts

As digital TV broadcasting has been started and a digital broadcast receiver called set top box has spread, a recording and/or playback apparatus connectable to the digital broadcast receiver has been developed. A digital broadcast recording and/or playback apparatus disclosed in Japanese Patent Laid-open Publication No. 2002-152688 has been well-known as such a digital broadcast recording and/or playback apparatus.

A conventional technique will be explained hereinbelow by using FIGS. 23 and 24.

FIG. 23 is a block diagram showing an example 1 of a digital content playback environment that realizes a display of a program title in a conventional recording and/or playback apparatus. This figure is composed of a digital content playback device 4, a digital broadcast receiver 3 that reads the program title from the digital content playback device 4 and a TV receiver 1 that displays a program title list. The digital content playback device 4 is composed of program title information storing means 104, contents playback means 105 and contents selecting means 106, while the digital broadcast receiver 3 is provided with display means 101, program title information acquisition means 102 and program title information analyzing means 103.

The display means 101 is means for graphically displaying various information on a screen of the TV receiver 1 in order to inform a user of an operation state of the digital broadcast receiver 3, program information now receiving and information about the connected digital content playback device 4. Further, the program title information acquisition means 102 is means for transmitting a command requesting the program information to the connected digital content playback device 4 and obtaining information answered from the digital content playback device 4, that is realized, for example, by receiving and transmitting an AV/C command on IEEE 1394 interface. The program information includes a program title, recording date and time, content and genre of the program, broadcasted channel or the like. Further, the program title information analyzing means 103 is means for analyzing the program information obtained by using the program title information acquisition means 102 and taking only the information that is necessary for a user. Moreover, the program title information storing means 104 is means for storing various information about the handled program in the digital content playback device 4, and this means is realized by storing such information on a memory medium storing the program itself or on a memory device provided in the digital content playback device 4. Further, the contents playback means 105 is means for outputting the content data of the program recorded on the memory medium handled by the digital content playback device 4. It is composed of a signal reading section on a medium represented by a magnetic tape, optical disc, hard disc or the like, or signal processing circuit or the like. Moreover, the contents selecting means 106 is means for realizing the playback operation of the designated program based upon information showing where the designated program is stored on the memory medium. It is realized by a file system or the like.

Subsequently explained is a program title display in the digital content playback environment and the designation of a program playback based upon the program title display.

When receiving a request for the program information display from the user, the digital broadcast receiver 3 inquires to the digital content playback device 4 about the program title information concerning the playback content through the program title information acquisition means 102. The digital content playback device 4 takes out the program title information from the program title information storing means 104 and gives an answer to the digital broadcast receiver 3 about this information. The digital broadcast receiver 3 takes out necessary information among the program title information received via the program title information acquisition means 102 by using the program title analyzing means 103, and displays the taken-out information on the screen of the TV receiver 1 with the display means 101. Thereafter, when the user designates the program that he/she intends to reproduce, it transmits the designated program to the digital content playback device 4. The digital content playback device 4 takes out the content of the transmitted program with the contents selecting means 106 and realizes the playback of the program designated by the user by using the contents playback means 105.

FIG. 24 is a block diagram showing an example 2 of a digital content playback environment that realizes a display of an operation screen in a conventional recording and/or playback apparatus. This figure is composed of a plurality of devices 2a to 2n each having an operation screen and the TV receiver 1 displaying the operation screen. Each device is provided with display means 101 for displaying the operation screen.

The display means 101 is means for graphically displaying various information on the screen of the TV receiver 1 in order to inform a user of an operation state of the each of devices 2a to 2n and handled program information.

Each of the devices 2a to 2n has the display means 101 and displays the information that is intended to be reported to the user on the screen of the TV receiver 1 with the display means 101. Since the TV receiver 1 receives an image signal outputted from the devices 2a to 2n with a separate image input terminal, the signal input is changed over upon executing the operation of each device, and the operation is performed with the image output signal of the device to be operated displayed on the screen of the TV receiver 1.

FIG. 25 shows a method of realizing a conventional storage datacasting service. In this figure, numeral 317 denotes a satellite broadcasting signal, 318 denotes an image signal, 319 denotes a data signal, 11 denotes a communication satellite transmitting the satellite broadcasting signal 317, 12 denotes a satellite broadcasting antenna receiving the satellite broadcasting signal 317 transmitted from the communication satellite 11, 13 denotes a digital broadcast receiver exclusively used for the storage datacasting service, 1 denotes the TV receiver and 124 denotes a recording medium for recording a data signal 319.

In the storage datacasting service, the satellite broadcasting signal 317 is transmitted with the image signal 318 and data signal 319 mixed therewith, then, the image signal 318 is separated from the data signal 319 in the digital broadcast receiver 13 exclusively used for the storage datacasting service, whereupon the data signal 319 is recorded on the recording medium 124. The image signal 318 is transmitted to the TV receiver 1 to be viewed. When the user would like to utilize the data broadcast, the storage datacasting service is provided by taking out the data signal 319 from the recording medium 124.

SUMMARY OF THE INVENTION

The above-mentioned examples 1 and 2 of the digital content playback environment have the following problems.

As is apparent from the conventional example 1 of the digital content playback environment shown in FIG. 23, the digital broadcast receiver 3 cannot be provided with a control program for controlling all devices over a future.

For example, many types of a digital broadcast receiver 3 provided with a function of operating a D-VHS (registered trademark, and so forth) recording and/or playback apparatus with a VCR command for a tape medium has already been existed, but such receiver cannot control a recorder using a hard disc corresponding to a disc command that has been developed after that. Therefore, a digital broadcast receiver 3 having a new control software mounted thereto is required in order to control the device that is operated with a new command. Specifically, there has been a first subject that, in a case where the digital broadcast receiver 3 does not have a function of controlling the latest device, it can only control the old-fashioned device. Further considering fractionally the fact that it cannot control the latest device disclosed in the first subject, there are two viewpoints that a control to display the operation state of the digital content playback device 4 cannot be executed and that a control to instruct the operation of the digital content playback device 4 cannot be executed from the side of the digital broadcast receiver 3.

Further, the conventional recording and/or playback device such as a D-VHS recording and/or playback device or the like can record and reproduce the data broadcast, but has a second subject that it cannot operate the screen of the data broadcast reproduced from the recording and/or playback device.

Subsequently, as is apparent from the conventional example 2 of the digital content playback environment, each of plural devices individually has the function of displaying the operation screen, that requires means for changing over the image signal corresponding to the number of the devices 2 in the connection to the TV receiver 1. Moreover, a remote controller and operation screen are present every device, thereby entailing a third problem that the operation of a viewer becomes complicated.

Additionally, the conventional recording and/or playback device has only a method of separately obtaining the program title information from the digital broadcast receiver, thereby entailing a fourth subject that the title of the program recorded from the digital broadcast receiver 3 having no means for informing the program title of the recording and/or playback device cannot be displayed.

Further, there is a fifth subject that the storage datacasting service cannot be viewed by the receiver other than the receiver exclusively used for the storage datacasting service.

Moreover, as is apparent from the conventional example 1 of the digital content playback environment shown in FIG. 23 and the conventional Example 2 of the digital content playback environment shown in FIG. 24, the program title information and moving image individually obtained at the side of the digital broadcast receiver has to be mutiplexingly displayed by the display means 101 in order to simultaneously display the moving image reproduced from the contents playback means 105 and the program title information from the program title information storing means 104 on the same screen.

Further, in a case where the operation state of the digital content playback device is likewise multiplexed with the reproduced moving image to be displayed, it can also be multiplexingly displayed at the side of the digital broadcast receiver with the display means 101. Specifically, there has been a subject that, if the digital broadcast receiver now put on the market does not have the aforesaid multiplex function, the program title and operation state cannot multiplexingly displayed with the recorded moving image on a single screen in such digital broadcast receiver.

As is well-known, there is a digital broadcast receiver for BS digital broadcasting having a function of playback a moving image from an external device via an IEEE 1394 interface as generally, while simultaneously displaying in a multiplex manner a screen showing a time counter of its playback.

However, such digital broadcast receiver cannot newly display the state other than the functions mounted thereto as a product specification. Specifically, the existing digital broadcast receiver has a sixth subject that it cannot multiplexingly display an image recorded on the external device and its operation state with a new representation.

Further, a system for inserting a general-purpose event message into a broadcast wave is standardized by ARIB standard (ARIB is an abbreviation of Association of Radio Industries and Business) as means for informing the data broadcast operating in the digital broadcast receiver of the change of the operation state. However, there may be the case where the digital broadcast receiver fails to receive the general-purpose event message depending upon a timing for transmitting the general-purpose event message. This problem of failing to receive the general-purpose event message occurs likewise in the case where the data broadcast is received via IEEE 1394 interface or the like. Specifically, there is a seventh subject that, unless the general-purpose event message is transmitted at a suitable timing, the digital broadcast receiver fails to receive the general-purpose event message.

Moreover, limitation is made on a transmission band area since the conventional data broadcast utilizes a broadcast wave, and further, the broadcast station cannot learn about the operation state at the side of the receiver, so that a BML (Broadcast Markup Language) document that is caused to be operated is required to be arranged in one stream with a carousel form. This means that, the more the number of the BML document increases, the smaller the transmission band area becomes that can be allocated to one BML document. Specifically, as the screen construction increases by describing plural BMLs in the conventional data broadcast, it takes time to obtain BML of the digital broadcast receiver, resulting in entailing an eighth subject that it takes time to start the individual BML.

Further, there is a ninth subject that it takes time to start the data broadcast and display the same. This can bodily be experienced by performing the start-up of the data broadcast in a general broadcasting satellite (BS) digital broadcast receiver.

Moreover, there is a tenth subject that an external program other than the one described in the data broadcast cannot be started with an optional combination in the conventional data broadcast.

The above-mentioned subjects can be solved by the following present invention. Specifically, the first invention is a fixed form data broadcast playback apparatus comprising fixed form data storing means for storing fixed form data, data inserting means for inserting predetermined data to the fixed form data and fixed form data broadcast playback means that makes the fixed form data having the predetermined data inserted thereto into an MPEG transport stream and transmits the resultant to a digital broadcast receiver as playback data.

Further, the second invention is a fixed form data broadcast playback apparatus comprising fixed form data storing means for storing fixed form data, data inserting means for inserting predetermined data to the fixed form data, fixed form data broadcast playback means that makes the fixed form data having the predetermined data inserted thereto into an MPEG transport stream and transmits the resultant to a digital broadcast receiver as playback data and state transition controlling means for controlling an operation state of the transmitted fixed form data broadcast.

Moreover, the third invention is a fixed form data broadcast recording and/or playback apparatus comprising fixed form data storing means for storing fixed form data, data inserting means for inserting predetermined data to the fixed form data, fixed form data broadcast playback means that makes the fixed form data having the predetermined data inserted thereto into an MPEG transport stream and transmits the resultant to a digital broadcast receiver as playback data, a recording medium for recording a program transmitted in the form of the MPEG transport stream, program information obtaining means for extracting program information from an MPEG-TS signal during the recording or after the recording and recording medium controlling means for managing the recording and playback of the MPEG transport stream to the recording medium and the program information.

Additionally, the fourth invention is a fixed form data broadcast recording and/or playback apparatus comprising fixed form data storing means for storing fixed form data, data inserting means for inserting predetermined data to the fixed form data, fixed form data broadcast playback means that makes the fixed form data having the predetermined data inserted thereto into an MPEG transport stream and transmits the resultant to a digital broadcast receiver as playback data, state transition controlling means for controlling an operation state of the transmitted fixed form data broadcast, a recording medium for recording a program transmitted in the form of the MPEG transport stream, program information obtaining means for extracting program information from an MPEG transport stream signal during the recording or after the recording and recording medium controlling means for managing the recording and playback of the MPEG transport stream to the recording medium and the program information.

Further, the fifth invention is a fixed form data broadcast playback apparatus a fixed form data broadcast recording and/or playback apparatus wherein the fixed form data storing means is a rewritable medium.

Moreover, the sixth invention is a fixed form data broadcast playback apparatus a fixed form data broadcast recording and/or playback apparatus wherein the insertion data is character data, image data or music data.

Further, the seventh invention is a fixed form data broadcast playback apparatus a fixed form data broadcast recording and/or playback wherein the insertion data is information obtained in a system.

Additionally, the eighth invention is a fixed form data broadcast playback apparatus a fixed form data broadcast recording and/or playback apparatus wherein the state transition controlling means includes request accepting means for accepting a request for a transition, state control managing means for managing the operation state of the fixed form data broadcast and state change informing means for informing a change in a state.

Moreover, the ninth invention is a fixed form data broadcast playback apparatus a fixed form data broadcast recording and/or playback apparatus wherein the request accepting means includes remote control signal receiving means for receiving a remote control signal for the digital broadcast receiver and analyzing means for analyzing the remote control signal.

Further, the tenth invention is a fixed form data broadcast playback apparatus a fixed form data broadcast recording and/or playback apparatus wherein the state change informing means utilizes an event message transmission system of the data broadcast.

Further, the eleventh invention is a fixed form data broadcast playback apparatus a fixed form data broadcast recording and/or playback apparatus wherein the fixed form data broadcast playback means selectively makes the predetermined data among the fixed form data into the MPEG transport stream based upon the instruction from the state transition controlling means.

Additionally, the twelfth invention is a fixed form data broadcast recording and/or playback apparatus wherein download data is extracted from the received MPEG transport stream, and the fixed form data or the predetermined data inserted to the fixed form data, state control managing means and state change informing means can be changed.

Moreover, the thirteenth invention is a fixed form data broadcast playback apparatus comprising fixed form data storing means for storing fixed form data, data inserting means for inserting predetermined data to the fixed form data, a recording medium on which an image is recorded, MPEG playback means that takes out the image from the recording medium and reproduces the taken-out image and fixed form data broadcast playback means that multiplexes the fixed form data having the predetermined data inserted thereto and the reproduced MPEG image, makes the resultant into an MPEG transport stream and transmits the resultant to the digital broadcast receiver as playback data.

Further, the fourteenth invention is a fixed form data broadcast playback apparatus comprising fixed form data storing means for storing fixed form data, data inserting means for inserting predetermined data to the fixed form data, a recording medium on which an image is recorded, MPEG playback means that takes out the image from the recording medium and reproduces the taken-out image and fixed form data broadcast playback means that multiplexes the fixed form data having the predetermined data inserted thereto and the reproduced MPEG image, makes the resultant into an MPEG transport stream and transmits the resultant to the digital broadcast receiver as playback data and state transition controlling means for controlling the operation state of the transmitted fixed form data broadcast.

Moreover, the fifteenth invention is a fixed form data broadcast playback apparatus wherein the MPEG playback means has a function of extracting an I-picture from the MPEG image reproduced from the recording medium and executing a fast-forward playback and rewinding playback with this.

Additionally, the sixteenth invention is a fixed form data broadcast playback apparatus wherein the MPEG playback means extracts, among the MPEG transport streams reproduced from the recording medium, only a transport stream packet having a program ID corresponding to the image and rewrites this program ID to a specified value.

Further, the seventeenth invention is a fixed form data broadcast playback apparatus wherein the fixed form data broadcast playback means has stream information extracting means for extracting information about an aspect ratio and pixel number of the MPEG image stored in the recording medium and fixed form selecting means for selecting the fixed form data corresponding to this.

Moreover, the eighteenth invention is a fixed form data broadcast playback apparatus wherein the fixed form data broadcast playback means has fixed form information extracting means for extracting information about an aspect ratio and pixel number of the fixed form data stored in the fixed form data storing means and image selecting means for selecting the image corresponding to this.

Additionally, the nineteenth invention is a fixed form data broadcast playback apparatus further comprising a function of specifying a minimum interval of a transmission of a general-purpose event message corresponding to the receiving capability of the digital broadcast receiver.

Moreover, the twentieth invention is a fixed form data description method wherein all screen constructions are described in one BML document.

Further, the twenty-first invention is a fixed form data broadcast playback apparatus wherein the fixed form data storing means stores fixed form data composed of a plurality of BML documents, and the state transition controlling means includes a period for moving among the BML documents and has a function of inhibiting the transmission of the general-purpose event message.

Moreover, the twenty-second invention is a fixed form data broadcast playback apparatus wherein the fixed form data broadcast playback means has a function of selecting the fixed form data to be reproduced according to the instruction from the state transition controlling means.

Additionally, the twenty-third invention is a fixed form data broadcast playback apparatus further having a function of storing a background image prepared as the MPEG transport stream on the recording medium, repeatedly playback the MPEG transport stream reproduced from the recording medium and displaying as the background image by combining the reproduced MPEG transport stream with the predetermined fixed form data forming the data broadcast.

Further, the twenty-fourth invention is a fixed form data broadcast playback apparatus wherein the state controlling means has a function of controlling the other application means.

BRIEF DESCRIPTION OF THE DRAWINGS

These and other objects, advantages and features of the invention will become apparent from the following description thereof taken in conjunction with the accompanying drawings which illustrate a specific embodiment of the invention.

FIG. 6 is a view showing a construction of a carousel and a method of informing a state by state change informing means in the fixed form data broadcast playback apparatus;

FIG. 11 is a block diagram showing a construction of the fixed form data broadcast playback apparatus;

FIG. 12 is a conceptional view showing a conventional operation on a remote controller;

FIG. 13 is a conceptional view showing an example of an operation of a device via the conventional digital broadcast receiver;

FIG. 14 is a conceptional view showing a system of receiving a signal from the remote controller in the fixed form data broadcast playback apparatus according to an embodiment 5 of the invention;

FIG. 15 is a block diagram showing the construction of the fixed form data broadcast playback apparatus;

FIG. 38 is a view showing a resolution described in PMT;

FIG. 39 is a view showing a component type described in SIT;

FIG. 47 is a view showing a display example by the fixed form data broadcast playback apparatus;

FIG. 48 is a view showing an example of composing plural screens by a single BML document according to an embodiment 16 of the present invention;

FIG. 56 is a view showing an example 2 of carousel structure;

FIG. 57 is a timing chart showing a timing when the embodiments 16 and 18 of the present invention are utilized;

DESCRIPTION OF THE PREFERRED EMBODIMENT

A preferred embodiment of the present invention will be explained hereinbelow with reference to drawings. It is to be noted that the same numerals represent the same components in the figure.

Embodiment 1

Explained in the embodiment 1 is a method for playback an internal state of a fixed form data broadcast playback apparatus as fixed form data broadcast.

Figure 1:
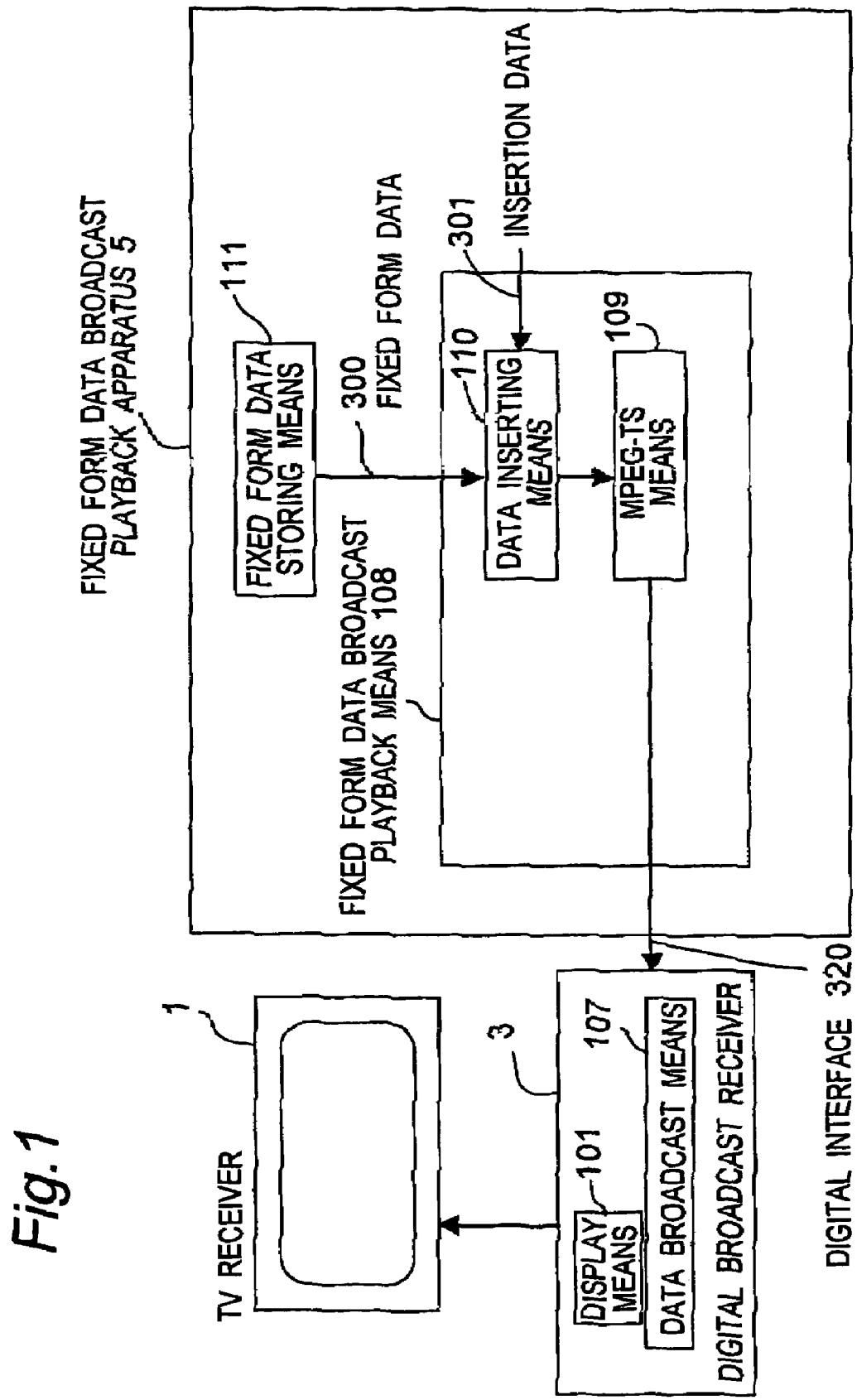
FIG. 1 is a block diagram showing a construction of a fixed form data broadcast playback apparatus according to an embodiment 1 of the invention.

FIG. 1 is a block diagram showing a construction of the fixed form data broadcast playback apparatus that reproduces fixed form data broadcast for displaying the internal state of the fixed form data broadcast playback apparatus via a digital broadcast receiver 3 and a connection environment to the receiver. The fixed form data broadcast playback apparatus 5 comprises fixed form data storing means 111, data inserting means 110 and MPEG-TS means 109. Further, the digital broadcast receiver 3 has display means 101 and data broadcast means 107.

The data broadcast means 107 provided at the digital broadcast receiver 3 is a function generally incorporated to the digital broadcast receiver of BS (Broadcasting Satellite) digital broadcast, the detail of which is disclosed in, for example, Japanese Unexamined Patent Application No. HE110-304325 titled as "digital broadcast system, digital broadcast apparatus and receiver in digital broadcast". In this data broadcast, a program written by a language of so-called BML (Broadcast Markup Language) or image data for displaying or the like is sent to the digital broadcast receiver 3 via a broadcast wave. A user can enjoy various services realized by the data broadcast by operating the digital broadcast receiver 3.

The data broadcast means 107 operates not only when the digital broadcast receiver 3 receives data broadcast from the broadcast wave but also when it receives the same via a digital connection called IEEE 1394 interface. Specifically, the data broadcast means 107 also operates by the playback operation of the playback apparatus connected to the digital broadcast receiver 3.

Each component in the embodiment shown in FIG. 1 will be explained hereinbelow.

FIG. 1 shows the fixed form data broadcast playback apparatus 5 according to the first invention of the present invention. Numeral 300 denotes fixed form data that is a prescribed form of the data broadcast transmitted from the fixed form data broadcast playback apparatus 5. Numeral 301 denotes insertion data representing a state of the fixed form data broadcast playback apparatus 5 or the like. Numeral 111 denotes means for storing the fixed form data 300 into storing means (not shown) in the apparatus. Numeral 110 denotes data inserting means for inserting the insertion data 301 into the fixed form data 300. Numeral 109 denotes means for transmitting the data obtained by the data inserting means 110 as an MPEG transport stream (hereinafter abbreviated as MPEG-TS). Numeral 320 denotes a digital interface for sending and receiving a digital signal between the fixed form data broadcast playback apparatus 5 and the digital broadcast receiver 3.

The operation of the fixed form data broadcast playback apparatus 5 having the above-mentioned construction will be explained hereinbelow in accordance with the drawings.

When receiving a request for starting the playback operation, the fixed form data broadcast playback apparatus 5 transmits the fixed form data 300 that is prescribed form data of the data broadcast to the fixed form data broadcast playback means 108 from the fixed form data storing means 111. The data inserting means 110 possessed by the fixed form data broadcast playback means 108 obtains the insertion data 301 showing the internal state of the fixed form data broadcast playback apparatus 5, and writes the data to the fixed form data 300. The MPEG-TS means 109 makes the fixed form data into a packet of data in a small unit that is a form of a transport stream of the MPEG-TS and transmits the resultant to the digital broadcast receiver 3. The fixed form data transmitted from the fixed form data broadcast playback apparatus 5 is transmitted to the digital broadcast receiver 3 via the digital interface 320, interpreted by the data broadcast means 107 and executed. The data broadcast means 107 displays the internal state of the fixed form data broadcast playback apparatus 5 by the display means 101 and a TV receiver 1. As a result, the user can be informed of the internal state of the fixed form data broadcast playback apparatus 5 via the display screen of the digital broadcast receiver 3 even if the digital broadcast receiver 3 does not have control means for controlling the fixed form data broadcast playback apparatus 5.

The method for urging the fixed form data broadcast playback apparatus 5 to perform the playback operation in the above-mentioned explanation can also be performed by a command for a device that does not have a function for displaying the internal state of the fixed form data broadcast playback apparatus, the examples of which include a VCR command for a tape that is sent and received on the IEEE 1394 interface. The same effect can be provided to the user by utilizing a button on the main body of the fixed form data broadcast playback apparatus 5, an exclusive remote controller for the fixed form data broadcast playback apparatus 5 or the like.

The use of the construction of the embodiment 1 can solve the subject from the viewpoint that the control for displaying the operation state of a digital content playback device 4 cannot be executed among the first subjects disclosed in the "subjects that the invention is to solve" of "the digital broadcast receiver 3 can only control old-fashioned device in a case where it does not have a function for controlling the latest device".

Subsequently explained in detail is the function of the fixed form data broadcast playback means 108 in the embodiment 1.

Figure 2:
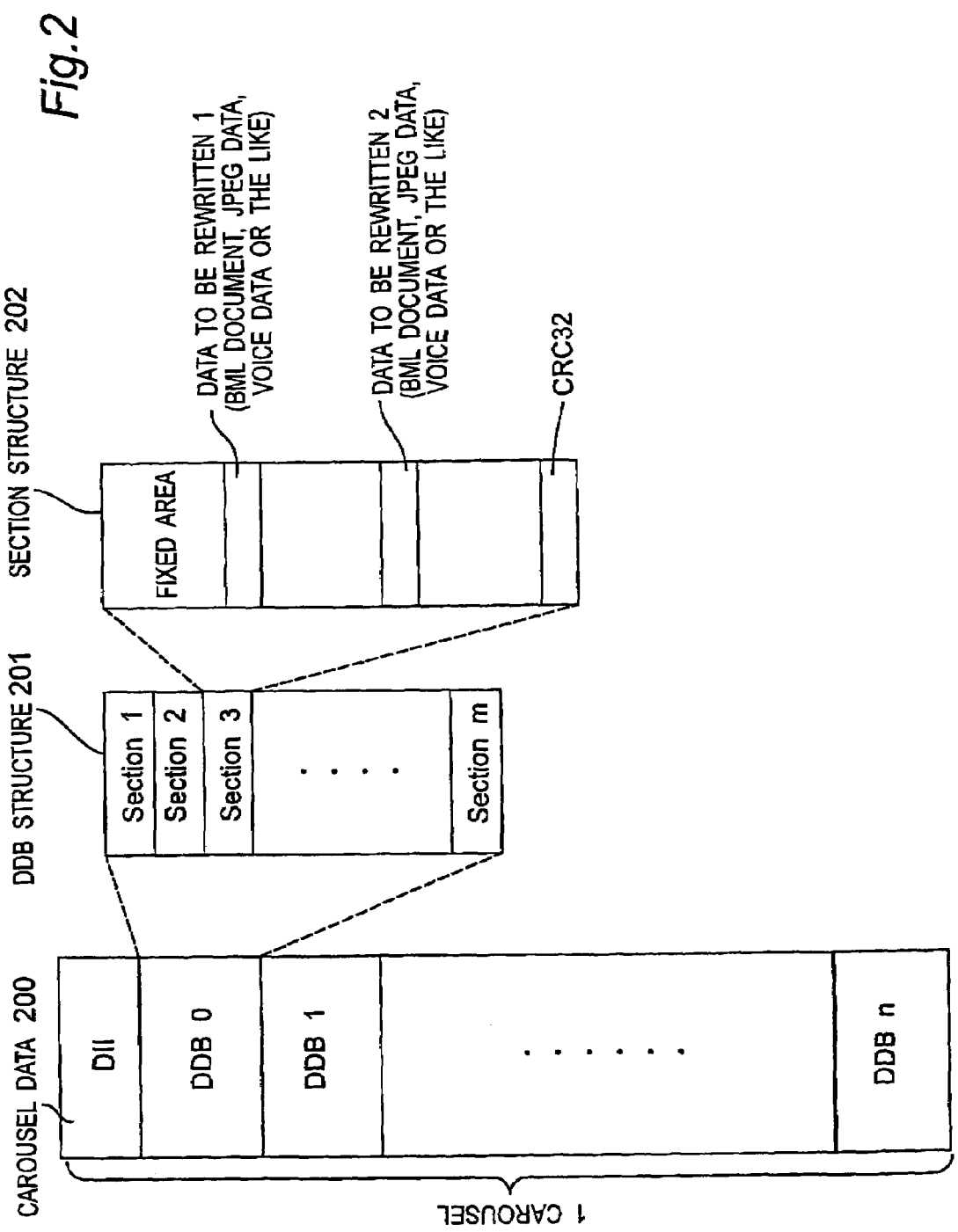
FIG. 2 is a conceptional view showing an embodiment of data inserting means in the fixed form data broadcast playback apparatus.

FIG. 2 shows one example of a processing performed by the data inserting means 110, and in particular, the operation content thereof is explained taking as one example the data structure of the data broadcast used in the BS digital broadcast.

In FIG. 2, numeral 200 denotes a state where a packet of data to be transmitted is arranged on a memory in the apparatus. This data is repeatedly transmitted to the digital broadcast receiver 3 by a system called data carousel. This data carousel system is defined by ISO/IEC 13818-6 standard. The data carousel system is the name of a system, so that the substance of data is referred to as carousel data for discrimination. The carousel data 200 is mainly classified into a section called DII where the arrangement information of data is described and a section called DDB where the actual data body is written. The DII and DDB mean Download Info Indication message and Download Data Block message in a User-to-Network download protocol prescribed by ISO/IEC 13818-6 standard. Numeral 201 denotes a structure of the DDB corresponding to a payload section of the data carousel. The DDB is divided into a plurality of sections (Sections), each section structure 202 has a plurality of data sections that are to be rewritten after a first fixed area, and a section of CRC (Cyclic Redundancy Check) 32 for ensuring reliability of data is arranged at the end of the data. The fixed form data 300 has a structure of the data carousel shown in FIG. 2 in which the data sections to be rewritten in the section structure 202 are undefined. The data inserting means 110 searches the data sections to be rewritten in the section structure 202 and renews the data sections to be rewritten with the insertion data 301 obtained in the apparatus.

The positional information of the data sections to be rewritten that are renewed on the memory may be stored in advance on a table or can be found by searching. Further, if the insertion data 301 written to each data section to be rewritten has a fixed length, the processing becomes simple, but data of various size can be inserted by devising the way of possession of the data. In either case, the CRC 32 is recalculated for attaining security in compatibility as the data upon transmitting after renewing each data section to be rewritten.

The data broadcast is executed in a digital broadcast, and the construction of the carousel structure forming the above-mentioned data broadcast and making into MPEG transport are also executed in a facility of a broadcasting station in accordance with the same standard. The points that the present invention is different from the facility of the broadcasting station are that a general user uses this apparatus and that the digital broadcast receiver 3 obtains the data broadcast as playback data from external device, not as a broadcast wave. Such environment of use requires an apparatus having a structure different from the conventional facility in the broadcasting station from the viewpoint of cost and processing speed. The embodiment 1 explained above has a characteristic that the necessary processing is minimized by formatting the reproduced data broadcast and processing the same, thereby being capable of realizing a fixed form data broadcast playback having practical use from the viewpoint of cost and processing speed.

Moreover, the insertion data 301 representing the internal state of the fixed form data broadcast playback apparatus 5 in the embodiment is not necessarily limited to character data, but may be music data or image data such as JPEG (Joint Photographic Experts Group) data or the like. Further, it may not be a value in the apparatus, but may be data of a memory card connected to the fixed form data broadcast playback apparatus 5, music data recorded on an optical disc inserted into an optical disc drive connected to the fixed form data broadcast playback apparatus 5 or title information of this music data.

Subsequently explained is the operation of the MPEG-TS means 109 that transmits the carousel data 200 formed by the data inserting means 110 as the MPEG-TS.

Figure 3:
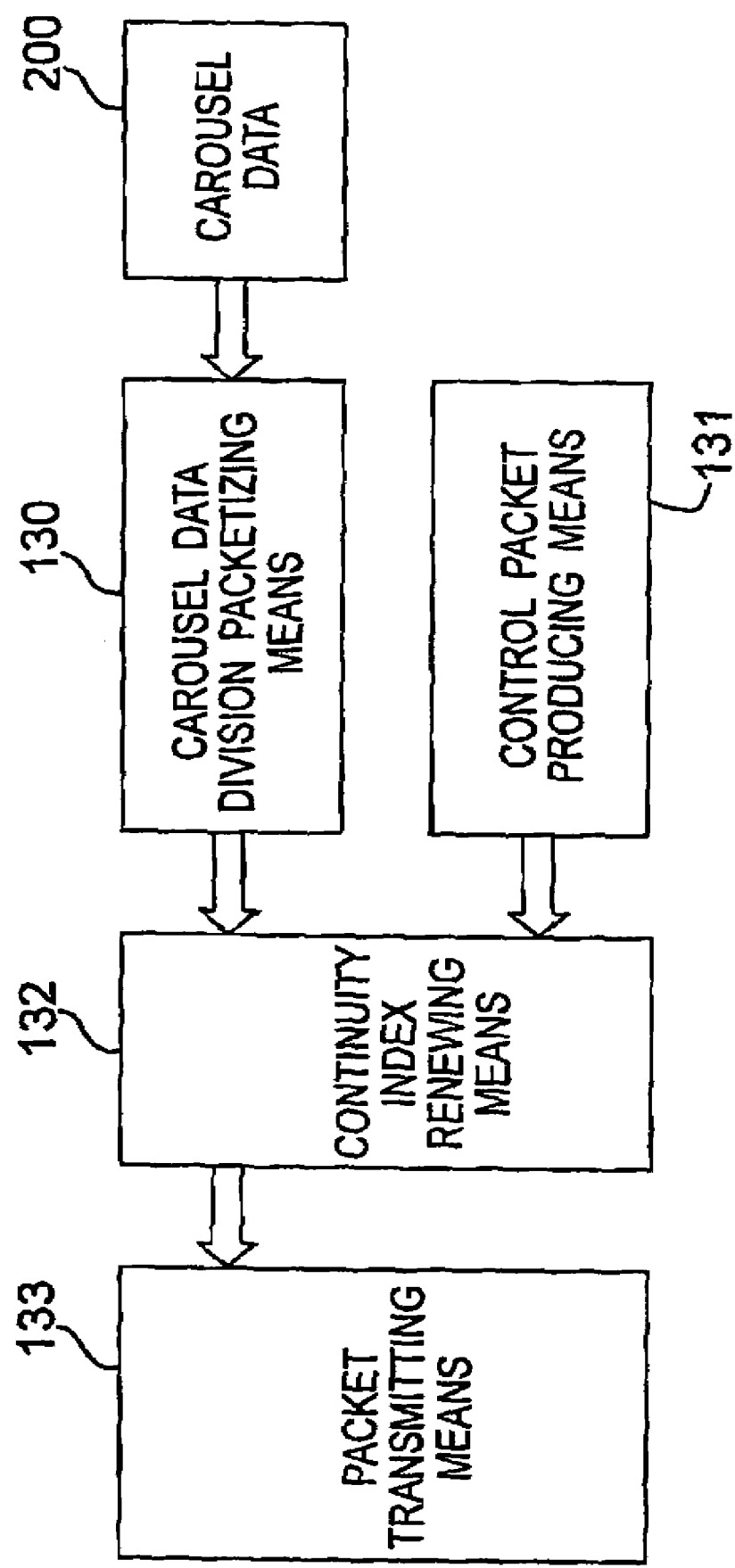
FIG. 3 is a flowchart showing an operation of MPEG-TS means in the fixed form data broadcast playback apparatus.

FIG. 3 shows one example of a processing method for transmitting the formed carousel data as the MPEG-TS data.

Numeral 130 is carousel data division packetizing means that divides the carousel data 200 for producing a packet prescribed by the MPEG-TS standard. Numeral 131 denotes control packet producing means for producing a packet such as PAT (Program Association Table) or PMT (Program Map Table) prescribed by the MPEG-TS standard. Numeral 132 denotes continuity index renewing means for renewing the packet data produced by these means. Numeral 133 denotes "packet sending means" for sending the packet data on a bus. These constructions enable to send the data of the data carousel produced by the data inserting means 110.

Further, a value for changing the shape on the display screen can be inserted as the insertion data 301 in FIG. 1.

Embodiment 2

Explained in the embodiment 2 of the invention is an example having a rewriting function of the fixed form data 300 in addition to the construction explained in the embodiment 1.

Figure 4:
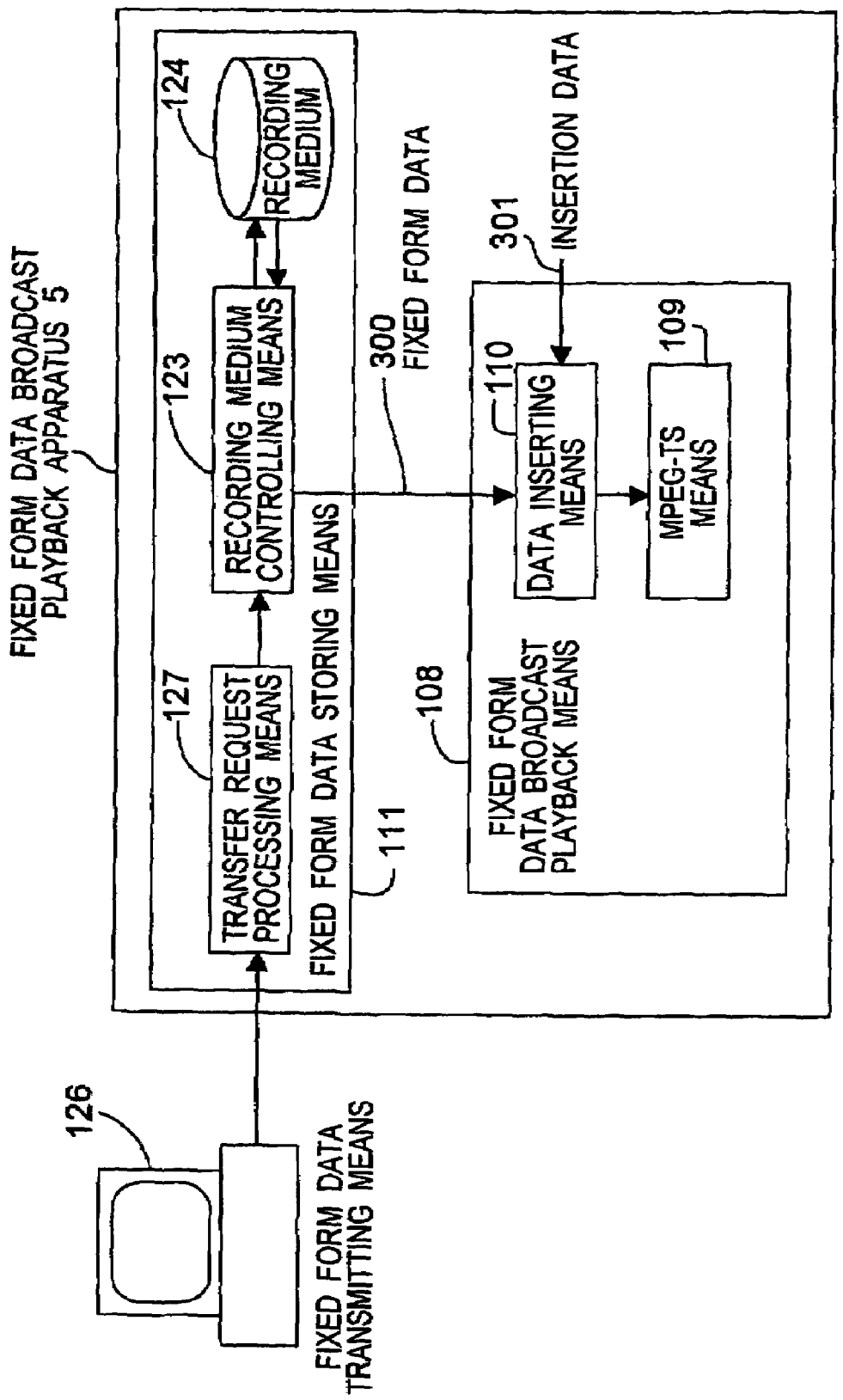
FIG. 4 is a block diagram showing a construction of a fixed form data broadcast playback apparatus according to an embodiment 2 of the invention.

FIG. 4 is a block diagram showing a construction of a fixed form data playback apparatus according to the embodiment 2 of the invention, which shows an apparatus construction in the fifth invention of the present invention. The components in FIG. 4 same as those in FIG. 1 are given by like numerals for omitting their explanations.

The fixed form data storing means 111 in FIG. 4 includes transfer request processing means 127, recording medium controlling means 123 and a recording medium 124. A personal computer (hereinafter abbreviated to PC), for example, is used for the fixed form data transferring means 126. The PC and the fixed form data broadcast playback apparatus 5 are connected via a cable for sending a fixed form data writing request and writing data to the fixed form data playback apparatus 5 from the PC.

The transfer request processing means 127 is means that interprets the fixed form data writing request issued from the fixed form data transferring means 126 and performs processing. Numeral 124 denotes a rewritable recording medium that is a place to which the data transferred from the fixed form data transferring means 126 is written and which stores the written data. Numeral 123 denotes recording medium controlling means that controls the recording medium 124 and performs a read processing and write processing to the recording medium 124.

Subsequently explained is the operation of the fixed form data broadcast playback apparatus 5 in the embodiment 2.

The fixed form data transferring means 126 issues a request of transferring the fixed form data to the fixed form data broadcast playback apparatus 5, thereby starting the transfer of the fixed form data. The transfer request processing means 127 receiving the request understands the meaning of the request and starts to receive the fixed form data. After the reception, the transfer request processing means 127 makes a request of storing the received fixed form data to the recording medium controlling means 123. The recording medium controlling means 123 controls the rewritable recording medium 124 for storing the received fixed form data.

Further, the fixed form data broadcast playback apparatus 5 having the construction shown in this embodiment operates as follows in the case of performing the playback of the fixed form data broadcast.

Specifically, in the case of performing the playback of the fixed form data, the recording medium controlling means 123 reads the fixed form data 300 from the recording medium 124, and then, transfers the fixed form data 300 to the fixed form data broadcast playback means 108. The fixed form data broadcast playback means 108 inserts the insertion data 301 to this fixed form data for performing the playback operation of the fixed form data broadcast.

The above-mentioned construction enables the fixed form data broadcast playback apparatus 5 to rewrite its fixed form data from the outside of the apparatus.

Although FIG. 4 shows a hard disc that is a magnetic recording medium as one example, a construction of optical recording medium or memory with data storing function (flash memory) may be adopted.

Consequently, there is, for example, an advantage that, during a manufacturing process of the fixed form data broadcast playback apparatus, the display content of the fixed form data can easily be changed every customer. Further, a general user who is the last user of the fixed form data broadcast playback apparatus 5 can also change the fixed form data to the one having his/her favorite color arrangement or design.

Although the embodiment 2 utilizes a PC as the fixed form data transferring means 126, the digital broadcast receiver 3 may be used instead of the PC for writing. Additionally, an exchangeable medium such as an optical disc or memory card may be used for writing.

Embodiment 3

The embodiment 3 will subsequently be explained. Explained in the embodiment 3 is a construction for instructing the change in an operation state to a data broadcast application that is now operating in the digital broadcast receiver 3.

Figure 5:
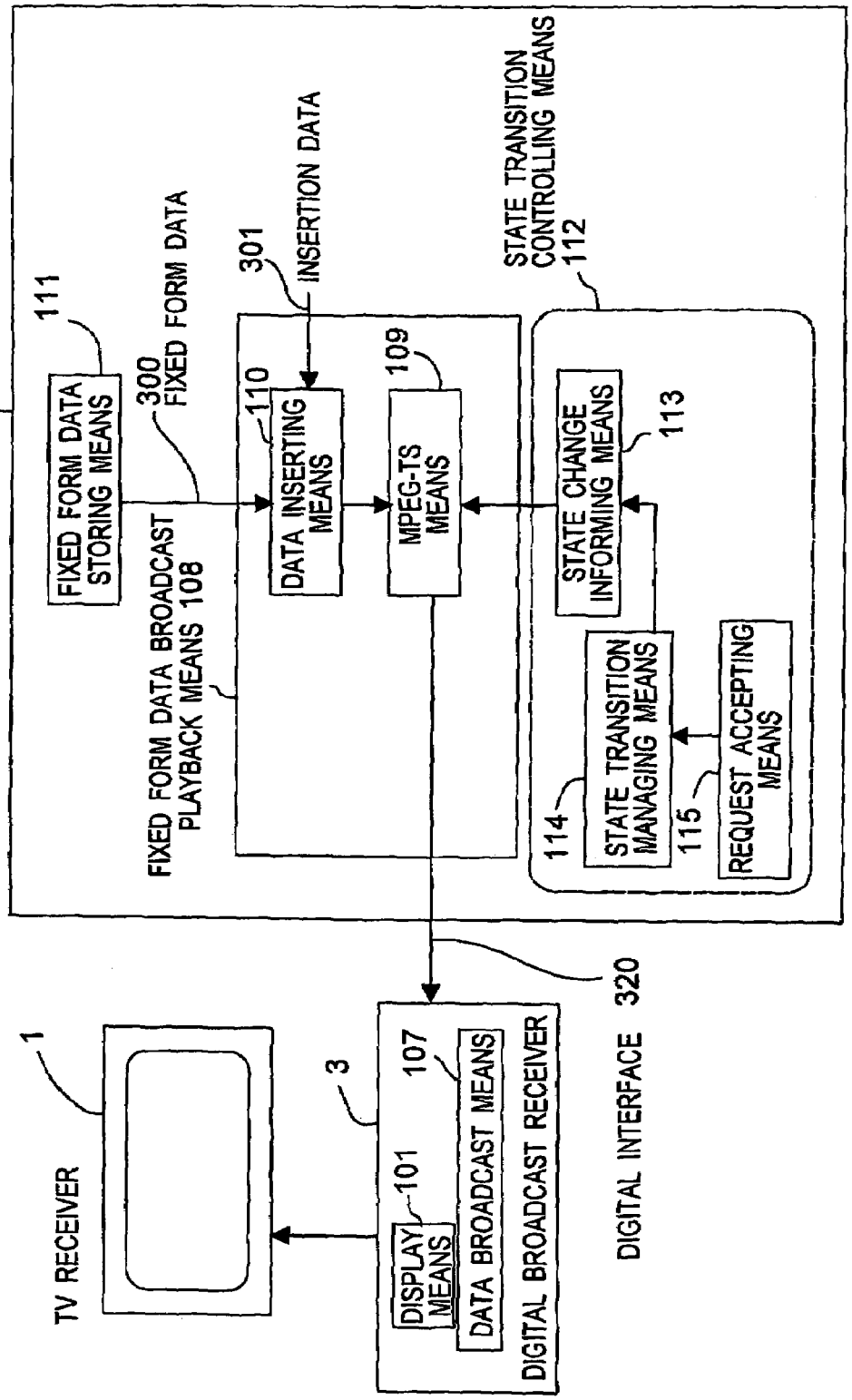
FIG. 5 is a block diagram showing a construction of a fixed form data broadcast playback apparatus according to an embodiment 3 of the invention.

FIG. 5 is a block diagram showing a construction of a fixed form data playback apparatus according to the embodiment 3 of the invention, which shows an apparatus construction in the second invention of the present invention. The components in FIG. 5 same as those in FIG. 1 are given by like numerals for omitting their explanations. Further, FIG. 6 shows a method in the tenth invention.

State transition controlling means 112 shown in FIG. 5 includes request accepting means 115, state transition managing means 114 and state change informing means 113.

In FIG. 5, the request accepting means 115 receives an instruction from a remote controller, push button or the like for accepting the request. The state transition managing means 114 collects information for controlling the state of the data broadcast program operated by the data broadcast means 107 of the digital broadcast receiver 3 and performs management. The state change informing means 113 performs a control for giving the digital broadcast receiver 3 of the change of the state.

The operation of the embodiment 3 thus constructed will be explained.

The request instructed by the remote controller, push button or the like is interpreted at the request accepting means 115, the content of which is told to the state transition managing means 114. The informed information is processed by the state transition managing means 114 according to a state transition managing method described in advance, thereby producing a corresponding control code. The state transition managing method described in advance describes how to make a state-transition to the data broadcast application that is activated by the reception of the fixed form data broadcast and is now operating in the digital broadcast receiver 3. Specifically, the data broadcast application and the state transition managing means 114 cooperatively operate according to the construction of the present invention. Subsequently, the control code produced by the state transition managing means 114 is changed to a format of event-message transmission system by the state change informing means 113, the result of which is sent to the MPEG-TS means 109. The sent information is processed by the MPEG-TS means 109 to thereby be reproduced as an MPEG-TS signal with the fixed form data. The MPEG-TS signal reproduced by the MPEG-TS means 109 is reproduced by the digital broadcast receiver 3, and then, processed by the data broadcast means 107.

The above-mentioned event-message transmission system provides means for sending message information from a broadcasting station to the application operated in the digital broadcast receiver 3 on the spot or at a designated time. Refer, for example, to Standard STD-B24, Ver. 3.2, Chapter 7 by Association of Radio Industries and Business. A general-purpose event-digital broadcasting. The general-purpose event-message descriptor is transmitted by the event-message transmission system, thereby being capable of changing the state of the application operating at the side of the digital broadcast receiver 3.

Subsequently explained with reference to FIG. 6 is a method for giving a notice of the state change to the digital broadcast receiver from the fixed form data broadcast playback apparatus 5.

FIG. 6 is a chart that visually represents on a time axis how to construct MPEG-TS and how to perform a playback at the MPEG-TS means 109 by using the event message produced by the state change informing means 113. FIG. 6 shows two cases. A case 1 shows a method for processing in a case where the size of one carousel composed of the fixed form data is small. In a case where the size of the carousel is small, sending cycle of the carousel becomes short, so that the event message can be inserted into a gap of the repeated unit of the carousel as shown in the figure. A case 2 shows a method for processing in a case where the size of one carousel composed of the fixed form data is great. In a case where the size of the carousel is great, sending cycle of the carousel becomes long. In this case, one carousel is divided into a predetermined number to be sent, whereby the event message can be inserted into a gap between these divided sending units as shown in the figure. The insertion of the event message as described above enables to send the event message to the digital broadcast receiver 3 at high response speed. The digital broadcast receiver 3 obtaining the event message informs the fixed form data broadcast application now operating of its content. As a result, the fixed form data broadcast application performs the state-transition according to the operational specification described in advance.

The use of the construction of the embodiment 3 can solve the subject from the viewpoint that the control for instructing the operation of the digital content device 4 from the side of the digital broadcast receiver 3 cannot be executed among the first subjects disclosed in the "subjects that the invention is to solve" of "the digital broadcast receiver 3 can only control old-fashioned device in a case where it does not have a function for controlling the latest device".

As is apparent from the construction of the embodiment 3, the state transition managing means 114 of the present invention can be caused to divide the processing accompanied by a time-consuming complicated calculation. Specifically, the construction of the present invention enables to execute an application with heavy processing-load, that cannot be realized by data broadcast means provided at the conventional existing digital broadcast receiver 3.

Embodiment 4

This embodiment 4 explains, with reference to FIGS. 7 to 11, a method for speeding up the processing in the state change informing means 113 and MPEG-TS means 109 explained in the embodiment 3.

Figure 7:
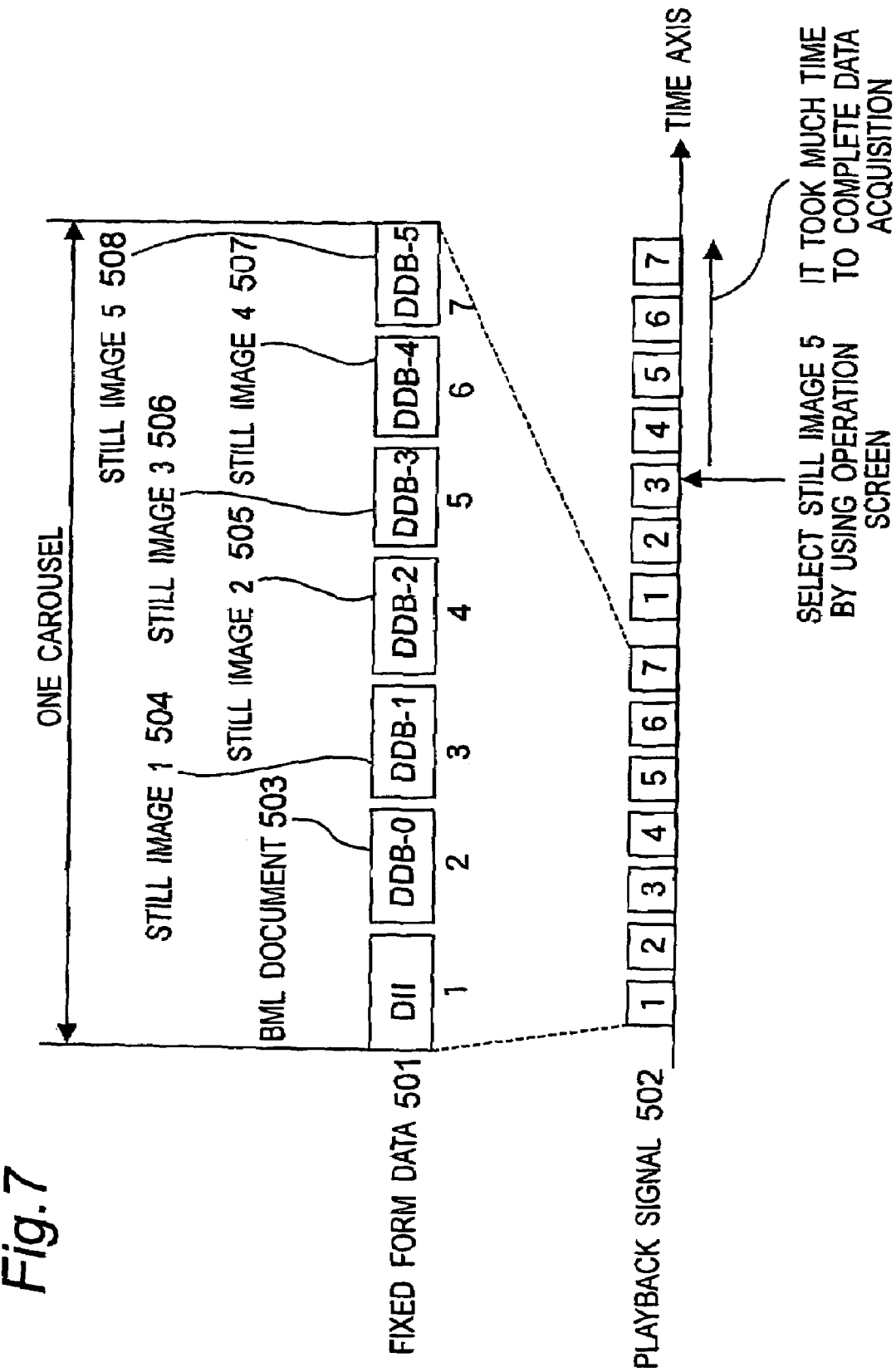
FIG. 7 is a conceptional view for explaining a data transmission system in a conventional data broadcast.

FIG. 7 is a conceptional view for explaining a data transmission system in a conventional data broadcast. FIGS. 8 to 11 show a method described in the eleventh invention of the present invention.

FIG. 7 is a view showing a data transmission system of a data broadcast transmitted as a conventional broadcast wave. Assuming that BML document is described in DDI in fixed form data 501 in the same figure, and that a first still image 1 is contained in DDB-0, a second still image 2 in DDB-1, a third still image 3 in DDB-3, a fourth still image 4 in DDB-4 and a fifth still image 5 in DDB-5. This data of one carousel unit is repeatedly reproduced as shown by a playback signal 502, thereby playback the data broadcast. In a case where the fixed form data broadcast is reproduced with the data mechanism same as that of the broadcast wave as described above, all of the still images that are the subjects to be displayed on the screen are required to be included in one carousel. As shown in FIG. 7, the data broadcast has a feature that the data broadcast can be viewed during relatively short period even if the playback is started at any point by repeatedly playback this one carousel. However, in the conventional data broadcast, the cycle of the transmitted carousel data becomes long in a case where there are many still images that are the subjects to be selected or in a case where the size of the still image is great, thereby entailing a problem that it takes much time to obtain the still image that is intended to be displayed, as apparent from FIG. 7. In FIG. 7, assuming that the still image 5 is selected by the operation screen during the playback of DDB-0 that is the third packet. In this case, the target image data cannot be obtained after passing through 4 to 6 packets by the shortest route in the conventional system. Specifically, in a case where the size of the still image data is great and the time for playback 4 to 5 packets is long, for example, it takes time for displaying.

Figure 8:
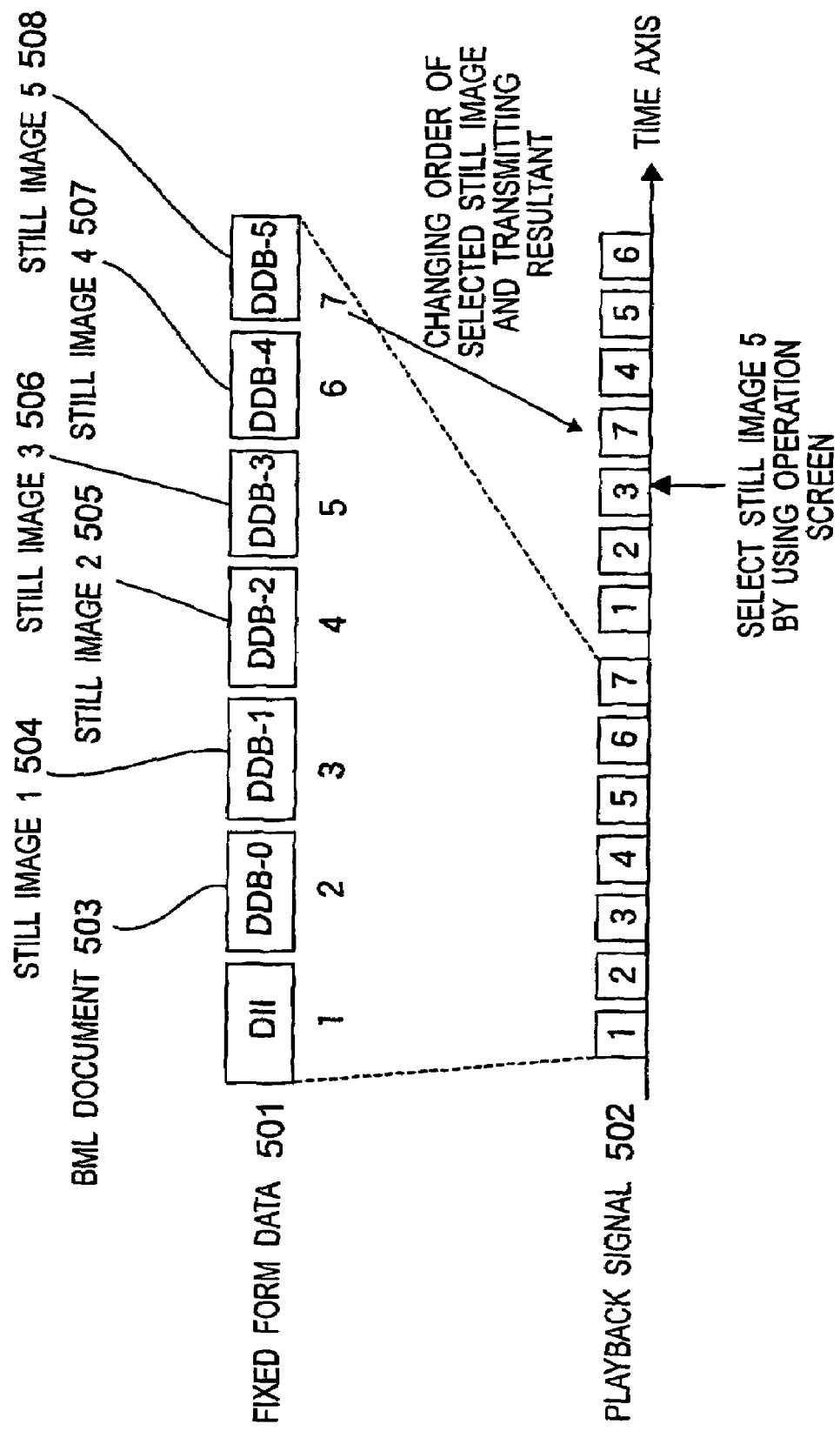
FIG. 8 is a conceptional view for explaining a first data transmission system for speeding up an image acquisition in the fixed form data broadcast playback apparatus according to an embodiment 4 of the invention.
Figures 9, 10:
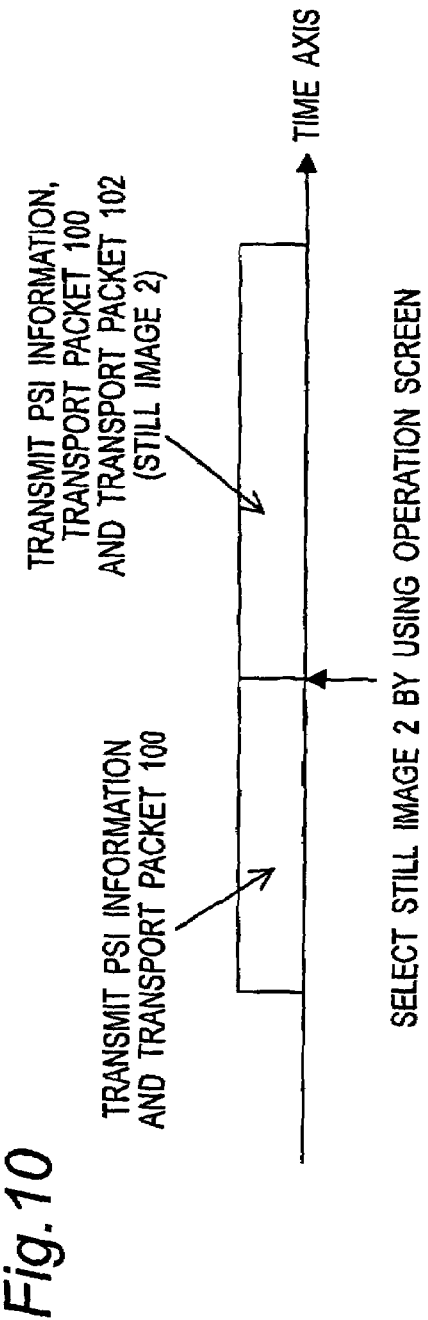
FIG. 9 is a view showing a type of fixed form data in the fixed form data broadcast playback apparatus.
FIG. 10 is a conceptional view for explaining a second data transmission system for speeding up an image acquisition in the fixed form data broadcast playback apparatus.

FIGS. 8 and 9 provide two types of system for solving the above-mentioned problems.

Explained hereinbelow with reference to FIGS. 8 and 9 is an operation of a first-type data transmission system for speeding up an image acquisition in the digital broadcast receiver 3.

FIG. 8 is a view showing a first-type data transmission system for speeding up the image acquisition in the digital broadcast receiver 3.

FIG. 11 is a view in which the output signal from the state change informing means 113 of the fixed form data broadcast playback apparatus 5 represented in FIG. 5 is extended. The different point between FIG. 11 and FIG. 5 is that an image selecting instruction 321 is newly added to the signal transmitted from the state change informing means 113. Same numerals are given to the sections same as those in FIG. 5 for omitting their explanation.

In FIG. 8, the carousel same as that in FIG. 7 is supposed to be repeatedly reproduced. In a case where the still image 5 is selected by the user while the playback signal performs the playback processing of the fixed form data broadcast to the third packet, i.e., the still image 1 in FIG. 8, for example, the state change informing means 113 shown in FIG. 11 transmits the image selecting instruction 321 to the MPEG-TS means 109 to thereby instruct the change in the order in the carousel packet at the MPEG-TS means 109. Methods for changing the order include a method for causing one-by-one interruption shown in the same figure or a method for playback the continuing original carousel order after the interruption (not shown).

As described above, the order of the DDB corresponding to the selected data is immediately changed and the resultant is reproduced, whereby the digital broadcast receiver 3 can start a display at a response speed higher than that of the data broadcast transmitted with the conventional broadcast wave.

Explained hereinbelow with reference to FIGS. 9, 10 and 11 is an operation of a second-type data transmission system for speeding up an image acquisition in the digital broadcast receiver 3.

FIG. 9 is a view showing an example of fixed form data newly defined, while FIG. 10 is a view showing a second-type data transmission system for speeding up the image acquisition in the digital broadcast receiver 3.

As shown in FIG. 9, the carousel comprising the DII and DDB is firstly allocated to No. 100 of the transport packet ID. At this time, the DDB does not contain the image data to be selected, unlike the first-type data transmission system. The image data to be selected is allocated to No. 101 to No. 105 of the transport packet ID that are different from the ID allocated to the carousel.

Explained hereinbelow with reference to FIG. 10 is an operation for playback the fixed form data defined as described above by the MPEG-TS means 109.

In a case where the image is not selected, No. 100 of the transport packet is only reproduced. Then, assuming that the still image 2 is selected by the operation by the user. At this time, the state change informing means 113 shown in FIG. 11 issues the image selecting instruction 321 to the MPEG-TS means 109. The MPEG-TS means 109 receiving this instruction multiplexes the transport packet ID of No. 102 in addition to the transport packet ID of No. 100 that has been transmitted so far, and makes the playback as shown in FIG. 10. The ID of the transport packet corresponding to the selected data is immediately multiplexed and reproduced as described above, whereby the digital broadcast receiver 3 can start a display at a response speed higher than that of the data broadcast transmitted with the conventional broadcast wave.

As described above, the required data is immediately changed in its order or multiplexed as shown in the embodiment 4, thereby being capable of realizing a quick response compared to the conventional data broadcast.

It is to be noted that, in the example of the fixed form data shown in FIG. 9, the transport packet corresponding to the still image data can also be defined as the section where the insertion data 301 explained in the embodiment 1 is inserted. Like the above-mentioned description, moving image, voice, animation, game or the like may be allocated to this section. Further, a normal playback, fast forward playback, rewinding playback or the like may be allocated by using a program that has already been recorded.

Embodiment 5

The embodiment 5 of the present invention explains with reference to FIGS. 12 to 15 the example of using a remote controller based upon the construction explained in the embodiment 3.

FIG. 12 is a conceptional view showing a conventional operation of a remote controller, while FIG. 13 is a conceptional view showing an example of an operation of a device via the conventional digital broadcast receiver. Further, FIG. 14 is a conceptional view showing a system of receiving a signal from the remote controller in the fixed form data broadcast playback apparatus according to the embodiment 5 of the invention, i.e., shows a construction according to the ninth invention of the present invention.

FIG. 15 is a block diagram showing a construction of a fixed form data playback apparatus according to the embodiment 5 of the invention. The components in FIG. 15 same as those in FIG. 5 are given by like numerals for omitting their explanations.

Firstly explained is an example of the operation by the conventional remote controller by using FIGS. 12 and 13.

FIG. 12 is a view showing a conventional operation of a remote controller. This figure is composed of a TV receiver 1, a conventional AV system A6 connected to the TV receiver 1, a conventional AV system B7, and remote controller 8 for the conventional AV system A6 and a remote controller 9 for the conventional AV system B7 for operating respective systems. FIG. 13 shows an example of an operation of a device via the conventional digital broadcast receiver. FIG. 13 is composed of the TV receiver 1, digital broadcast receiver 3 and digital content playback system 4.

As shown in FIG. 12, the conventional AV system has individually a remote controller, thereby entailing a problem that there are a plurality of remote controllers present regardless of one screen to be viewed. Further, there is a need to perform a control via the digital broadcast receiver in order to operate the digital content playback system 4 with a single remote controller as shown in FIG. 13. Specifically, in order to add a new function accompanied by the operation of the remote controller to the digital content playback system 4 with a single remote controller, there is no method other than the one wherein a new program is incorporated in the digital broadcast receiver 3 for supporting this operation or the one wherein a remote controller exclusively used for the digital content playback system 4 is prepared. In other words, there has been a problem that the new function accompanied by the operation of the remote controller cannot be added to the digital content playback system 4 with only a single remote controller while using the conventional digital broadcast receiver.

The embodiment 5 explains a construction for solving the above-mentioned problem by using FIGS. 14 and 15.

FIG. 14 is composed of the TV receiver 1, digital broadcast receiver 3, fixed form data broadcast playback apparatus 5 having the construction shown in the embodiment 5, remote controller 10 for the digital broadcast receiver 3 and remote control signal receiving means 117 for receiving a signal from the remote controller 10.

In FIG. 15, the request accepting means 115 includes remote control signal receiving means 117 and analyzing means 116. The remote control signal receiving means 117 is means for receiving a remote control signal sent from the remote controller 10. The analyzing means 116 is means for analyzing the meaning of the received remote control signal.

As shown in FIG. 14, the remote control signal transmitted from the remote controller 10 for the digital broadcast receiver 3 is received and processed at the fixed form data broadcast playback apparatus, thereby enabling a processing with only a single remote controller. Further, the request accepting means 115 in the embodiment 3 includes the remote control signal receiving means 117 and the analyzing means 116 as shown in FIG. 15, whereby the state of the application screen of the fixed form data broadcast displayed on the TV receiver 1 can be controlled by the manipulation of the user.

Subsequently explained in detail is the operation of this embodiment shown in FIG. 15.

When a downward arrow button is pushed by the remote controller 10, the remote control signal receiving means 117 receives a remote control signal 310, and transmits the received remote control code 310 to the analyzing means 116. The analyzing means 116 deciphers the meaning of the received remote control code 310. It is to be noted that, in the case of receiving method shown in FIG. 13, the digital broadcast receiver 3 is not limited to a special receiver. In this case, the control code of the remote controller differs every system manufacturer. For coping with this, the discrimination every system manufacturer is performed at the analyzing means 116. The remote control code 312 analyzed by the analyzing means 116 is transmitted to the state transition managing means 114. The state transition managing means 114 distinguishes by the remote control code 312 that the downward arrow button is pushed, and produces a screen operation control code 311 that instructs the state change for moving the cursor position on the operation screen to the first position below the present position. A control code for designating one by one still image data incorporated into the fixed form data broadcast is allocated to the screen operation control code 311. There is a method for defining a control code representing the state change as the screen operation control code 311, but in this method, discrepancy occurs in the state management of the digital broadcast receiver 3 and the fixed form data broadcast playback apparatus 5 in a case where the digital broadcast receiver 3 fails to receive signals. Specifically, this discrepancy continues to the following operation. In order to avoid this problem, the state transition managing means 114 of the present invention produces the screen operation control code 311 corresponding one by one to the screen information that is intended to be displayed and transmits the resultant to the state change informing means 113. The state transition managing means 114 changes the state of the application now op rating by the data broadcast means 107 based upon the instruction from the remote controller 10, but the information managing the operation of the application is not always based only upon the operation by the remote controller 10. For example, the state transition managing means 114 may also manage the total number of still images that are to be displayed, the number of image file information 401 displayed in one page, or the like.

A button used for the remote controller is determined in BS digital broadcast, thereby providing an advantage that the same operational environment can be provided even if a digital broadcast receiver 3 made by a different manufacturer is used.

As described above, the use of the construction of the embodiment 5 can solve the third subject that "the operation of the viewer is made complicated when an exclusive remote controller is prepared for respective systems" disclosed in the above-mentioned "subjects that the invention is to solve".

Further, this embodiment can also solve the subject that the new function accompanied by the operation of the remote controller cannot be added to the digital content playback system 4 with only a single remote controller while using the conventional digital broadcast receiver.

Figure 16:
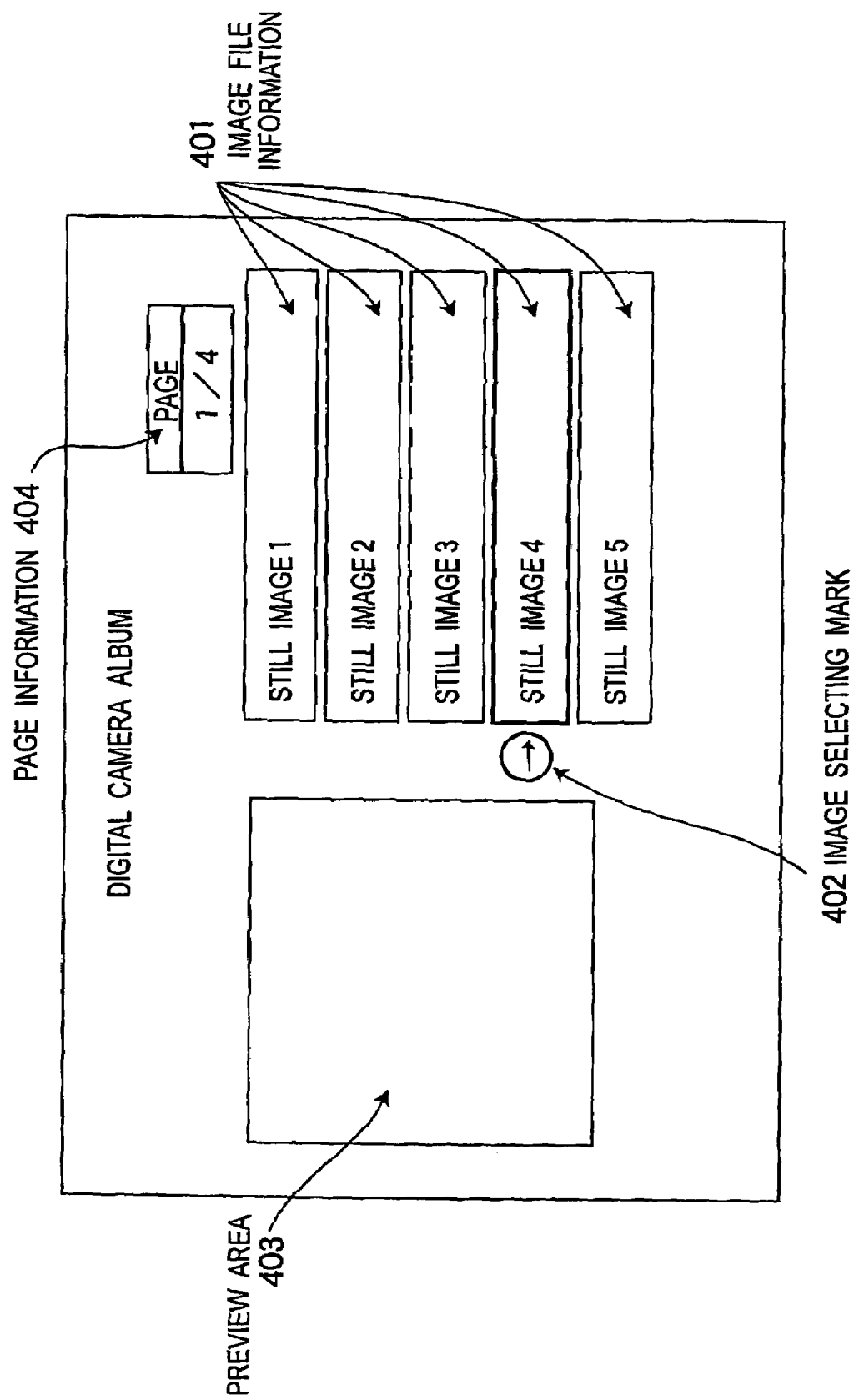
FIG. 16 is a conceptional view showing a screen construction of an album function in the fixed form data broadcast playback apparatus.

Subsequently explained with reference to FIG. 16 is an outline of an example of an operation in an example of a screen construction of an album function that can be realized by using the embodiment 5.

In FIG. 16, five frames displayed in the right half side of the screen are display frames of image file information 401 showing the content of the still image files that are the subjects to be selected. A name representing the title of the image is displayed in this title displaying frame. An image selection mark 402 is moved by a downward arrow button and upward arrow button mounted on the remote controller for the receiver. At this time, the still image directed by the image selection mark 402 is selected and reducingly displayed on a preview area 403. Further, the selected still image is displayed all over the screen by pushing an OK button.

The use of the constructions of the above-mentioned embodiments 3 to 5 can provide the aforesaid operational environment.

Although the embodiment 5 shows the method for controlling by using the remote controller 10 for the digital broadcast receiver 3, an exclusive remote controller having a different remote control code may be used. Further, although the remote controller is used as a component of the request accepting means 115, a push button used in the conventional recording and/or playback apparatus may be utilized. Additionally, applicable construction is that a command is externally issued via the IEEE 1394 interface or the like. Moreover, although the screen construction of the album function in FIG. 16 utilizes the case for displaying the still image, a moving image, voice, animation, game or the like may be processed as data. Specifically, not only a still image can be made into an album, but also a moving image or voice can be made into an album.

Embodiment 6

Subsequently explained is an example of a case where a fixed form data broadcast recording and/or playback apparatus according to the embodiment 6 has a recording function.

Figure 17:
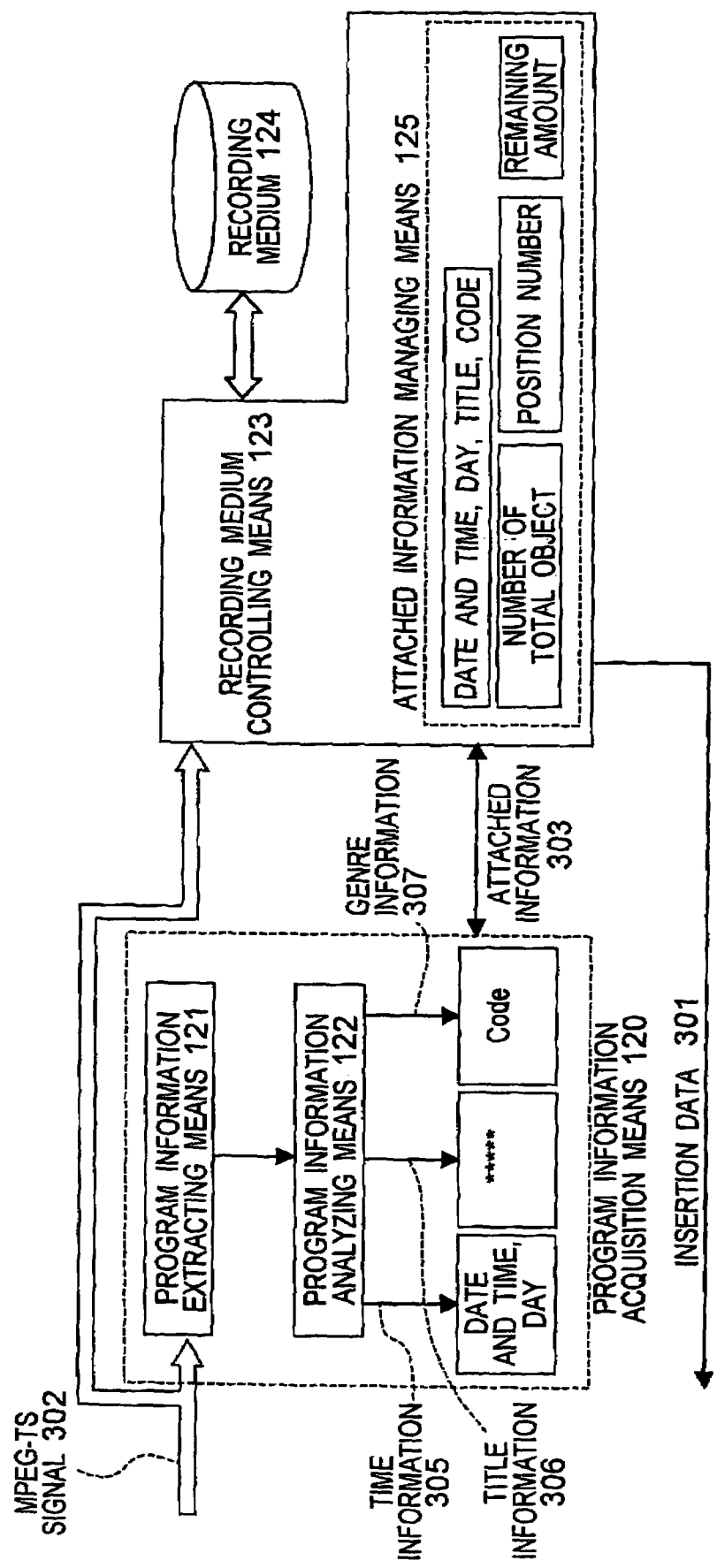
FIG. 17 is a block diagram showing an insertion data extraction in a fixed form data broadcast recording and/or playback apparatus according to an embodiment 6 of the invention.

FIG. 17 is a block diagram showing a construction of the fixed form data broadcast recording and/or playback apparatus according to the present embodiment, i.e., shows the construction according to the third invention of the present invention.

In the following explanation, numerals are newly given to new components for explanation, and the components already described are marked with the same numerals for omitting the explanation.

FIG. 17 shows a content where a new function is added to the section corresponding to the insertion data 301 explained in the embodiment 1 shown in FIG. 1.

FIG. 17 has program information acquisition means 120, recording medium controlling means 123 and a recording medium 124. Further, the program information acquisition means 120 has program information extracting means 121 and program information analyzing means 122. Moreover, the recording medium controlling means 123 has attached information managing means 125.

The operation in FIG. 17 will be explained hereinbelow.

FIG. 17 shows a construction wherein attached information of a program is extracted from the MPEG-TS data recorded in the fixed form data broadcast playback apparatus for making the insertion data shown in FIG. 1.

In the figure, numeral 302 denotes the MPEG-TS signal recorded in the fixed form data broadcast playback apparatus. Numeral 120 denotes means for obtaining information relating to the program from this MPEG-TS signal, while numeral 121 denotes means for extracting a packet to which the program information is written from the MPEG-TS signal 302. Numeral 122 denotes means for interpreting the meaning of the extracted packet data and extracting an on-air date or title information of the recorded program, and further a genre information such as a movie or sports program.

Numeral 303 denotes attached information of the program taken by the program information acquisition means 120.

The operation of the embodiment 6 having the above-mentioned construction will be explained hereinbelow.

When a request for recording of the MPEG-TS from a controller or button on a main body (not shown), the fixed form data broadcast playback apparatus 5 starts to record on the recording medium 124 the image/voice signal transferred with the MPEG-TS signal 302 via the recording medium controlling means 123. Further, the program information acquisition means 120 simultaneously delivers the attached information 303 taken from the MPEG-TS signal to the recording medium controlling means 123, whereupon the recording medium controlling means 123 writes this information to the recording medium 124 to be stored. The acquisition of the program information is roughly performed by two steps. At the first step, the program information extracting means 121 extracts SIT (Selection Information Table) packet including the program information from the MPEG-TS signal 302, and transmits the extracted packet to the program information analyzing means. The SIT packet means a packet having described thereon a summary of information required for providing information on stream or service information included in the stream. The digital broadcast receiver 3 produces this SIT packet and gives it to the external device upon transmitting the digital image. Next, in the second step, the program information analyzing means 122 extracts from the SIT packet a present time, a time when the program starts, on-air period of the program, program title, genre code or the like. The attached information 303 thus extracted is sent to the attached information managing means 125. The attached information managing means 125 manages, in addition to the above-mentioned attached information 303, a total number of the recorded program (disclosed as Total Object in the figure), the order with the date of the program already recorded as a basis (disclosed as Position number in the figure), remaining amount of the recording medium 124 or the like.

By taking this construction, the fixed form data broadcast recording and/or playback apparatus including the construction shown in the embodiment 6 enables to use the information relating to the recorded program as the insertion data 301 of the fixed form data broadcast. As a result, the fixed form data broadcast recording and/or playback apparatus can display via the digital broadcast receiver 3 the information relating to the recorded program as the data broadcast.

The use of the construction of the embodiment 6 can solve the fourth subject that "the conventional recording and/or playback apparatus only has a method of separately obtaining the program title information from the digital broadcast receiver, so that the title cannot be displayed of the program recorded from the digital broadcast receiver that does not have means for informing the recording and/or playback apparatus of the program title disclosed in the above-mentioned "subjects that the invention is to solve".

Further, not only the program information but also the attached information (for example, the remaining amount of the recording medium) can similarly be displayed as the information managed by the recording medium controlling means 123. Additionally, there is also an effect that the use of the present time included in the program information can manage the time when the recording is started without providing at the fixed form data broadcast recording and/or playback apparatus a time controlling timer exclusively used therefor. Moreover, in a case where the exclusive time-managing timer is provided, there is an effect of being capable of setting this time.

Embodiment 7

Subsequently explained in the embodiment 7 is a construction of an apparatus having a function of recording and playback a program transmitted from the digital broadcast receiver 3 in a form of MPEG-TS, storing the title of the recorded program as the insertion data 301 inserted to the fixed form data and further capable of selectively playback the recorded program by the remote controller in the fixed form data broadcast.

Figure 18:
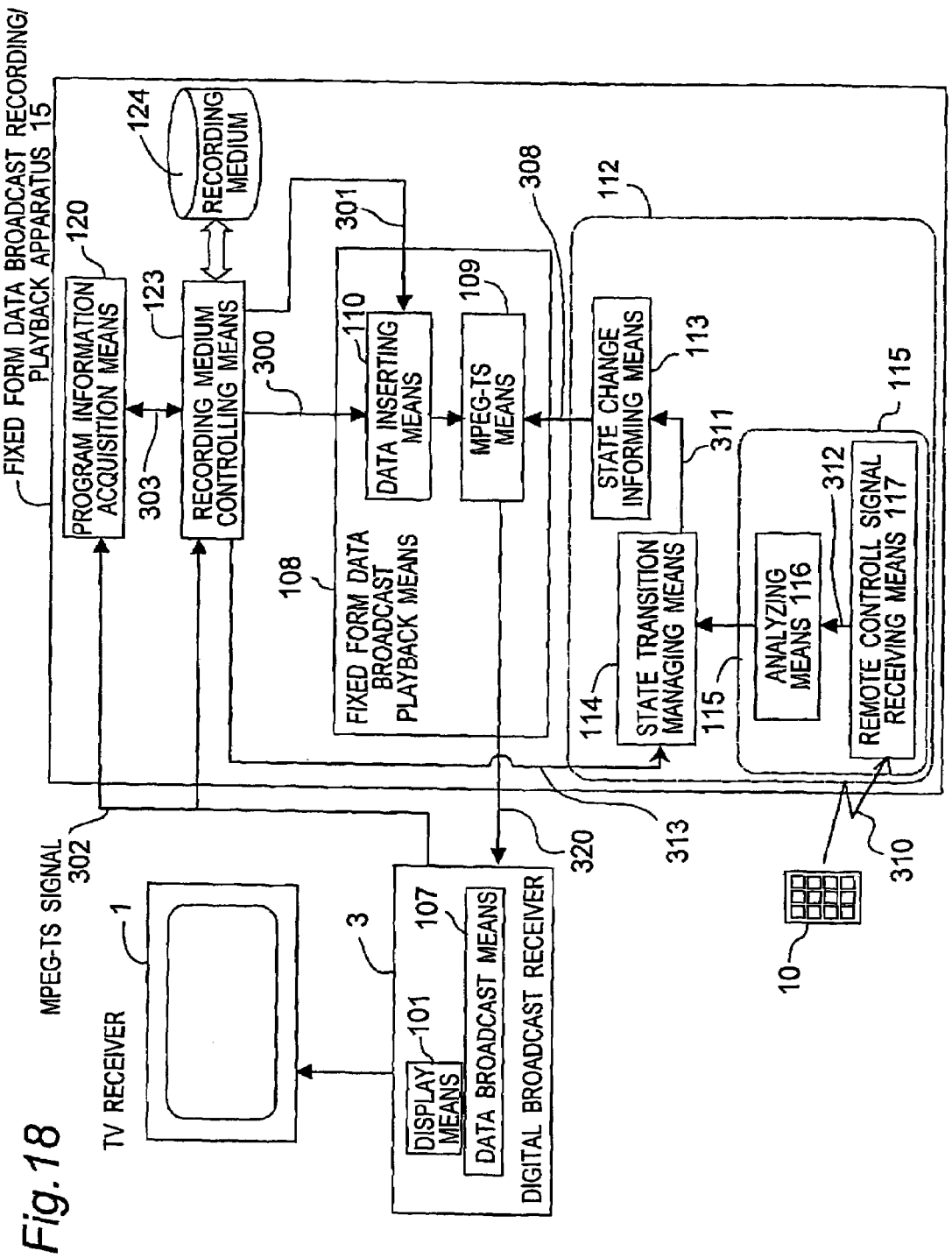
FIG. 18 is a block diagram showing a construction of a fixed form data broadcast recording and/or playback apparatus according to an embodiment 7 of the present invention.

FIG. 18 is a block diagram showing a construction of a fixed form data broadcast recording and/or playback apparatus according to the embodiment 7, that is the one disclosed in the fourth invention of the present invention. This embodiment shows the one extracting the program title and displaying this on the operation screen for realizing the selective playback.

This construction is a combination of the components shown in FIG. 15 in the embodiment 5 (a system for playback by a remote controller or the like the recorded program in the fixed form data broadcast) and those shown in FIG. 17 in the embodiment 6 (writing of the program information to the fixed form data broadcast in the recording operation). As for the individual component, those same as the above-mentioned ones are given by the same numerals for omitting their explanation.

In FIG. 18, numeral 1 denotes a TV receiver. Numeral 3 denotes a digital broadcast receiver provided with data broadcast means 107. Numeral 10 denotes a remote controller. Numeral 15 denotes a fixed form data broadcast recording and/or playback apparatus.

Further, the fixed form data broadcast recording and/or playback apparatus 15 has program information acquisition means 120, recording medium controlling means 123, recording medium 124, fixed form data broadcast playback means 108 and state transition controlling means 112. The function of each component is the same as that described above, so that the explanation is omitted here. Moreover, numeral 313 denotes an internal state informing signal for informing the state change of the recording medium controlling means 123 of the state transition managing means 114 that is a part of the state transition controlling means 112.

The operation of the fixed form data broadcast recording and/or playback apparatus having the construction shown in FIG. 18 will be explained with reference to the drawings.

Firstly, a program is recorded by using a function for operating a device of the digital broadcast receiver 3. The recording operation is performed such that the recording medium controlling means 123 receiving the MPEG-TS signal 302 outputted from the digital broadcast receiver 3 records the MPEG-TS signal 302 on the recording medium 124 after a command is issued from the digital broadcast receiver 3 to the fixed form data broadcast recording and/or playback apparatus 15 or as the operation of the main body of the fixed form data broadcast recording and/or playback apparatus is defined as a request for starting the recording.

At this time, a part of the MPEG-TS signal 302 is extracted and analyzed by the program information acquisition means 120. Further, the attached information 303 relating to the obtained recorded program is recorded on the recording medium 124 via the recorded medium controlling means 123. FIG. 18 shows the construction where the attached information 303 is recorded and stored on the same storage medium as the one having the MPEG-TS signal 302 recorded thereon, but the same operational form can be obtained even if the attached information is stored on another recording medium.

Subsequently explained is the operation of the fixed form data broadcast recording and/or playback apparatus shown in FIG. 18 upon producing the fixed form data.

As described above, it is required that the title information or the like of the newly recorded program is newly rendered to be the insertion data and inserted the resultant to the fixed form data 300, as a result of the recording operation performed by the fixed form data broadcast recording and/or playback apparatus 15.

The data inserting operation to the fixed form data accompanied by this recording operation may be performed at the time when the program information is obtained during the recording operation. However, the information on the remaining amount of the disk, object size or the like changes at any time during the recording operation, so that it is necessary to perform the data insertion operation again to the fixed form data 300 after the termination of the recording operation. Moreover, this data insertion operation may be performed at the time when the recording operation of the program is stopped. Additionally, it can be performed at the time when the playback of the object of the fixed form data broadcast is instructed.

Subsequently explained is the operation of the fixed form data broadcast recording and/or playback apparatus 15 shown in FIG. 18 upon playback the fixed form data.

In order to transmit the fixed form data broadcast to the digital broadcast receiver 3 as playback data, the fixed form data can be made operable as a part of the recording data in the fixed form data broadcast recording and/or playback apparatus 15. In this embodiment, in a case where the fixed form data broadcast recording and/or playback apparatus 15 is operated as a tape device, data recorded on the head of the tape is defined as the fixed form data broadcast section, whereby the fixed form data broadcast can be reproduced and transmitted when the tape is rewound to the head for performing the playback operation.

Another method is also possible in which, when a special button on the remote controller 10 for the digital broadcast receiver 3 is pushed down, the fixed form data broadcast can be reproduced and transmitted. In this case, it is necessary to select a button that does not fall on the ordinary operation of the digital broadcast receiver 3.

Further, the button on the main body of the fixed form data broadcast recording and/or playback apparatus 15 is detected to be pushed down or the remote control signal 310 from the exclusive remote controller is received, whereby the request for starting the operation is transmitted from the state transition controlling means 112 to the fixed form data broadcast playback means 108, thereby being capable of starting to reproduce and transmit the fixed form data broadcast.

Moreover, the recording medium controlling means 123 reads the data of the recorded program from the recording medium 124 upon the playback, thereby starting the playback operation of the ordinary recorded program. The other one of the fixed form data broadcast does not always have to follow the procedure. Specifically, the reading of the fixed form data and data insertion may be executed after the playback operation of the fixed form data broadcast is required, or before the playback operation is required, the insertion data 301 is inserted to the fixed form data 300 at the data inserting means 110 and the resultant can be held at a temporarily storing place such as a memory, magnetic recording medium or the like.

The fixed form data broadcast is sent by the fixed form data broadcast playback means 108.

The fixed form data broadcast can be operated by the operation of the remote controller 10.

The content of the remote control signal 310 is transmitted to the state transition managing means 114 by the request accepting means 115. On the other hand, numeral 313 denotes a signal meaning the internal state of the recording medium controlling means 123. The management information (e.g., remaining capacity of the recording medium 124, information about the production or erasure of file system or the like) is informed by the internal state informing signal 313. The preparation of the means for informing the internal state from the recording medium controlling means of the state transition managing means 114 can prepare the application that changes the state change notice depending upon the state at the side of the recording and/or playback operation. For example, when there is no space in the recording capacity, a notice can be displayed for drawing user's attention on this point.

The construction of the fixed form data broadcast recording and/or playback apparatus 15 shown in the above-mentioned embodiments can solve the first subject that the digital broadcast receiver 3 can only control old-fashioned device in a case where it does not have a function for controlling the latest device, the second subject that a conventional recording and/or playback device such as D-VHS recording and/or playback apparatus can record and reproduce data broadcast but cannot operate the screen of the data broadcast reproduced from the recording and/or playback device, the third subject that the operation of the viewer is made complicated when an exclusive remote controller and operation screen are prepared for respective devices and the fourth subject that the title cannot be displayed of the program recorded from the digital broadcast receiver that does not have means for informing the recording and/or playback apparatus of the program title.

Figure 19:
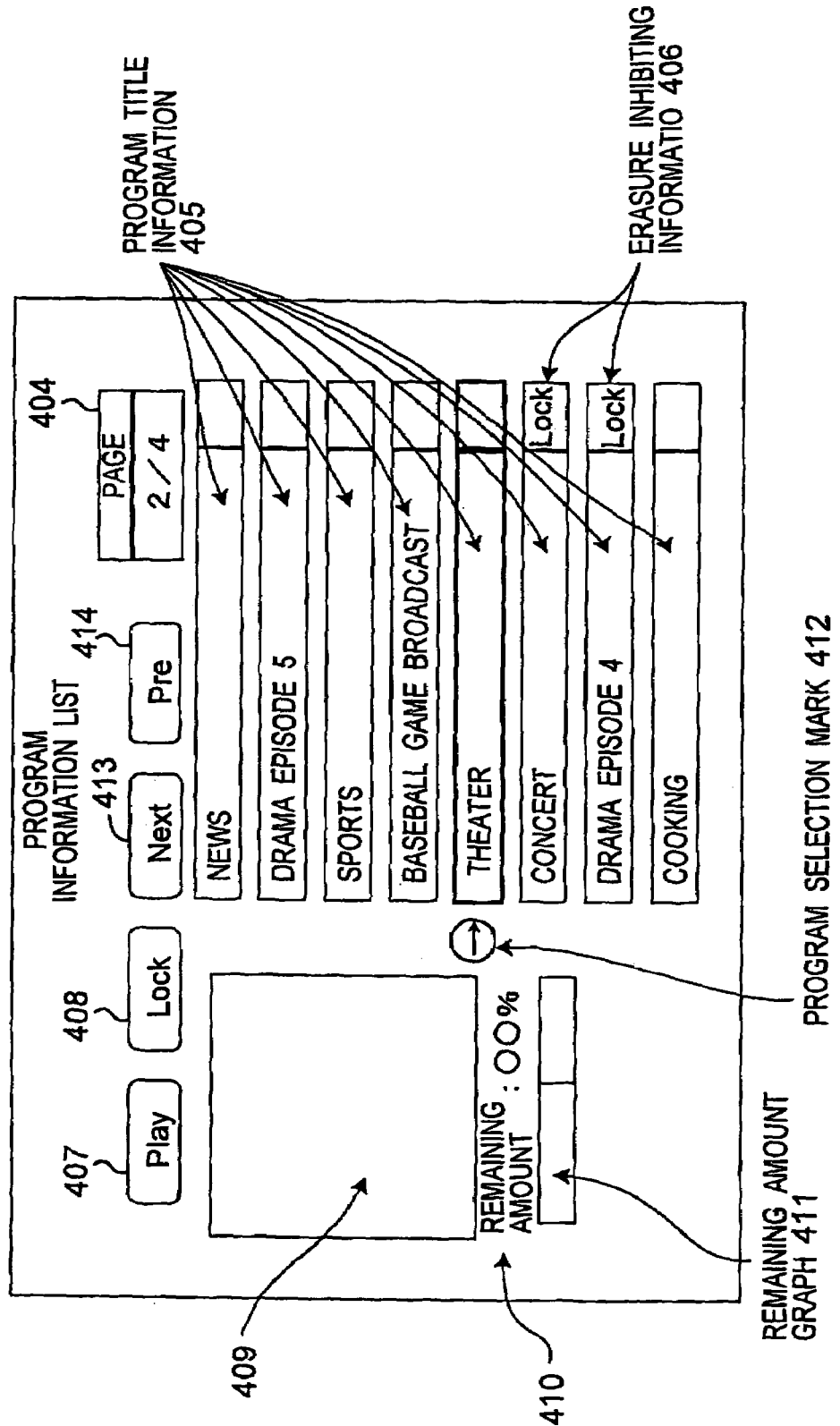
FIG. 19 is a conceptional view showing one example of a screen construction for displaying program title information in the fixed form data broadcast recording and/or playback apparatus.

FIG. 19 is a conceptional view showing one example of a screen construction for displaying program title information.

The operation of the fixed form data broadcast recording and/or playback apparatus 15 shown in the embodiment 7 is more specifically explained hereinbelow with reference to FIG. 19.

In FIG. 19, numeral 404 denotes an area for representing information of the fixed form data broadcast every display screen. This area displays here a displaying page number.

Numeral 405 denotes columns displaying information about the recorded program such as a title, broadcasting station, on-air time or the like of the program.

Numeral 406 denotes columns displaying similarly the information about the recorded program, but this information can be operated by the user. Erasure inhibiting information in the figure is one example of this. These columns are areas displaying the result of the selective designation of erasable or non-erasable every program.

Numeral 409 denotes an area displaying information common to each page. In the example of FIG. 19, it is an area displaying information concerning the operating method.

Numerals 407, 408, 413 and 414 denote buttons that can be pushed down by the user with the remote controller. In the example of FIG. 19, each button is defined as a playback operation start button 407, program erasure inhibition designating button 408, page up button 413 and page down button 414.

Numerals 410 and 411 denote areas displaying internal information of the device. In the example of FIG. 19, they are areas displaying the remaining amount of the recordable area.

These areas can be changed during the display of the fixed form data broadcast. For example, if the content indicated by the remaining amount display 410 or remaining amount display graph 411 is defined as a value that is changed by the designation of the erasure inhibiting information 406, the areas of 410 and 411 are changed when the user operates to display the screen of the fixed form data broadcast of the present invention. Numeral 412 denotes an example of a program selection mark which is changed on real-time by the operation of the remote controller by the user. This mark moves by the top and bottom arrows of the remote controller operated by the user.

In the system of the construction in the embodiment 7, the areas having the display contents changed by the user operating the button such as 410 or 404 are controlled by the state transition controlling means 112 in FIG. 18, and the MPEG-TS means 109 transmits the event message issued from the state change informing means 113 to the digital broadcast receiver 3, thereby changing over the screen.

Further, the operation of the remote controller in the fixed form data broadcast recording and/or playback apparatus 15 shown in the embodiment 7 will be explained.

The buttons 407, 408, 413 and 414 shown in FIG. 19 can be selected by an arrow key attached to the remote controller of the digital broadcast receiver 3 for moving a cursor. However, there may be the case where the reaction that is different from the intention of the user occurs, if its selection method is overlapped with the operating method in the device-operating function of the digital broadcast receiver.

In this case, each function of each button 407, 408, 413 and 414 can be allocated to another button on the remote controller. For example, the remote controller of the Japanese BS digital broadcast receiver has four buttons separated by color, each of which can be allocated to each button 407, 408, 413 and 414.

Further, buttons other than the above-mentioned buttons can be allocated. For example, in a case where the screen is returned to the original fixed form data broadcast when the program to be reproduced is selected from the selection screen of the fixed form data broadcast and the selected program is reproduced, allocated to the operation of the fixed form data broadcast can be not a "return" button used for the original operation of the data broadcast but a "program table" that is generally not used upon viewing the data broadcast.

As understood from the above, the use of the attached remote controller is made possible for the digital broadcast receiver 3, thereby be capable of further solving the subject that "in a case where the digital broadcast receiver 3 dose not have a function of controlling the latest device, it can only control an old-fashioned device".

Embodiment 8

Figure 20:
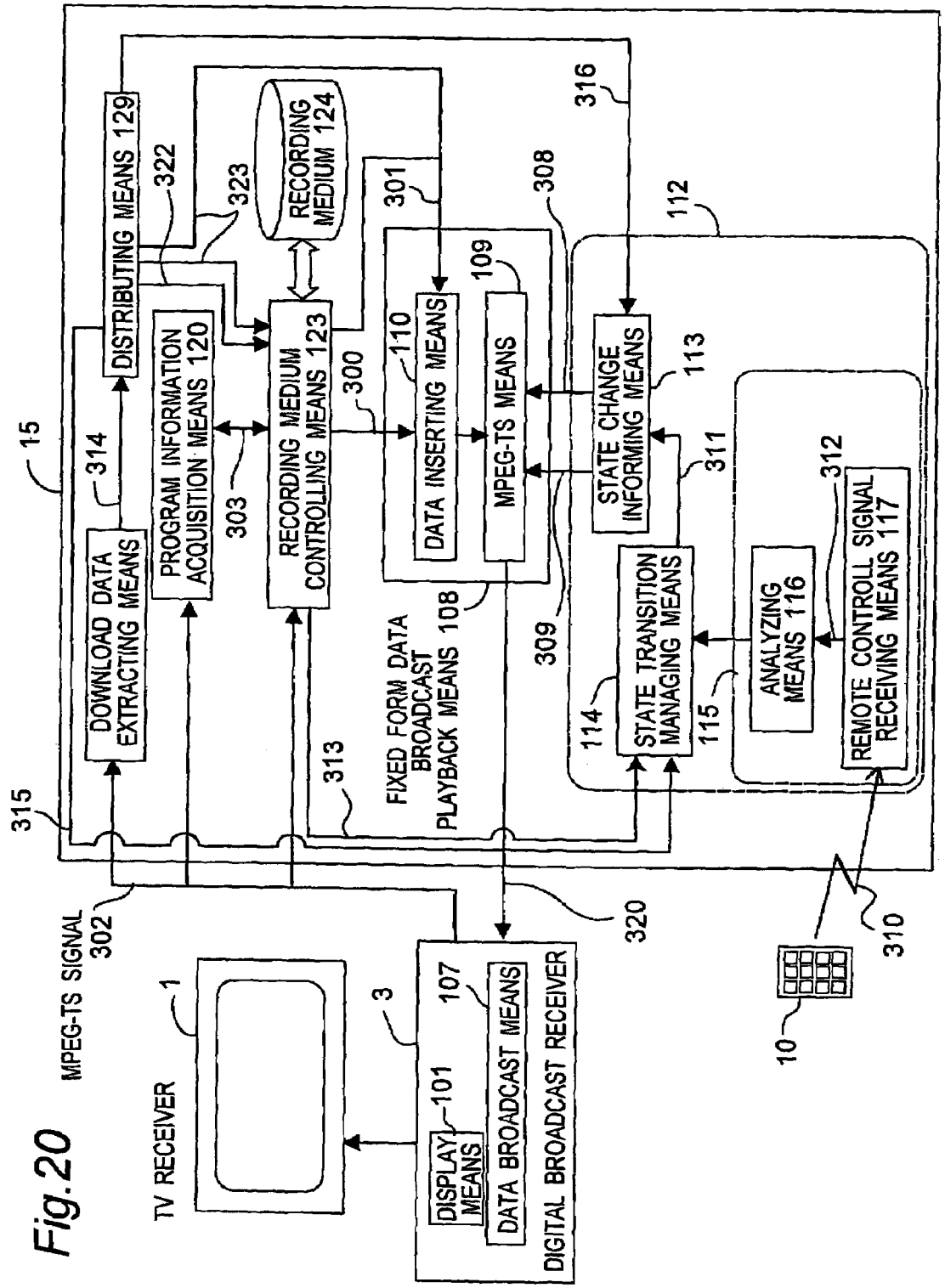
FIG. 20 is a block diagram showing a construction of a fixed form data broadcast recording and/or playback apparatus according to an embodiment 8 of the present invention.

Subsequently, the embodiment 8 of the present invention will be explained. FIG. 20 is a block diagram showing a construction of a fixed form data broadcast recording and/or playback apparatus according to the embodiment 8 of the invention that is disclosed in the twelfth invention of the present invention. In the following explanation, numerals are newly given to new components for explanation, and the components already described are marked with the same numerals for omitting the explanation.

Figure 21:
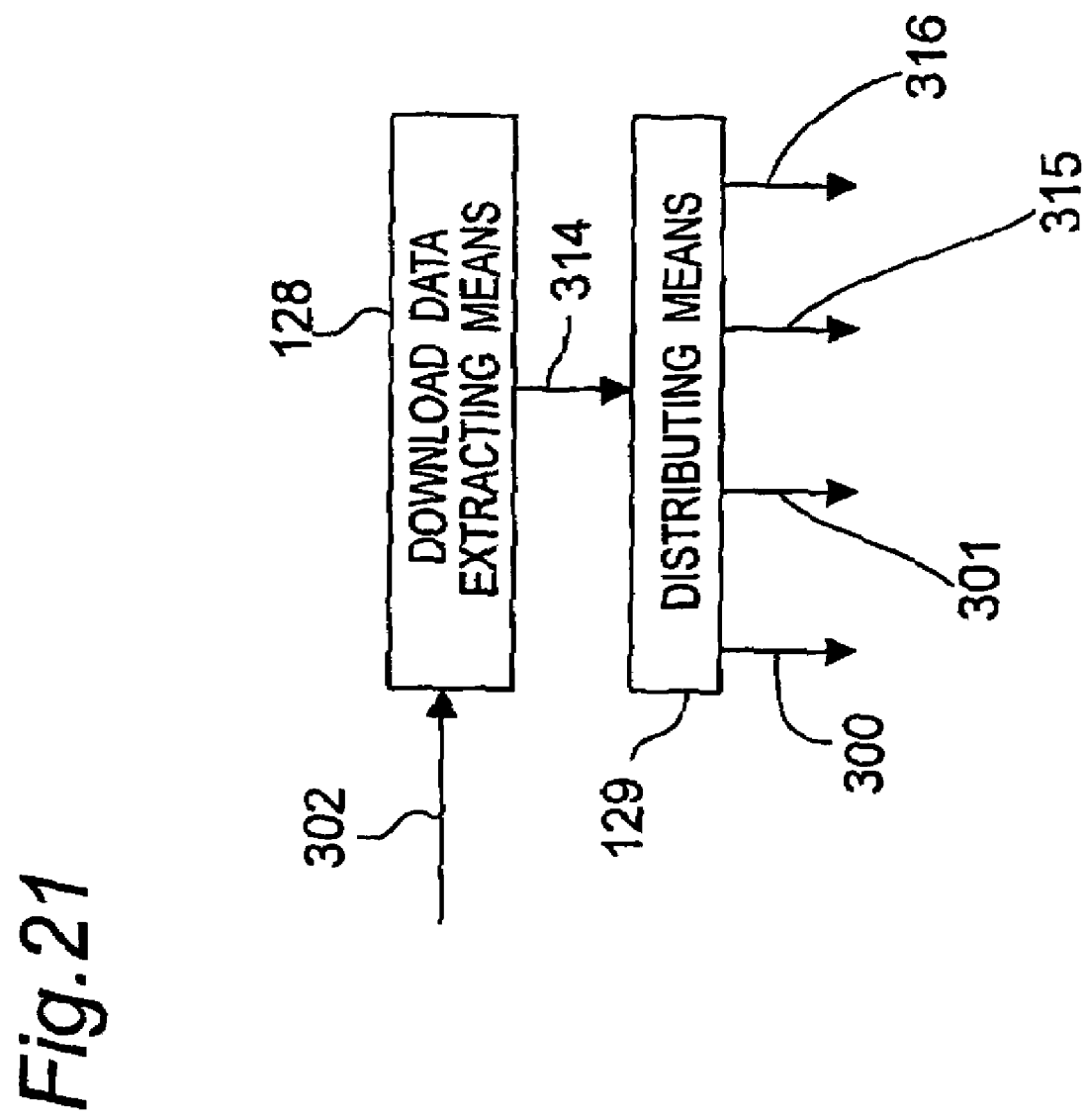
FIG. 21 is a view for explaining that various data is extracted and divided from download data in the fixed form data broadcast recording and/or playback apparatus.

In FIGS. 20 and 21, numeral 128 denotes download data extracting means for extracting download data inserted to a private packet of the MPEG transport stream and transmitted and 314 denotes a download signal extracted by the download data extracting means 128. The download signal 314 includes download fixed form data 322 for renewing the fixed form data 300, download insertion data 323 for renewing the insertion data 301, a state transition managing system signal 315 for instructing the managing method of the state transition managing means 114 and a state change informing system signal 316 for instructing the informing method of the state change informing means 113. Further, numeral 129 denotes distributing means that classifies the download fixed form data 322, download insertion data 323, state transition managing system signal 315 and state change informing system signal 316 included in the download signal 314 and delivers each to the recording medium controlling means 123, data inserting means 110, state transition managing means 114 and state change informing means 113 respectively.

The operation of the embodiment 8 of the invention will be explained hereinbelow.

The download data extracting means 128 simultaneously obtains the MPEG-TS signal 302 transmitted from the digital broadcast receiver 3 and stored in the recording medium 124 via the recording medium controlling means 123, and then, extracts the download signal 314 transmitted by being inserted into the private packet of the MPEG-TS signal 302. The download signal 314 extracted by the download data extracting means 128 is transmitted to the distributing means 129. The distributing means 129 confirms the content of the download signal 314, and if the download signal 314 is the fixed form data, it transmits the download fixed form data 322 extracted from the download signal 314 to the recording medium controlling means 123. The recording medium controlling means 123 replaces the fixed form data 300 already recorded on the recording medium 124 with the download fixed form data 322 transmitted from the distributing means 129 as fixed form data, thereby executing download of the fixed form data 300. Moreover, in a case where the distributing means 129 extracts the download insertion data 323 from the download signal 314 after confirming the content of the download signal 314, this extracted data is transmitted to the recording medium controlling means 123. The recording medium controlling means 123 replaces the insertion data 301 already recorded on the recording medium 124 with the data transmitted from the distributing means 129 as insertion data, thereby executing download of the insertion data 301. Further, the distributing means 129 can insert on real-time the download insertion data into the fixed form data broadcast as the insertion data 301 and transmit the same to the digital broadcast receiver by directly transmitting the download insertion data to the data inserting means 110. Additionally, in a case where the distributing means 129 extracts the state transition managing system signal 315 from the download signal 314 after confirming the content of the download signal 314, the state transition managing system signal 315 is transmitted to the state transition managing means 114. When the state transition managing means 114 receives the state transition managing system signal 315, it changes the managing method according to the signal. This operation can renew the managing method of the state transition managing means, thereby being capable of changing the control of the operation on the operation screen. Additionally, in a case where the distributing means 129 extracts the state change informing system signal 316 from the download signal 314 after confirming the content of the download signal 314, the state change informing system signal 316 is transmitted to the state change informing means 113. When the state change informing means 113 receives the state change informing system signal 316, it changes the state change informing method according to the signal. The change of the state change informing method can change the meaning of the event message, and its use together with the above-mentioned change of the state transition managing method enables the expansion of the feature of the application that can be realized by the fixed form data broadcast such as screen operation or the like.

By the above-mentioned construction, the fixed form data broadcast recording and/or playback apparatus 15 can realize the download of the fixed form data and insertion data recorded on the recording medium 124. Further, the state transition managing method of the state transition managing means 114 and the informing method of the state change informing means are changed, thereby being capable of realizing the expansion of the feature of the application that can be realized by the fixed form data broadcast.

Figure 22:
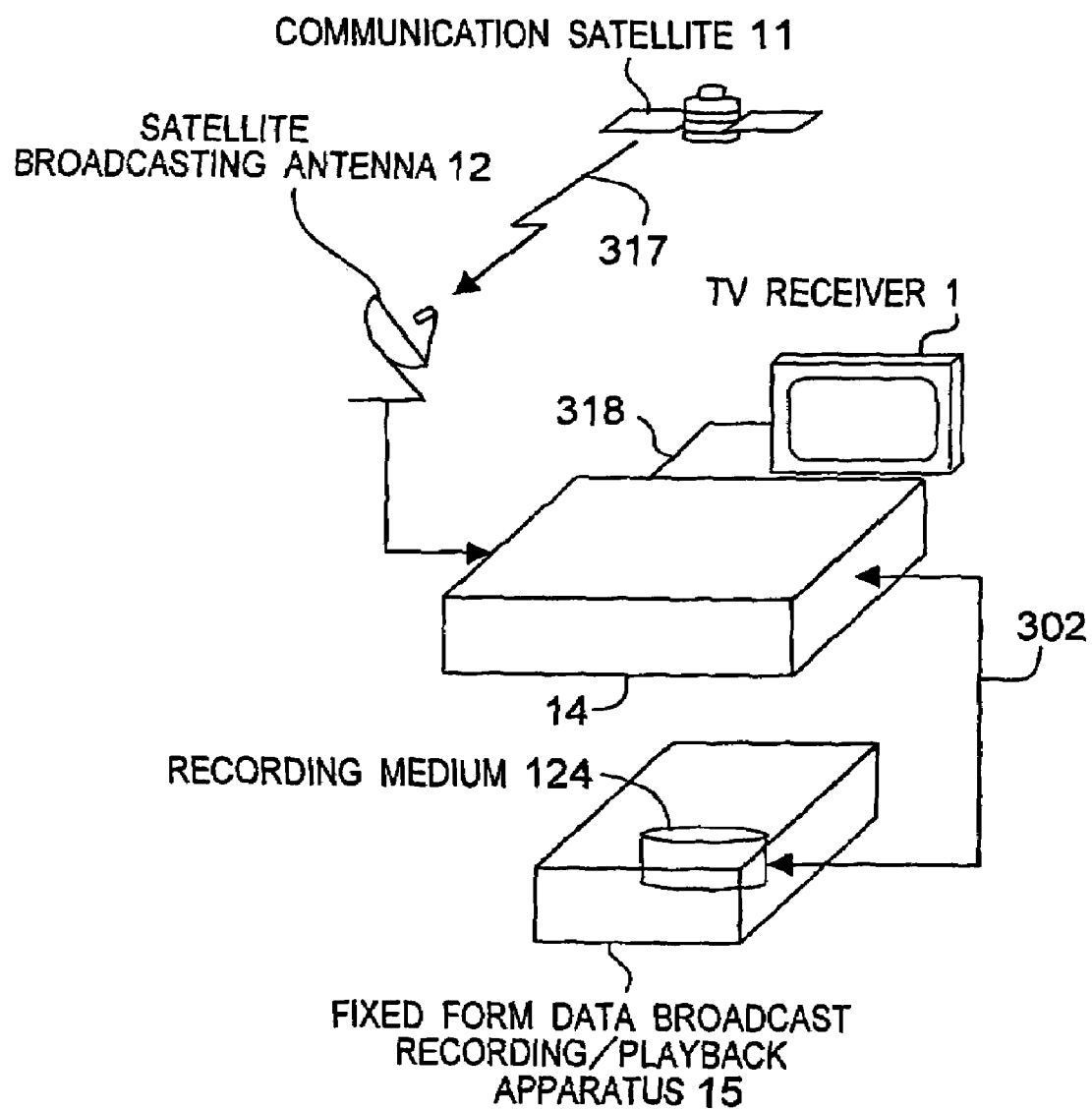
FIG. 22 is a conceptional view showing a method for realizing a storage datacasting using the fixed form data broadcast recording and/or playback apparatus.
Figure 23:
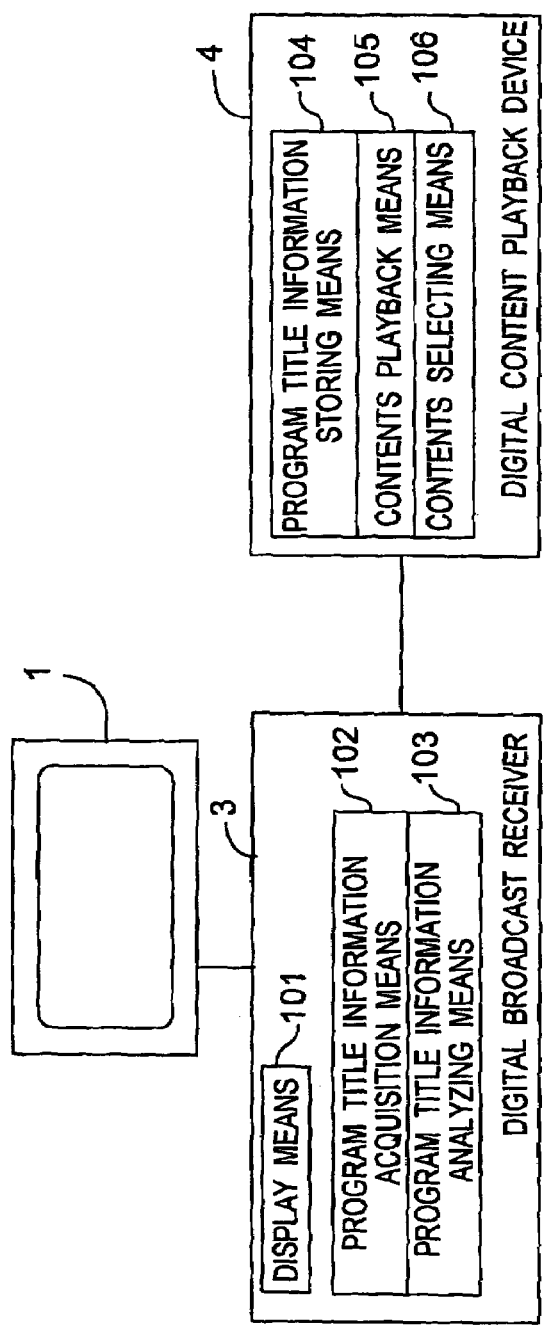
FIG. 23 is a block diagram showing a digital content playback environment 1 in a conventional recording and/or playback apparatus.
Figure 24:
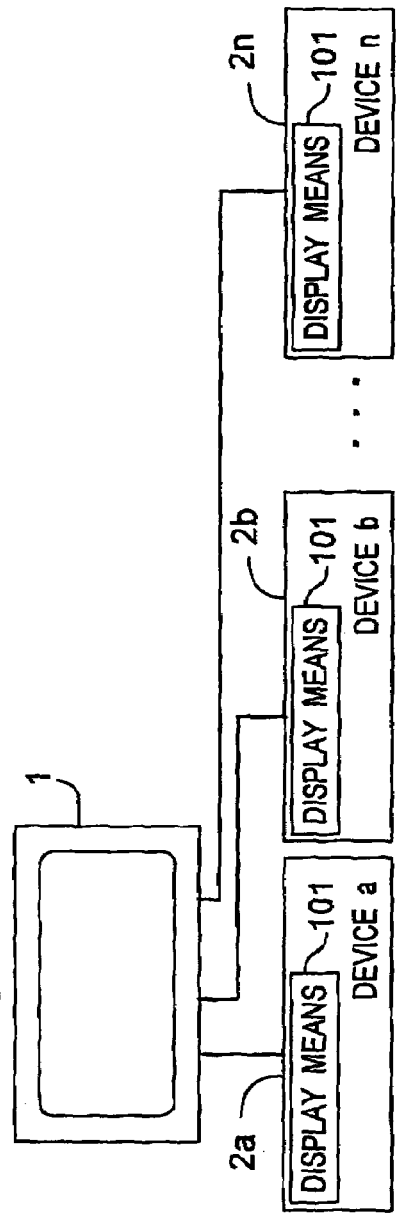
FIG. 24 is a block diagram showing a digital content playback environment 2 in the conventional recording and/or playback apparatus.
Figure 25:
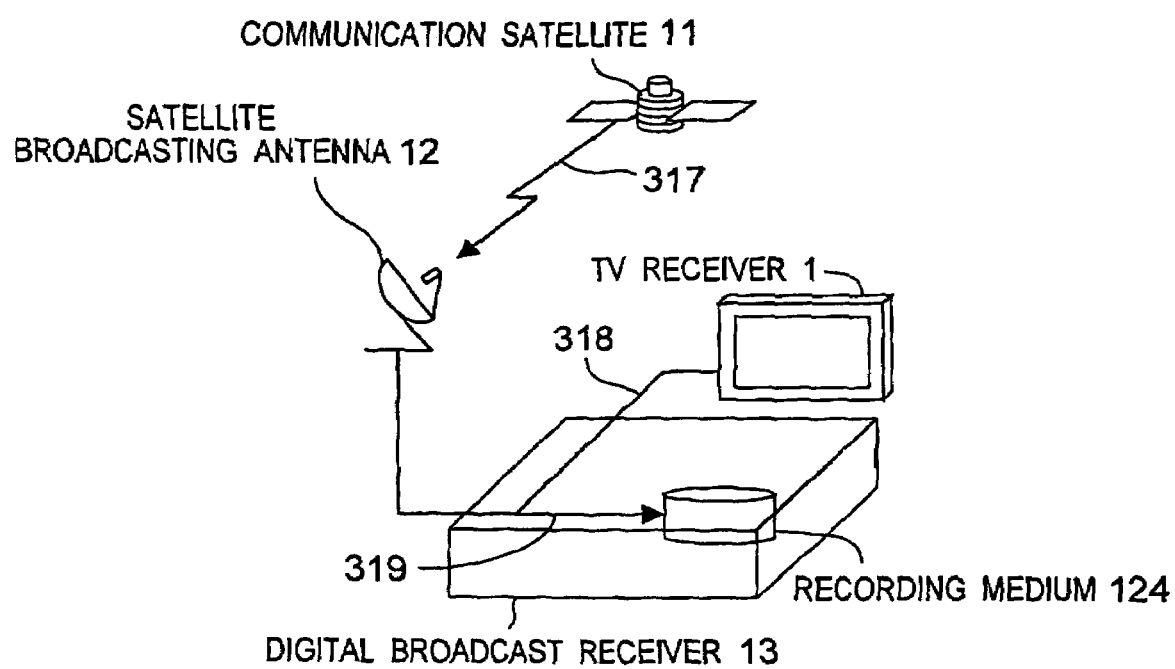
FIG. 25 is a conceptional view showing a method of realizing a conventional storage datacasting service.

FIG. 22 shows a method for realizing a storage datacasting service according to the embodiment 8.

In FIG. 22, numeral 317 denotes a satellite broadcasting signal, 318 denotes an image signal, 11 denotes a communication satellite that transmits the satellite broadcasting signal 317, 12 denotes a satellite broadcasting antenna that receives the satellite broadcasting signal 317 transmitted from the communication satellite 11, 14 denotes a conventional digital broadcast receiver, 1 denotes a TV receiver and 15 denotes a fixed form data broadcast recording and/or playback apparatus.

In FIG. 22, the conventional digital broadcast receiver 14 transmits the received satellite broadcasting signal 317 to the fixed form data broadcast recording and/or playback apparatus 15 as it is as the MPEG-TS signal 302. Since the download of the fixed form data and insertion data can be executed in the fixed form data broadcast recording and/or playback apparatus 15 as described above, the application and information data provided as the storage datacasting service can be stored in the fixed form data broadcast recording and/or playback apparatus 15 by inserting the aforesaid application and data to the MPEG-TS as a private packet and broadcasting them as the satellite broadcasting signal 317. When the user wants to utilize the data broadcast, he/she can take out the data stored in the fixed form data broadcast recording and/or playback apparatus 15 by playback the fixed form data broadcast.

This construction can newly realize a service equivalent to the existing storage datacasting service by using the conventional digital broadcast receiver without newly introducing the digital broadcast receiver 13 exclusively used for the storage datacasting. Further, the capacity of the recording medium can easily be expanded by additionally mounting the fixed form data broadcast recording and/or playback apparatus 15.

Embodiment 9

The embodiment 9 explains a construction where the fixed form data broadcast and the image already recorded is multiplexingly displayed (corresponding to claim 20).

Figure 26:
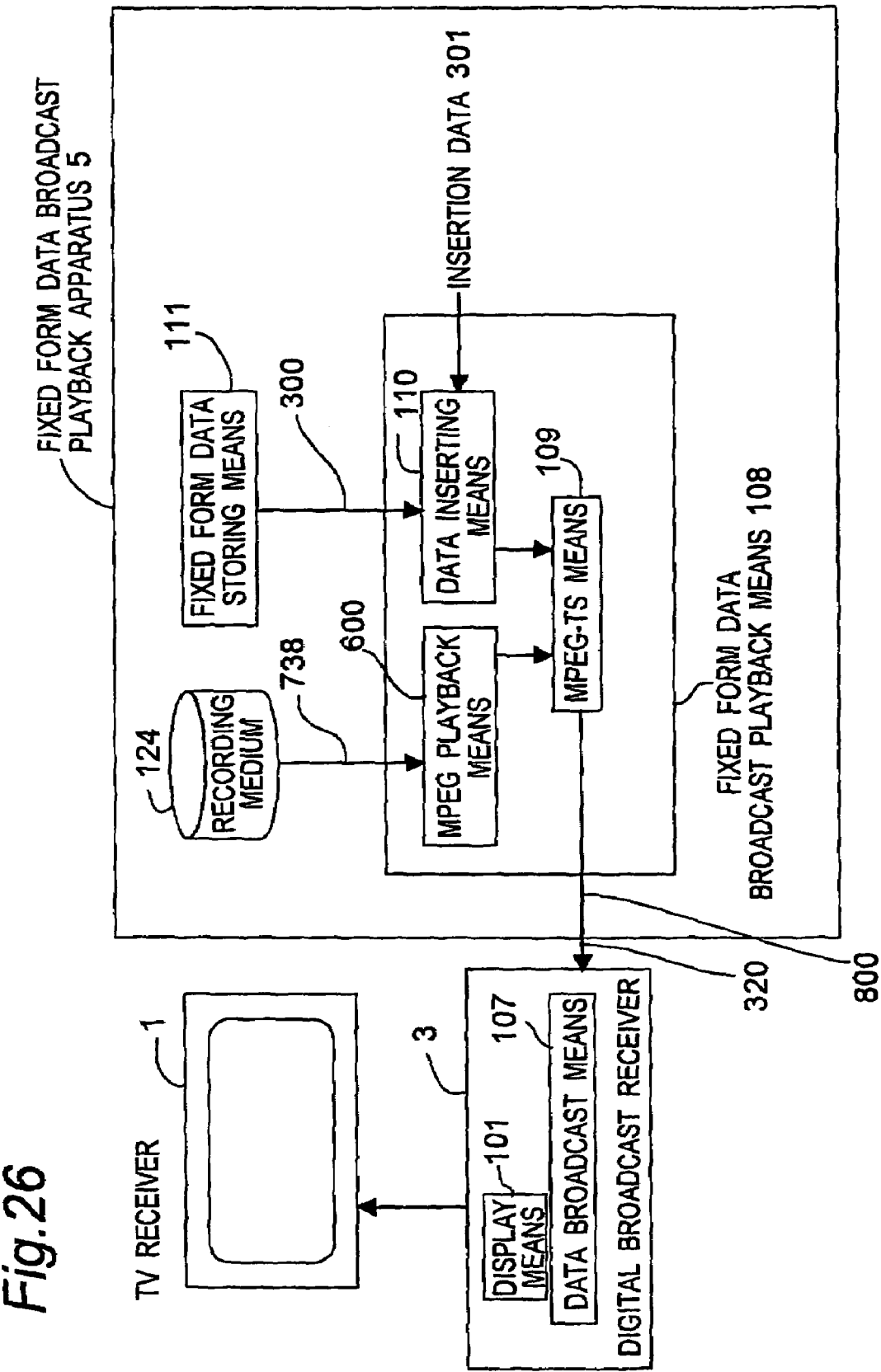
FIG. 26 is a block diagram showing a construction of a fixed form data broadcast playback apparatus in an embodiment 9 of the present invention.

FIG. 26 is a block diagram showing a construction of the fixed form data broadcast playback apparatus that reproduces fixed form data broadcast for displaying the internal state of the fixed form data broadcast playback apparatus and an image already recorded via a digital broadcast receiver 3 and a connection environment to the receiver. The fixed form data broadcast playback apparatus 5 comprises fixed form data storing means 111, data inserting means 110, recording medium 124, MPEG playback means 600 and MPEG-TS means 109. Further, the digital broadcast receiver 3 has display means 101 and data broadcast means 107.

The data broadcast means 107 provided at the digital broadcast receiver 3 is a function generally incorporated to the digital broadcast receiver of BS (Broadcasting Satellite) digital broadcast, the detail of which is disclosed in, for example, Japanese Unexamined Patent Application No. HE110-304325 titled as "digital broadcast system, digital broadcast apparatus and receiver in digital broadcast apparatus". In this data broadcast, a program written by a language of so-called BML (Broadcast Markup Language) or image data for displaying or the like is sent to the digital broadcast receiver 3 via a broadcast wave. A user can enjoy various services realized by the data broadcast by operating the digital broadcast receiver 3. The data broadcast means 107 operates not only when the digital broadcast receiver 3 receives data broadcast from the broadcast wave but also when it receives the same via a digital connection called IEEE 1394 interface. Specifically, the data broadcast means 107 also operates by the playback operation of the playback apparatus connected to the digital broadcast receiver 3.

Each component in the embodiment shown in FIG. 26 will be explained hereinbelow.

FIG. 26 shows the fixed form data broadcast playback apparatus 5. Numeral 300 denotes fixed form data that is a prescribed form of the data broadcast transmitted from the fixed form data broadcast playback apparatus 5. Numeral 301 denotes insertion data representing a state of the fixed form data broadcast playback apparatus 5 or the like. Numeral 111 denotes means for storing the fixed form data 300 into storing means (not shown) in the apparatus. Numeral 110 denotes data inserting means for inserting insertion data 301 into the fixed form data 300. Numeral 124 denotes a recording medium that stores the image already recorded. Numeral 600 denotes MPEG playback means that obtains a corresponding image stream from the recording medium 124. Numeral 109 denotes means for transmitting the MPEG image obtained by the MPEG playback means 600 and the data obtained by the data inserting means 110 as an MPEG transport stream (hereinafter abbreviated as MPEG-TS). Numeral 320 denotes a digital interface for sending and receiving a digital signal between the fixed form data broadcast playback apparatus 5 and the digital broadcast receiver 3. Numeral 800 denotes a fixed form data playback stream reproduced via the digital interface 320.

The operation of the fixed form data broadcast playback apparatus 5 having the above-mentioned construction will be explained hereinbelow in accordance with the drawings.

When receiving a request for starting the playback operation, the fixed form data broadcast playback apparatus 5 transmits the fixed form data 300 that is prescribed form data of the data broadcast to the fixed form data broadcast playback means 108 from the fixed form data storing means 111. The data inserting means 110 possessed by the fixed form data broadcast playback means 108 obtains the insertion data 301 showing the internal state of the fixed form data broadcast playback apparatus 5, and writes its data to the fixed form data 300. On the other hand, the image recorded in the form of MPEG-TS by a program recording reservation or the like is supposed to be stored in the recording medium 124. The description about the construction and processing for recording is omitted here. The MPEG playback means 600 obtains the MPEG-TS corresponding to the predetermined image from the recording medium 124. The MPEG-TS means 109 makes its fixed form data obtained from the data inserting means 110 and the MPEG playback means 600 and the MPEG image into a packet of data in a small unit that is a form of a transport stream of the MPEG-TS and transmits the resultant to the digital broadcast receiver 3. The fixed data broadcast playback stream 800 transmitted from the fixed form data broadcast playback apparatus 5 is transmitted to the digital broadcast receiver 3 via the digital interface 320, interpreted by the data broadcast means 107 and executed. The data broadcast means 107 displays the internal state of the fixed form data broadcast playback apparatus 5 by the display means 101 and the TV receiver 1. As a result, the user can be informed of the internal state of the fixed form data broadcast playback apparatus 5 via the display screen of the digital broadcast receiver 3 even if the digital broadcast receiver 3 does not have control means for controlling the fixed form data broadcast playback apparatus 5.

The method for urging the fixed form data broadcast playback apparatus 5 to perform the playback operation in the above-mentioned explanation can also be performed by a command for a device that does not have a function for displaying the internal state of the fixed form data broadcast playback apparatus, the examples of which include a VCR command for a tape that is sent and received on the IEEE 1394 interface. The same effect can be provided to the user by utilizing a button on the main body of the fixed form data broadcast playback apparatus 5, an exclusive remote controller for the fixed form data broadcast playback apparatus 5 or the like.

The use of the construction of the embodiment 9 can solve the sixth subject that the existing digital broadcast receiver cannot multiplexingly display an image recorded by an external device and its operational state with a new representation disclosed in the "subjects that the invention is to solve".

Subsequently explained in detail is the function of the fixed form data broadcast playback means 108 in the embodiment 9.

As explained in the embodiment 1, FIG. 2 shows one example of a processing performed by the data inserting means 110, and in particular, the operating content thereof is explained taking as on example the data structure of the data broadcast used in the BS digital broadcast, the explanation of which is omitted here.

Next, the operation of the MPEG playback means 600 will be explained (corresponding to claim 22).

Figure 27:
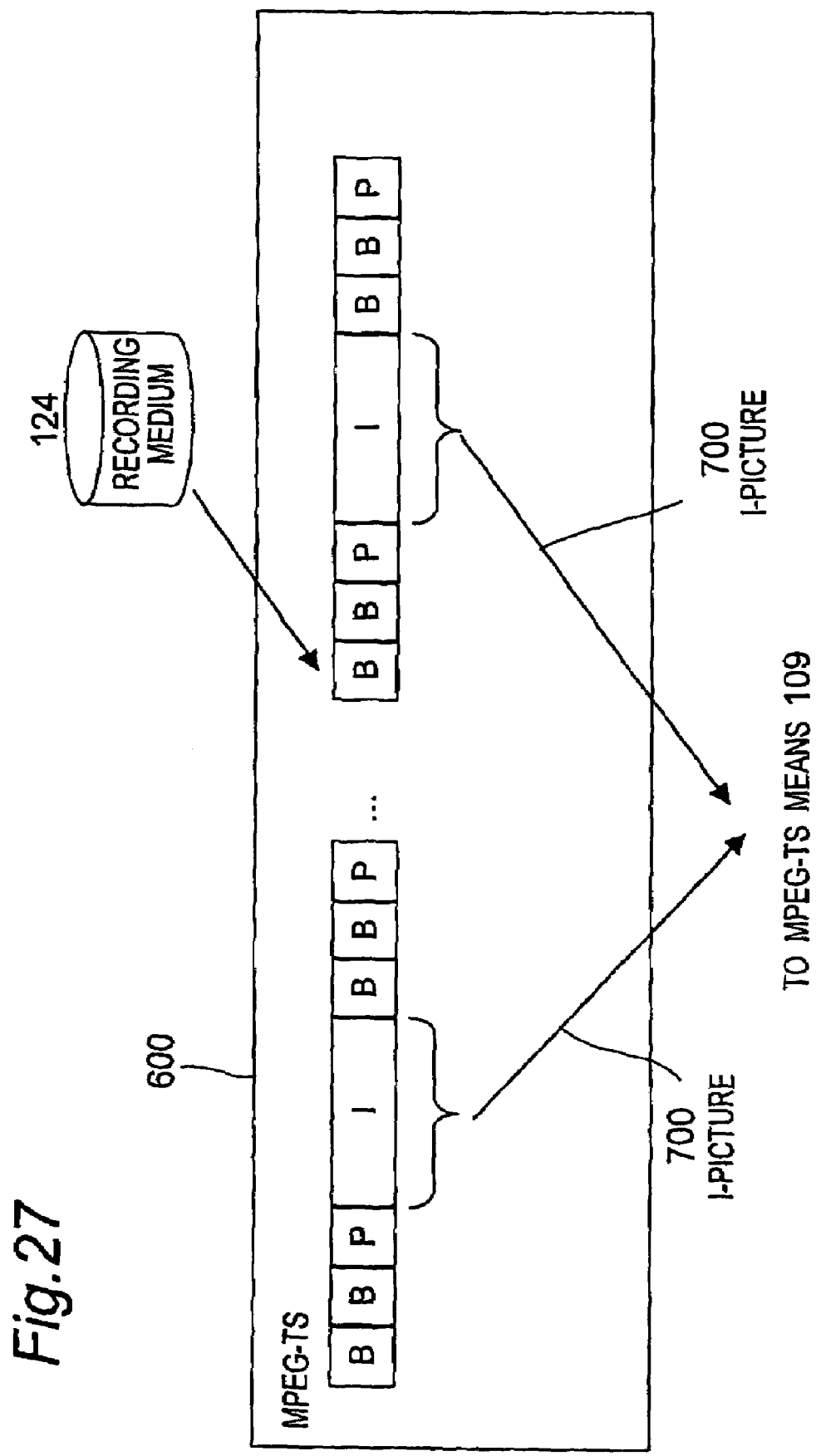
FIG. 27 is a conceptional view showing an embodiment 1 of the MPEG playback means in the fixed form data broadcast playback apparatus.

FIG. 27 shows the first example relating to the MPEG playback means 600. The basic construction is supposed to be composed of the aforesaid embodiment 9. The image recorded in the form of MPEG-TS by the program recording reservation or the like is stored in the recording medium 124. The explanation and construction concerning the recording of the image are omitted here. The MPEG playback means 600 obtains the MPEG-TS corresponding to the predetermined image from the recording medium. The obtained data is composed of three kinds of pictures I (Intraframe), B (Bidirectional) and P (Predictive) as shown in the figure. The MPEG playback means 600 extracts only the I picture from the obtained pictures, and transmits the same to the MPEG-TS means 109 at the following stage. The above-mentioned extraction of the I-picture is continued. The continued extraction of the I-picture can realize a fast-forward playback and rewinding playback.

Subsequently, the operation of the MPEG-TS means 109 will be explained.

Figure 28:
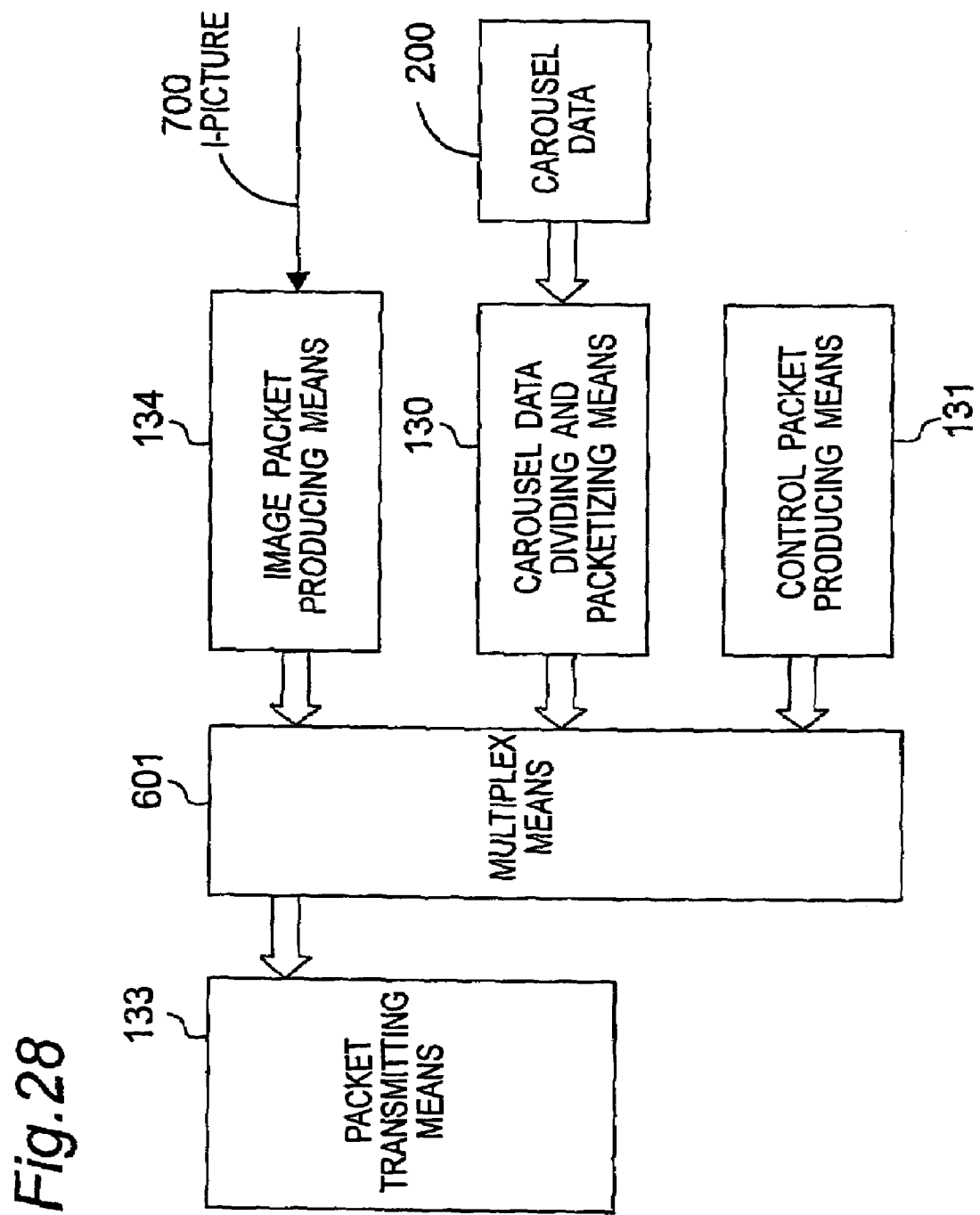
FIG. 28 is a functional block diagram of the MPEG-TS means in the fixed form data broadcast playback apparatus.

The MPEG-TS means 109 reconstructs the carousel data 200 formed by the data inserting means 110 and the I-picture 700 extracted from the MPEG playback means 600 as the MPEG-TS. FIG. 28 shows one example of a processing method of transmitting the formed carousel data and I-picture as the MPEG-TS data. In FIG. 28, numeral 134 denotes image packet producing means that produces a MPEG-TS packet prescribed by MPEG standard from the extracted I-picture 700. Numeral 130 denotes carousel data dividing and packetizing means that produces the MPEG-TS packet prescribed by MPEG standard from the carousel data 200. Numeral 131 denotes control packet producing means that produces PAT (Program Association Table), PMT (Program Map Table) or PCR (Program Clock Reference) prescribed by MPEG standard. Numeral 601 denotes multiplex means that suitably multiplexes the packets produced by these means on a time axis method and has a function for renewing the continuous index of the data. Numeral 133 denotes packet transmitting means that transmits packet data on a bus. These constructions enable to transmit the data of the data carousel produced by the data inserting means 110 and the I-picture produced by the MPEG playback means 600.

Figure 29:
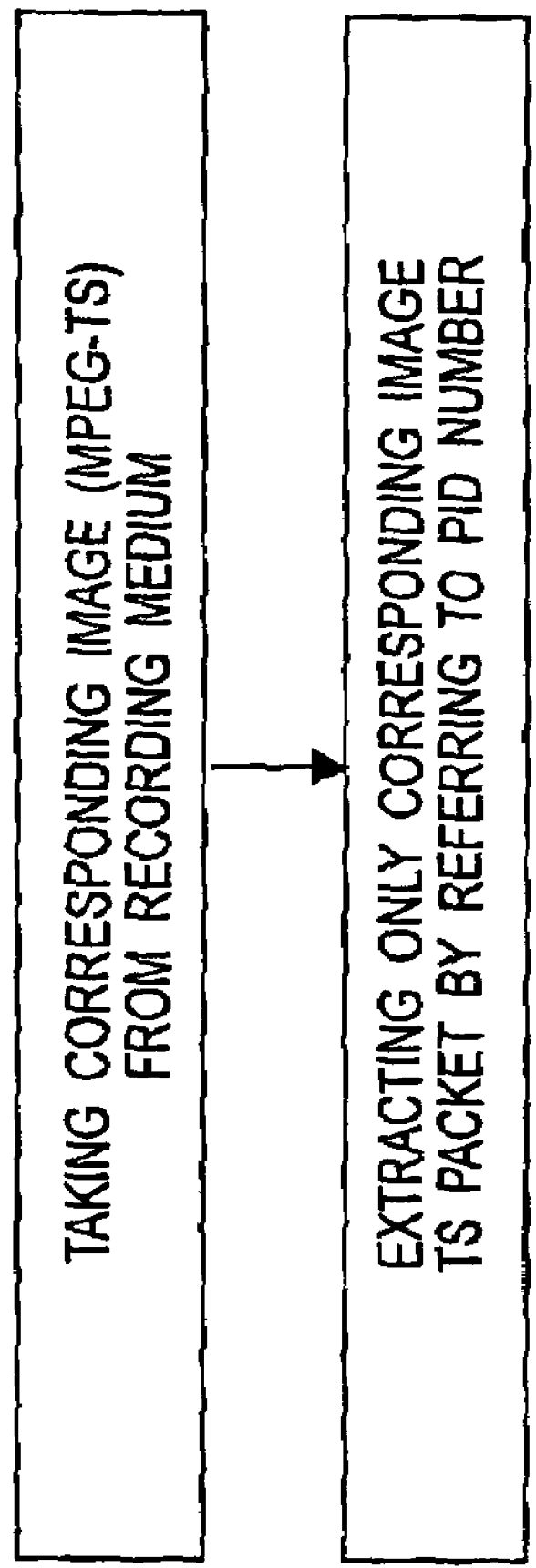
FIG. 29 is a view showing a processing flowchart of image TS packet producing means in the fixed form data broadcast playback apparatus.

FIG. 29 is a processing flow chart 1 for explaining the operation in the image packet producing means 134 in FIG. 28. The image packet producing means 134 extracts only a packet including an image to be displayed by referring to PID (Packet Identification) in order to eliminate PSI information or PCR information included in the original image and transmits the resultant to the following means. This processing eliminates from the recorded MPEG-TS packet unnecessary information such as PSI (Program Specific Information) information or PCR (Program Clock Reference) information.

Figure 30:
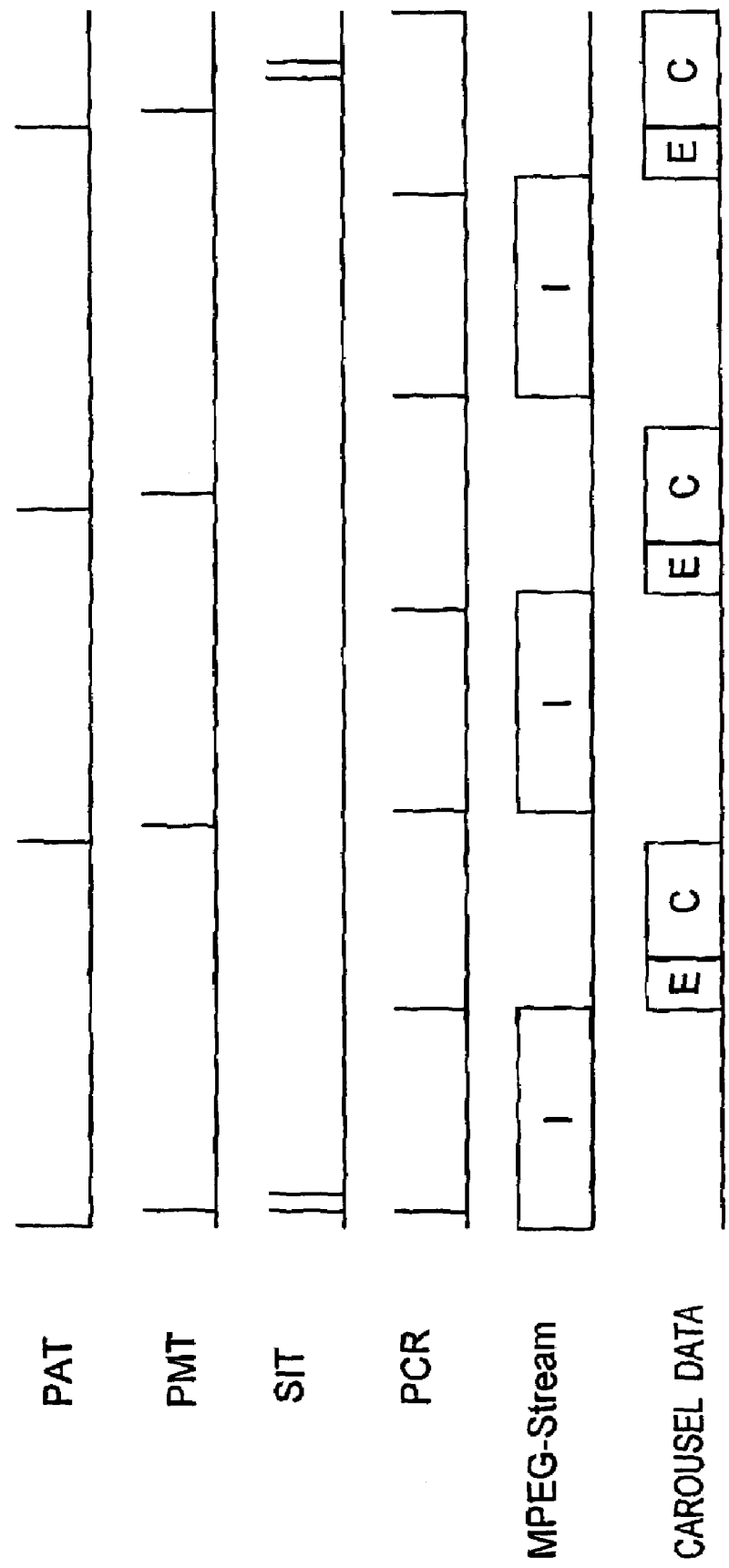
FIG. 30 is a timing chart showing a timing of a multiplex in the fixed form data broadcast playback apparatus.

FIG. 30 is a multiplex timing chart for explaining the operation in the multiplex means 601 in FIG. 28. In this figure, the axis of abscissa means a time change. The multiplex means 601 multiplexes, at the timing shown in FIG. 30, the newly produced PAT, PMT, SIT and PCR, MPEG-Stream produced by the image packet producing means 134 and the carousel data produced by the carous I data dividing and packetizing means 130. Since the I-picture is only extracted in this embodiment 9, this is represented by "I" in FIG. 30. The multiplex means 601 includes not only the multiplex function but also a function for correctly re-giving the continuous index of the packet. The multiplex means 601 transmits the I-picture at a predetermined interval and causes the carousel data to be inserted into this interval as shown in FIG. 30. A timer of a CPU or hardware timer can be used as means for determining the predetermined interval. The carousel data shown in FIG. 30 means the carousel data shown in FIG. 2. The sections "C" correspond to this carousel data. FIG. 30 includes the sections "E" that are not used in this embodiment 9, but used in the embodiments described later.

Although the fixed form data storing means 111 for storing the fixed form data and the recording medium 124 for storing the image are disclosed so as to be different from each other as shown in FIG. 26, these may actually be arranged in the same memory medium.

Further, a value for changing the shape of the display screen can be inserted as the insertion data 301 in FIG. 26.

Embodiment 10

The embodiment 10 of the present invention explains an example in which not only the I-picture but also a moving image is simultaneously and multiplexingly displayed in the construction explained in the embodiment 9 (corresponding to claim 22). The basic construction is the same as that explained in the embodiment 9, so that the explanation thereof is omitted.

Figure 31:
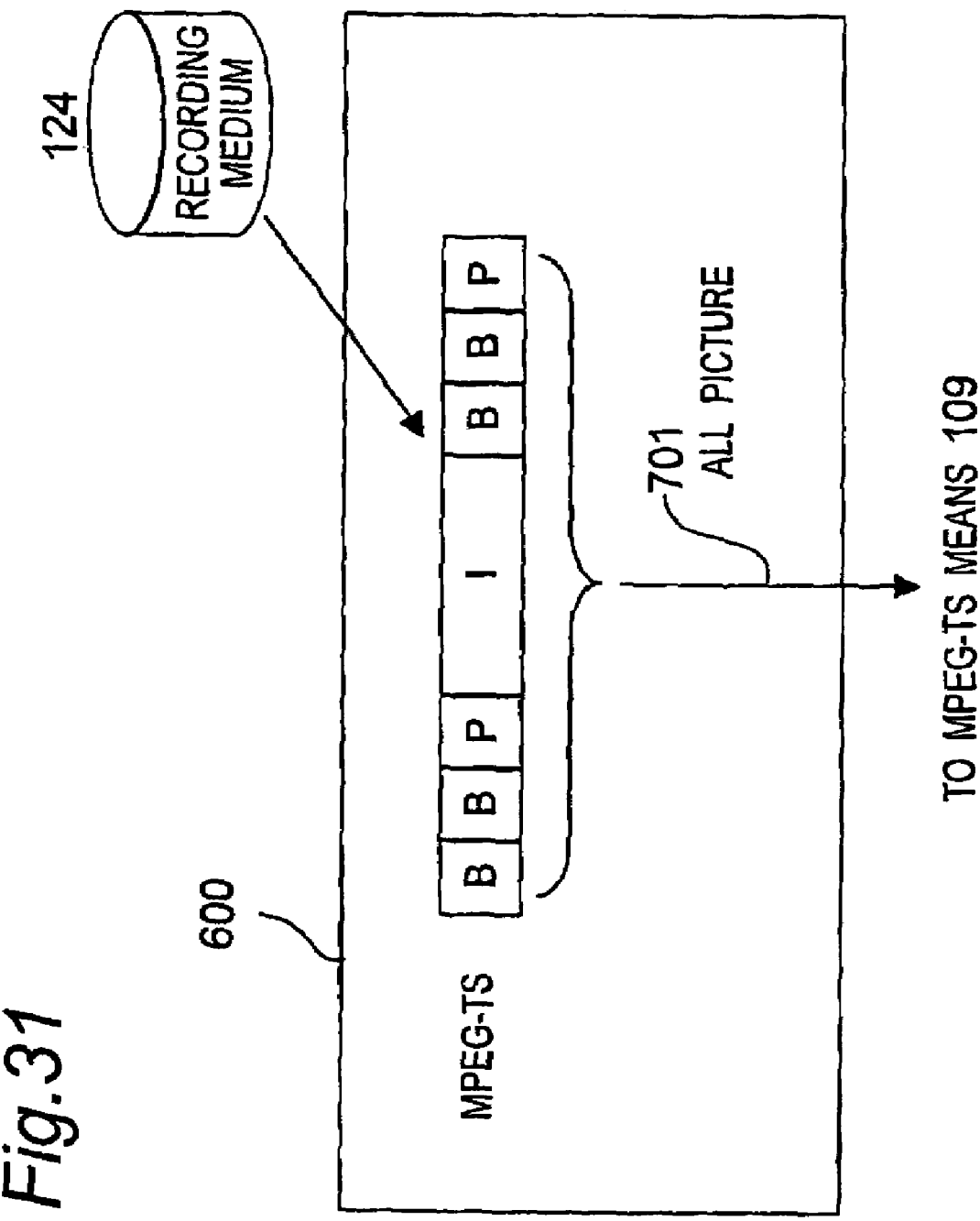
FIG. 31 is a conceptional view showing an embodiment 2 of the MPEG playback means in the fixed form data broadcast playback apparatus.

FIG. 31 shows the second example relating to the MPEG playback means 600 (corresponding to claim 22). The image recorded in the form of MPEG-TS by the program recording reservation or the like is supposed to be stored in the recording medium 124. The MPEG playback means 600 obtains the MPEG-TS corresponding to the predetermined image from the recording medium 124. The obtained data comprises three kinds of pictures I, B and P as shown in the figure. The MPEG playback means 600 transmits the obtained pictures to the MPEG-TS means 109 at the following stage as all-picture 710 without changing the order of the pictures. The MPEG playback means 600 not only reproduces the MPEG-TS section disclosed in FIG. 31 but also continuously reproduces each picture one by one with the procedure of the normal playback.

Subsequently, the operation of the MPEG-TS means 109 will be explained.

Figure 32:
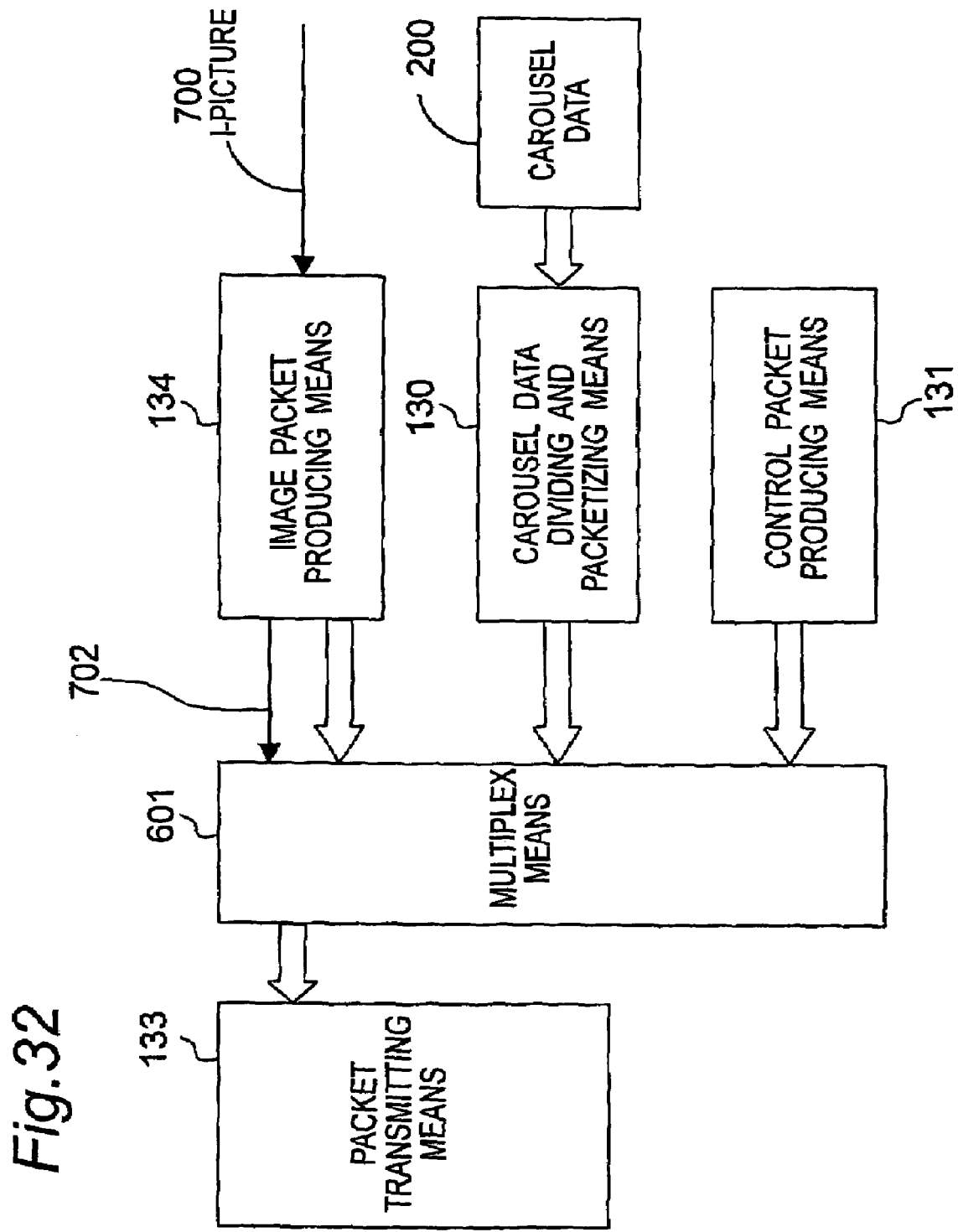
FIG. 32 is a functional block diagram of the MPEG-TS means in the fixed form data broadcast playback apparatus.

The MPEG-TS means 109 reconstructs the carousel data 200 formed by the data inserting means 110 and the all-picture 701 extracted from the MPEG playback means 600 as the MPEG-TS. FIG. 32 shows one example of a processing method of transmitting the formed carousel data and all-picture 701 as the MPEG-TS data. In FIG. 32, numeral 134 denotes image packet producing means that produces a packet prescribed by MPEG standard from the extracted all-picture 701. Numeral 130 denotes carousel data dividing and packetizing means that produces the packet prescribed by MPEG standard from the carousel data 200. Numeral 131 denotes control packet producing means that produces PAT, PMT or PCR prescribed by MPEG standard. Numeral 601 denotes multiplex means that suitably multiplexes the packets produced by these means on a time axis method and has a function for renewing the continuous index of the data. Numeral 133 denotes packet transmitting means that transmits packet data on a bus. These constructions enable to transmit the data of the data carousel produced by the data inserting means 110 and the MPEG image produced by the MPEG playback means 600.

Figure 33:
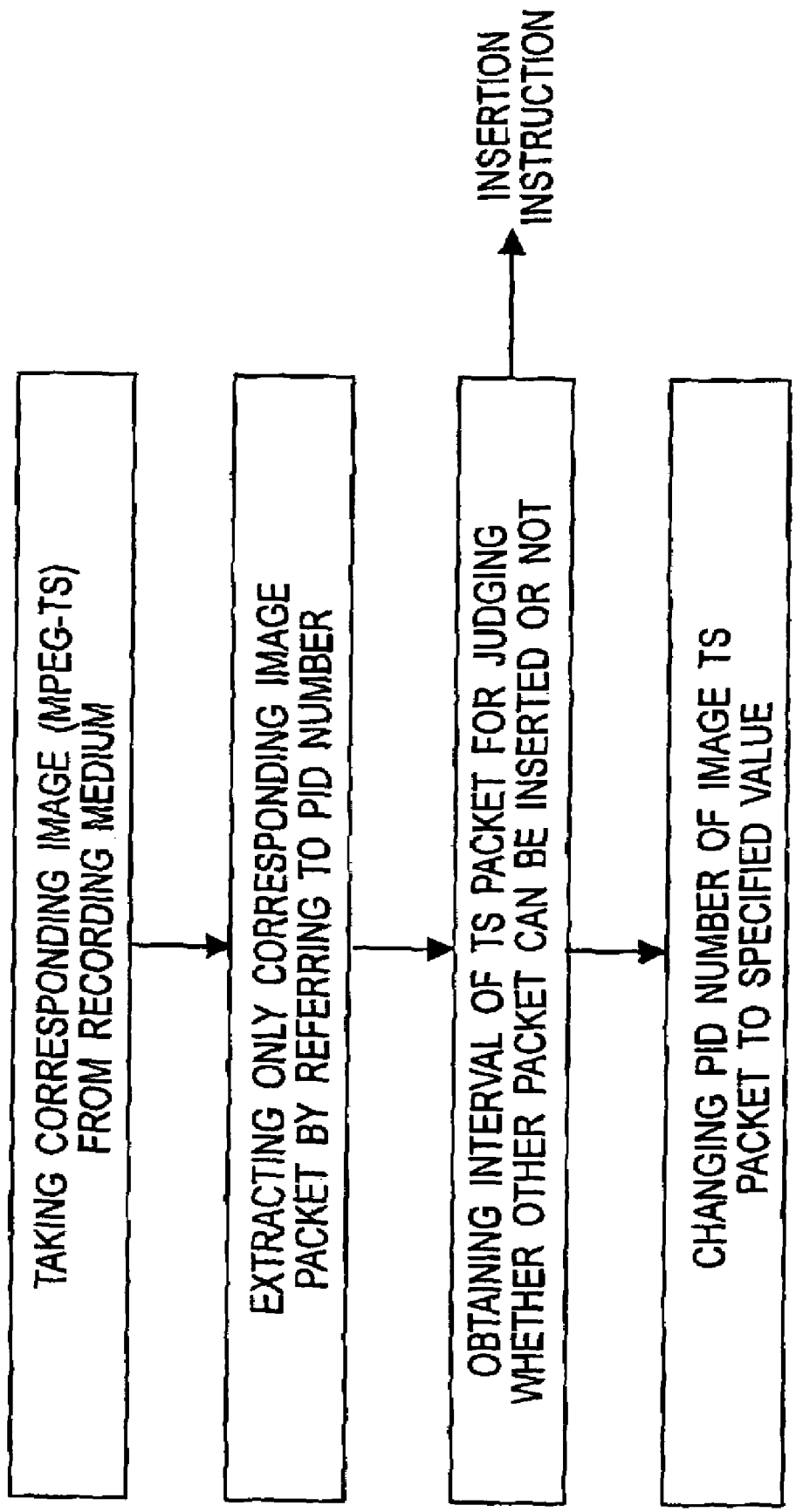
FIG. 33 is a view showing a processing flowchart of image TS packet producing means in the fixed form data broadcast playback apparatus.

FIG. 33 is a processing flow chart for explaining the operation in the image packet producing means 134 in FIG. 32. The image packet producing means 134 extracts only a packet including an image to be displayed by referring to PID (Packet Identification) in order to eliminate PSI information or PCR information included in the original image. Then, it obtains time interval of each TS packet and judges whether other packet can be inserted or not. In a case where the interval of the TS packet corresponds to not more than a half of the maximum bit rate of the MPEG-TS, it judges that the other packet can be inserted (not shown). The insertion judging information 702 is transmitted to the following multiplex means 601. The image packet means 134 changes the PID number of the image TS packet to the other specified value at the last stage. This change of the PID number may be executed at the first half of the processing.

Figure 34:
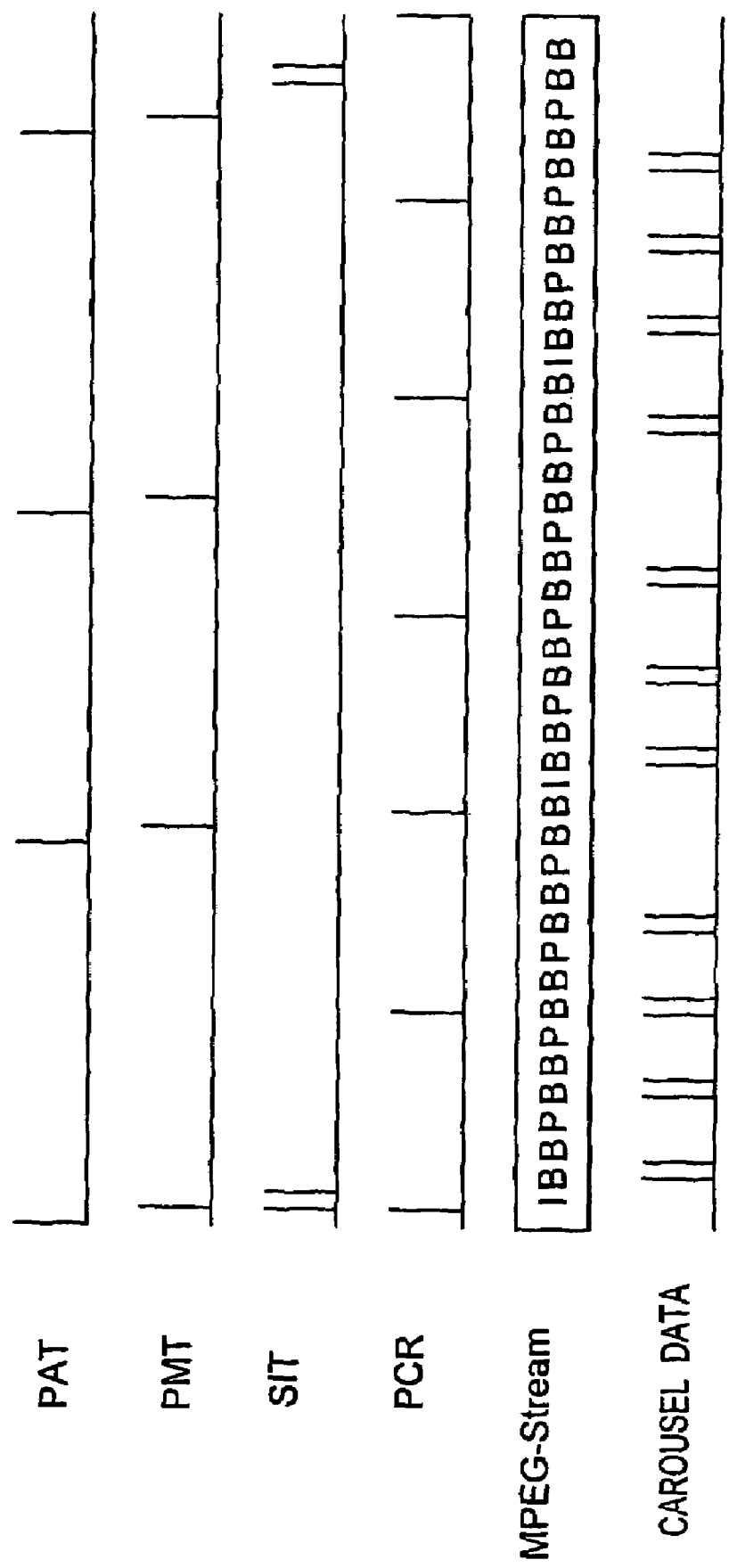
FIG. 34 is a timing chart showing a timing of a multiplex in the fixed form data broadcast playback apparatus.

FIG. 34 is a multiplex timing chart for explaining the operation in the multiplex means 601 in FIG. 32. In this figure, the axis of abscissa means a time change. The multiplex means 601 multiplexes, at the timing shown in FIG. 34, the newly produced PAT, PMT, SIT, PCR, MPEG-Stream produced by the image packet producing means 134 and the carousel data produced by the carousel data dividing and packetizing means 130.

The point that this embodiment 10 is different from the embodiment 9 is clearly represented in FIGS. 30 and 34. The I-picture 700 is inserted at a constant interval in FIG. 30. On the other hand, the method shown in FIG. 34 is such that, since a great gap is not present in FIG. 34, the interval between packets is counted and the carousel is inserted into a gap that is found out. FIG. 34 does not express the individual MPEG-TS packet composing the MPEG-TS data. Specifically, FIG. 34 expresses the MPEG-TS as one packet, so that the interval between the packets is not expressed. In this figure, it is considered that the position of the carousel data expressed on a pulse corresponds to the section where the interval between packets is present. The embodiment 9 is effective for the case where a predetermined fixed form data broadcast is simultaneously displayed during the display of the fast-forward playback using the I-picture, while the embodiment 10 is effective for the case where a predetermined fixed form data broadcast is simultaneously displayed during the normal playback.

As described above, the embodiment 10 can also solve the sixth subject that the existing digital broadcast receiver cannot multiplexingly display an image recorded by an external device and its operational state with a new representation disclosed in the "subjects that the invention is to solve".

Embodiment 11

Subsequently, the embodiment 11 explains a problem occurring upon using the embodiments 9 and 10 and a construction for solving this problem (corresponding to claim 24).

Figure 35:
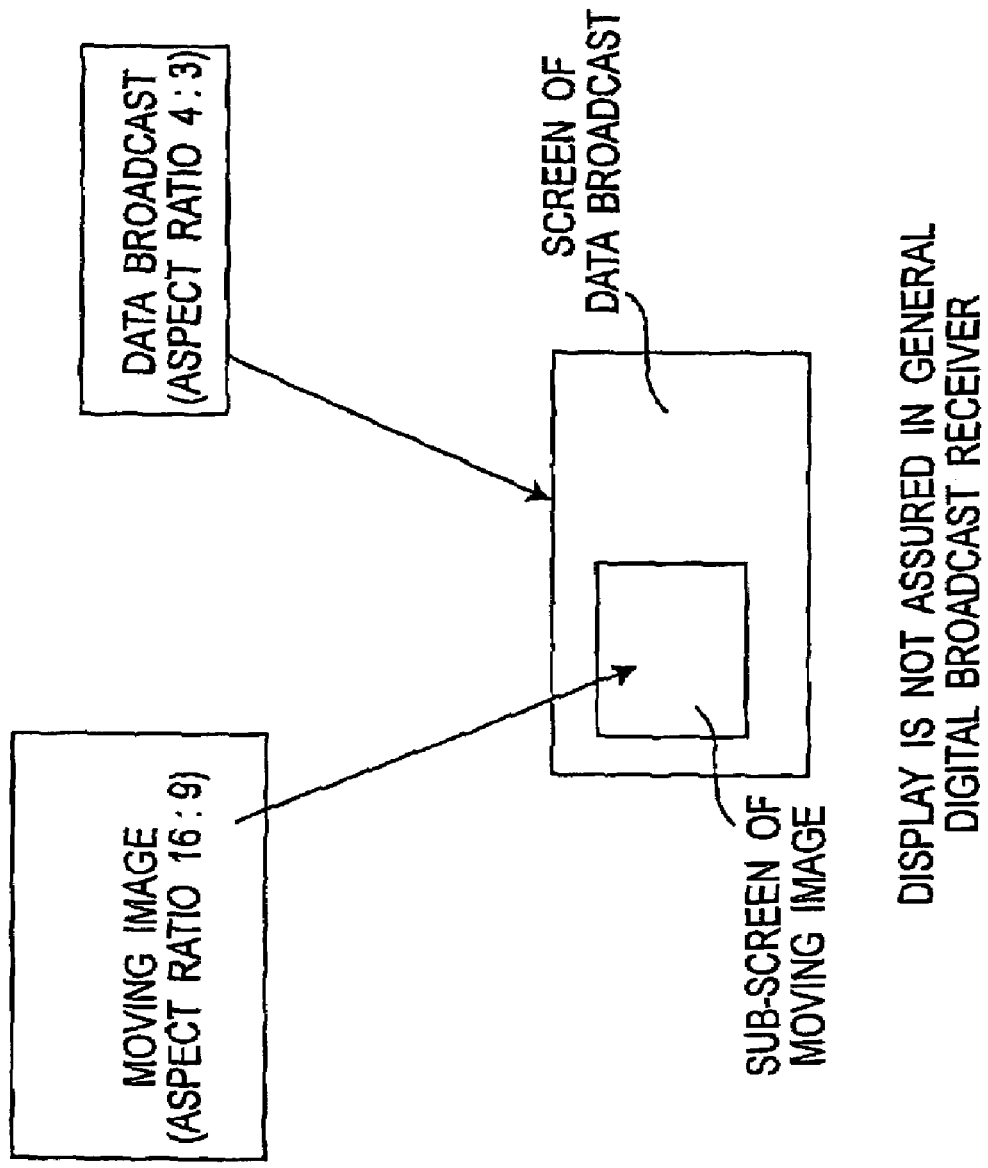
FIG. 35 is a conceptional view for explaining a problem in a case where a moving image and data broadcast are simultaneously displayed.

The embodiments 9 and 10 entail a problem that there is generally no assurance that a correct display is performed in a case where the aspect ratio of the fixed form data and the image data is different. FIG. 35 visually shows this phenomena. An upper-right rectangular is data broadcast having an aspect ratio of 4:3, while an upper-left rectangular is image data having an aspect ratio of 16:9. A general BS digital broadcast receiver has a problem of not correctly displaying such data each having different aspect ratio on one screen. Further, as is well-known, images having different aspect ratio such as 4:3 or 16:9 are mixedly broadcasted every channel or every program in the digital broadcast.

In order to solve the above-mentioned problem, the embodiment 11 is provided with stream information extracting means 602 and fixed form selecting means 603 in addition to the construction shown in the embodiment 9. The other constructions are the same as those explained in the embodiment 9, so that the explanation thereof is omitted.

Figure 36:
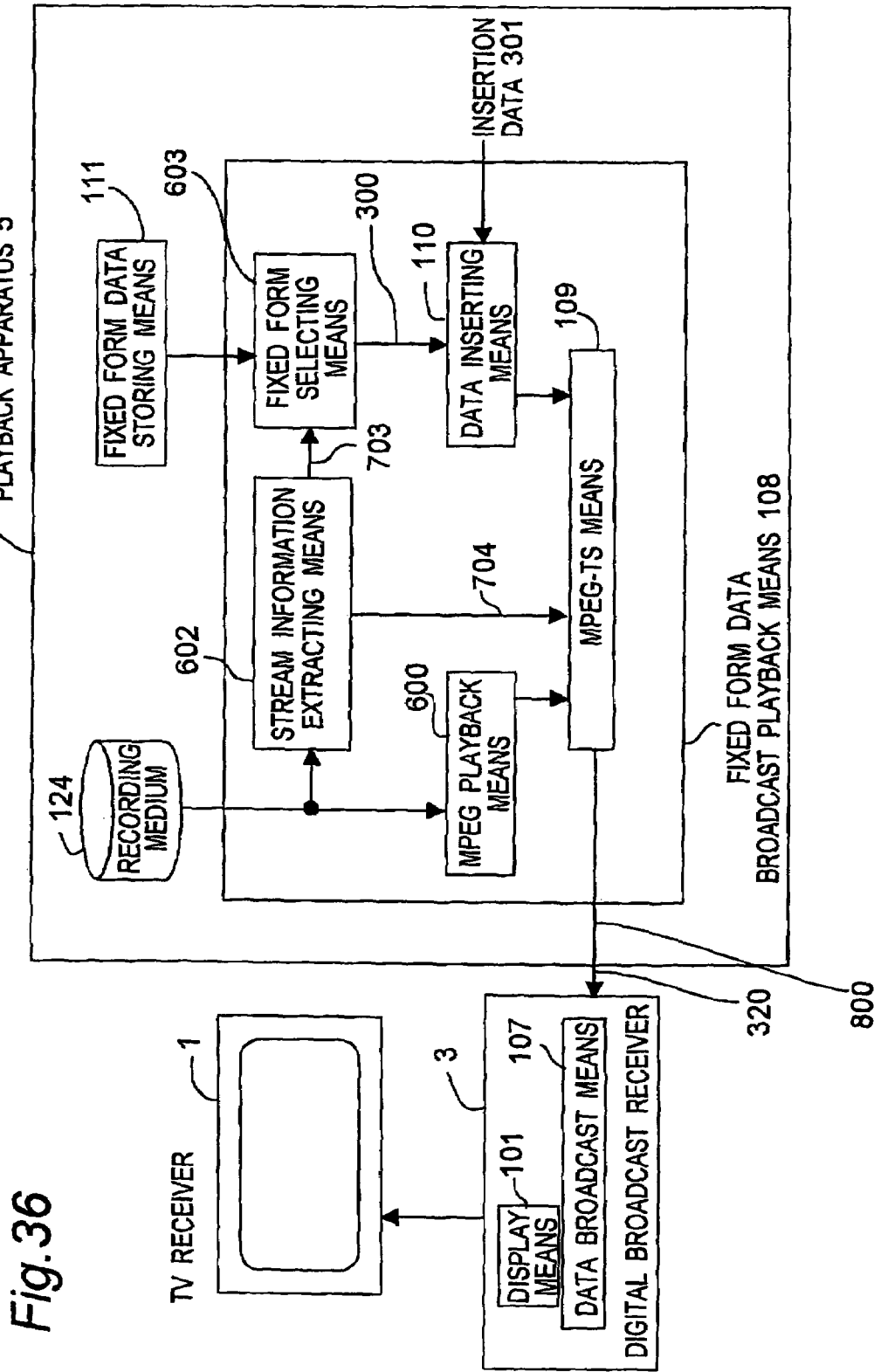
FIG. 36 is a block diagram showing a construction of a fixed form data broadcast playback apparatus in an embodiment 11 of the present invention.

In FIG. 36, numeral 602 denotes stream information extracting means that extracts an aspect ratio of an image and pixel information from the image data stored in the recording medium 124. Numeral 603 denotes fixed form selecting means that selects fixed form data having a suitable aspect ratio and pixel number among the fixed form data prepared in advance based upon a fixed form selection signal 703 judged by the stream information extracting means 603.

Figure 37:
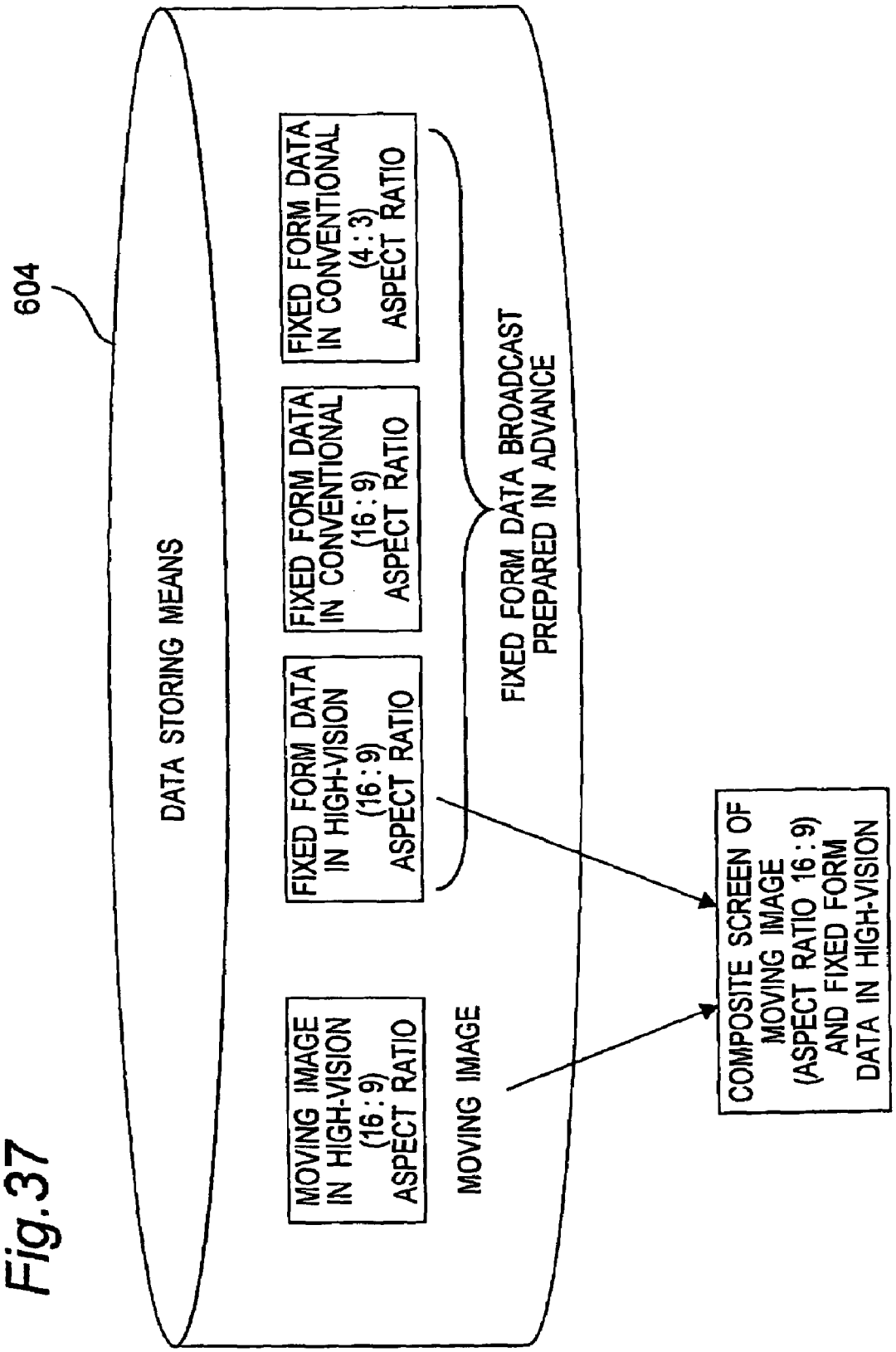
FIG. 37 is a conceptional view showing a fixed form selecting operation in the fixed form data broadcast playback apparatus.

FIG. 37 is a conceptional view of a fixed form selecting operation for explaining the operation of the fixed form selecting means 603 in FIG. 36. The operation of the fixed form selecting means 603 shown in FIG. 36 will be explained by using FIG. 37. FIG. 37 represents the fixed form data storing means 111 and the recording medium 124 as single data storing means 604. The data storing means 604 stores in advance a moving image to be displayed and a plurality of fixed form data (three types in this embodiment). As shown in FIG. 37, when the moving image to be displayed has the aspect ratio of 16:9 in high-vision image, the fixed form selecting means 603 selects fixed form data having the aspect ratio of 16:9 in the high-vision among three types of fixed form data.

The stream information extracting means 602 disclosed in FIG. 36 refers to a sequence header, sequence extension, sequence display extension, picture header or the like that are described according to the MPEG data structure for confirming the aspect ratio, profile or level of the image. The stream information extracting means 602 produces the fixed form selection signal 703 by using the information and transmits the resultant to the fixed form selecting means 603. When obtaining the fixed form selection signal 703, the fixed form selecting means 603 selects suitable fixed form data as described above, and transmits the selected fixed form data 300 to the following data inserting means 110. On the other hand, the stream information 704 extracted by the stream information extracting means 602 is transmitted to the MPEG-TS means 109 in order that its content is reflected to the PMT or SIT (Selection Information Table) given at the time of making into MPEG-TS. FIG. 38 shows a list of resolution described in PMT.

FIG. 39 shows a list of a component type described in SIT. The control packet producing means 131 of the MPEG-TS means 109 refers to this stream information 704 for producing the PMT or SIT corresponding to FIGS. 38 and 39. The above-mentioned construction enables a display wherein the aspect ratio and pixel number of each of the fixed form data and the image are matched to each other, whereby a stable overlapping display is made possible in a general BS digital broadcast receiver.

Embodiment 12

Subsequently, the embodiment 12 shows a method for solving a problem in a case where the selecting basis is reversed with respect to the method explained in the embodiment 11 (corresponding to claim 25).

The embodiment 12 is provided with fixed form information extracting means 605 and image selecting means 606 in addition to the construction shown in the embodiment 9. The other constructions are the same as those explained in the embodiment 9, so that the explanation thereof is omitted.

Figure 40:
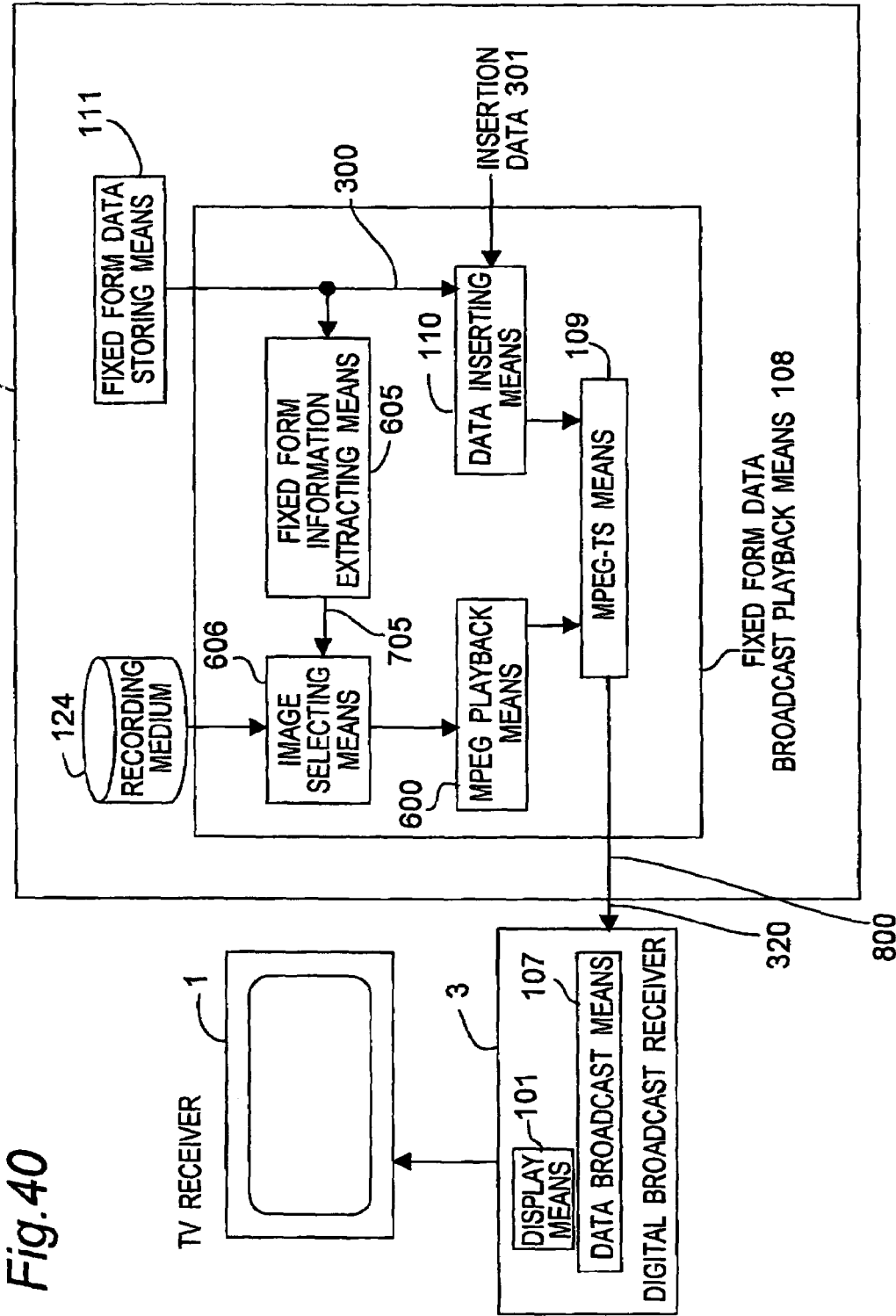
FIG. 40 is a block diagram showing a construction of a fixed form data broadcast playback apparatus in an embodiment 12 of the present invention.

In FIG. 40, numeral 605 denotes fixed form information extracting means that extracts an aspect ratio of an image and pixel information from the fixed form data stored in the fixed form data storing means 111. Numeral 606 denotes image selecting means that selects image data having a suitable aspect ratio and pixel number among the image data already recorded and prepared in advance based upon an image selection signal 705 judged by the fixed form information extracting means 605.

Figure 41:
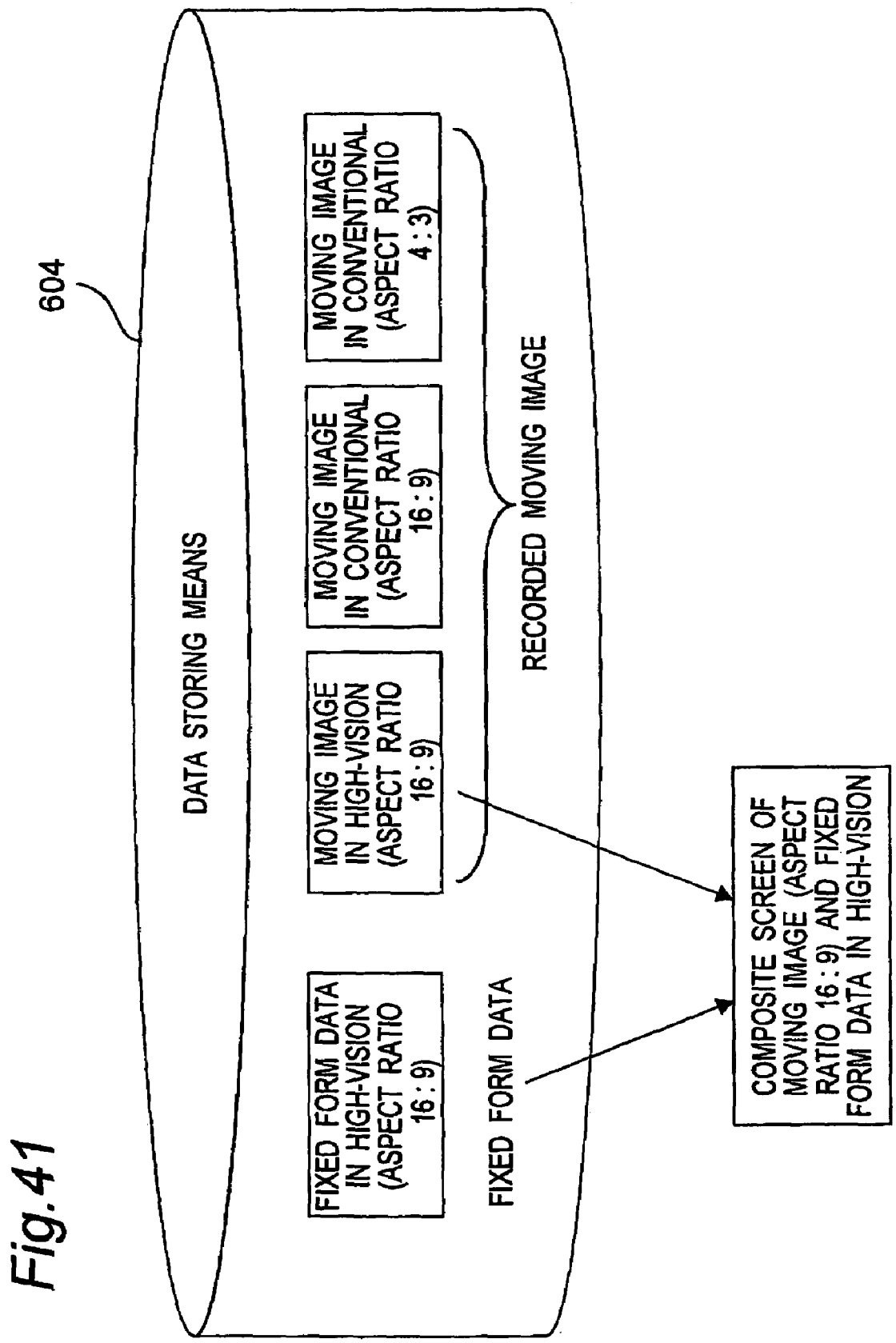
FIG. 41 is a conceptional view showing an image selecting operation in the fixed form data broadcast playback apparatus.

FIG. 41 is a conceptional view of a fixed form selecting operation for explaining the operation of the image selecting means 606 in FIG. 40. The operation of the image selecting means 606 shown in FIG. 40 will be explained by using FIG. 41. FIG. 41 represents the fixed form data storing means 111 and the recording medium 124 as single data storing means 604. The data storing means 604 stores in advance fixed form data to be displayed and a plurality of moving images. As shown in FIG. 41, when the fixed form data to be displayed has the aspect ratio of 16:9 in high-vision image, the image selecting means 606 selects moving image data having the aspect ratio of 16:9 in the high-vision among three types of moving image data.

The fixed form information extracting means 605 shown in FIG. 40 confirms the aspect ratio or pix I number of the fixed form data to be displayed based on the PMT information or SIT information of the fixed form data. The fixed form information extracting means 605 produces the image selection signal 705 by using the information and transmits the resultant to the image selecting means 606. When obtaining the image selection signal 705, the image selecting means 606 selects suitable moving image data as described above, and transmits the selected moving image data to the following MPEG playback means 600.

The above-mentioned construction enables a display wherein the aspect ratio and pixel number of each of the fixed form data and the image are matched to each other, whereby a stable overlapping display is made possible in a general BS digital broadcast receiver.

Embodiment 13

The embodiment 13 of the present invention explains a construction for instructing to change the operation state of the data broadcast application that is operating in the digital broadcast receiver 3, and further explains the problem occurring by this construction and a construction for solving this problem (corresponding to claims 21 and 26).

Figure 42:
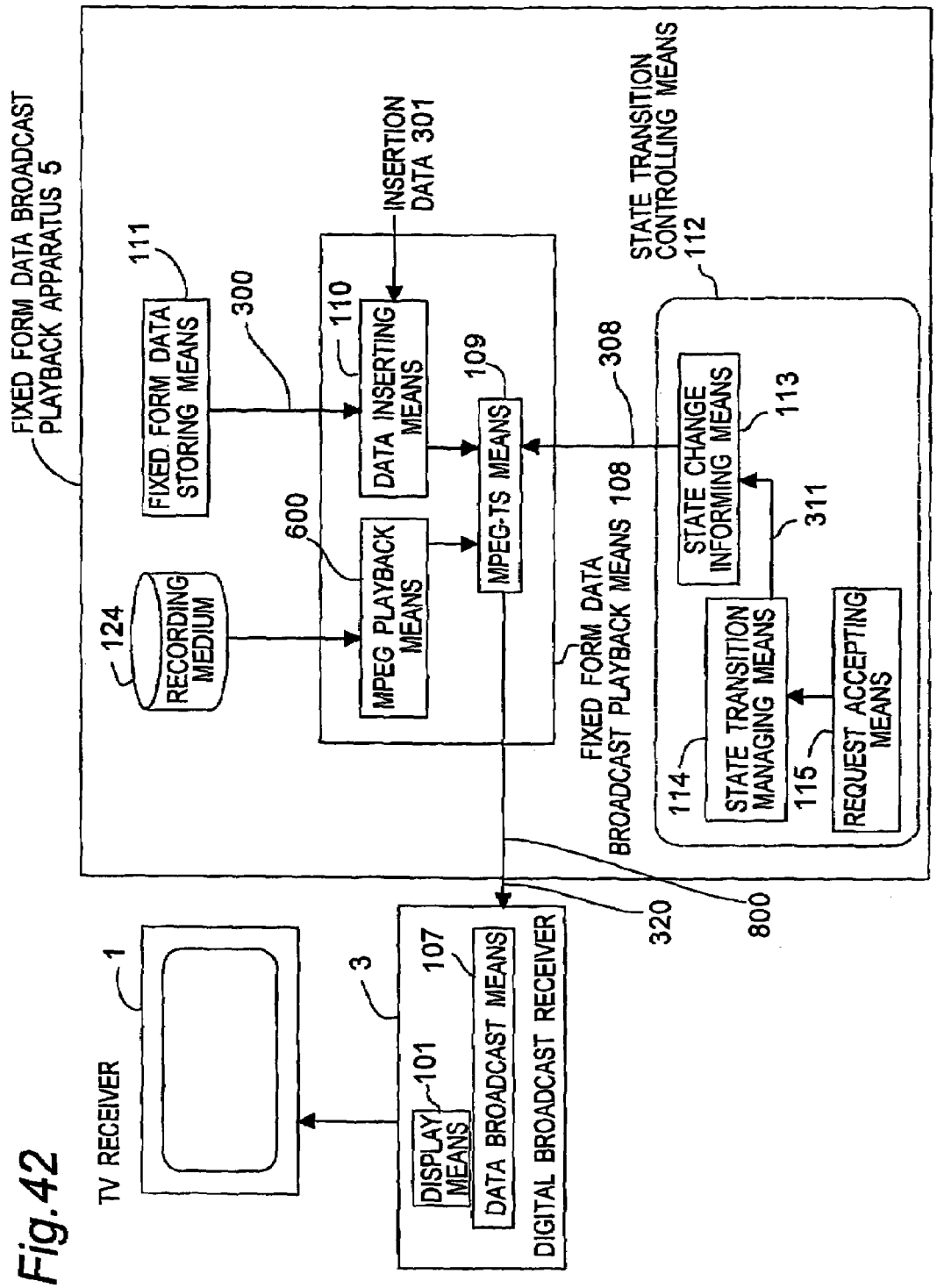
FIG. 42 is a block diagram showing a construction of a fixed form data broadcast playback apparatus in an embodiment 13 of the present invention.

FIG. 42 shows a construction of the embodiment 13. In FIG. 42, numeral 1 denotes a TV receiver, 3 denotes a digital broadcast receiver 3, 108 denotes fixed form data broadcast playback means, 111 denotes fixed form data storing means, 124 denotes a recording medium and 112 denotes state transition controlling means. In this figure, the components other than the state transition controlling means 112 are approximately the same as those explained in the embodiment 9, so that the explanation thereof are omitted. The state transition controlling means 112 includes request accepting means 115, state managing means 114 and state change informing means 113.

The state transition controlling means 112 transmits the event message 108 to the MPEG-TS means 109, to thereby instruct the change of the operational state to the data broadcast application that is being operated in the digital broadcast receiver 3.

The request accepting means 115 is realized by the construction that detects the state of the push button or remote control signal receiving apparatus (not shown). Examples of the type of button include "fixed form start button" that instructs the start of the fixed form data playback, "arrow button" that instructs the movement of the cursor on the screen of the fixed form data playback and corresponds to top, bottom, right and left, or the like (not shown). When these buttons are pushed down, the request accepting means 115 transmits the information corresponding to the kind of the accepted button to the state transition managing means 114. The state transition managing means 114 has a function of managing the state change in the fixed form data broadcast that is being operated in the digital broadcast receiver 3. In a case where the downward arrow button is pushed down, it produces the screen operation control code 311 for informing the operating fixed form data broadcast of the state to be changed, and transmits the resultant to the state change informing means 113. The state change informing means 113 changes the screen operation control code 311 to a format of event-message transmission system and transmits the resultant to the MPEG-TS means 109. The MPEG-TS signal reproduced by the MPEG-TS means 109 is multiplexed with the event message 308, and the resultant is reproduced by the digital broadcast receiver 3 to thereby be processed by the data broadcast means 107. The above-mentioned event-message transmission system provides means for sending message information from a broadcasting station to the application operated in the digital broadcast receiver 3 on the spot or at a designated time. A general-purpose event-message descriptor is defined in the standard prescribed for Japanese BS digital broadcasting (see Standard STD-B24, Ver. 3.2, Chapter 7 by Association of Radio Industries and Business). The general-purpose event-message descriptor is transmitted by the event-message transmission system, thereby being capable of changing the state of the application operated at the side of the digital broadcast receiver 3.

In the fixed form data broadcast playback apparatus 5 operating as described above, in a case where the cycle of the request accepted by the request accepting means 115 is short, there arises a problem that event message fails to be received by the data broadcast means 107 if the event message 308 is produced and reproduced with the accepted short cycle. The failure of receiving the event message at the data broadcast means 107 causes a discrepancy between the fixed form data broadcast operating at the data broadcast means 107 and the state of managing the state transition managing means 114, thereby entailing a problem that the operation as the application becomes impossible.

Figure 43:
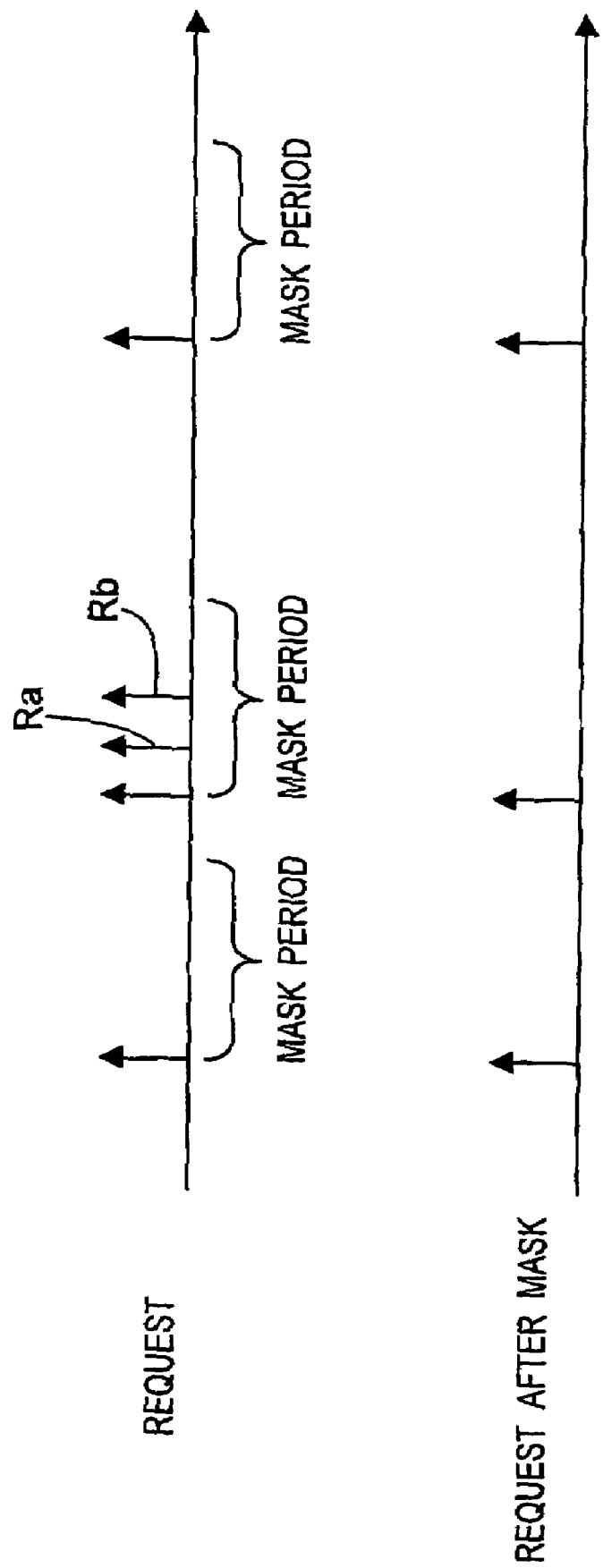
FIG. 43 is a timing chart showing a timing of inhibiting a request acceptance.

In order to solve the above-mentioned problem, this embodiment 13 is provided with a function for inhibiting the acceptance of the request with a cycle not more than the predetermined cycle at the request accepting means 115. FIG. 43 shows a timing chart of inhibiting the acceptance of the request. When a request is made with a short cycle shown by Ra and Rb in the same figure, this is masked. The mask period depends upon the performance of the digital broadcast receiver 3. A short mask period is enough in a case where the digital broadcast receiver 3 has high performance of receiving the general-purpose event message, but a long mask period is required to be set in a case where the digital broadcast has low performance. Methods for setting the mask period to a fixed value include a method in which the reference is set to the one having the lowest performance among the existing digital broadcast receivers 3 put on the market. The request accepting means 115 of the present invention can be realized by using an interruption input and a timer function of a microprocessor. It is to be noted that such construction may be applied that the setting of the mask period and mask processing are executed not at the request accepting means 115 but at the state transition managing means 114.

The use of the construction of the embodiment 13 can solve the seventh subject that "the digital broadcast receiver fails to receive a general-purpose event message in a case where the general-purpose event message is not transmitted at a suitable timing" disclosed in the above-mentioned "subjects that the invention is to solve".

Embodiment 14

Subsequently, the embodiment 14 explains a display example of a fixed form data broadcast application realized by providing both of the construction in the embodiment 11 and the construction in the embodiment 13 (corresponding to claims 22 and 26).

Figure 44:
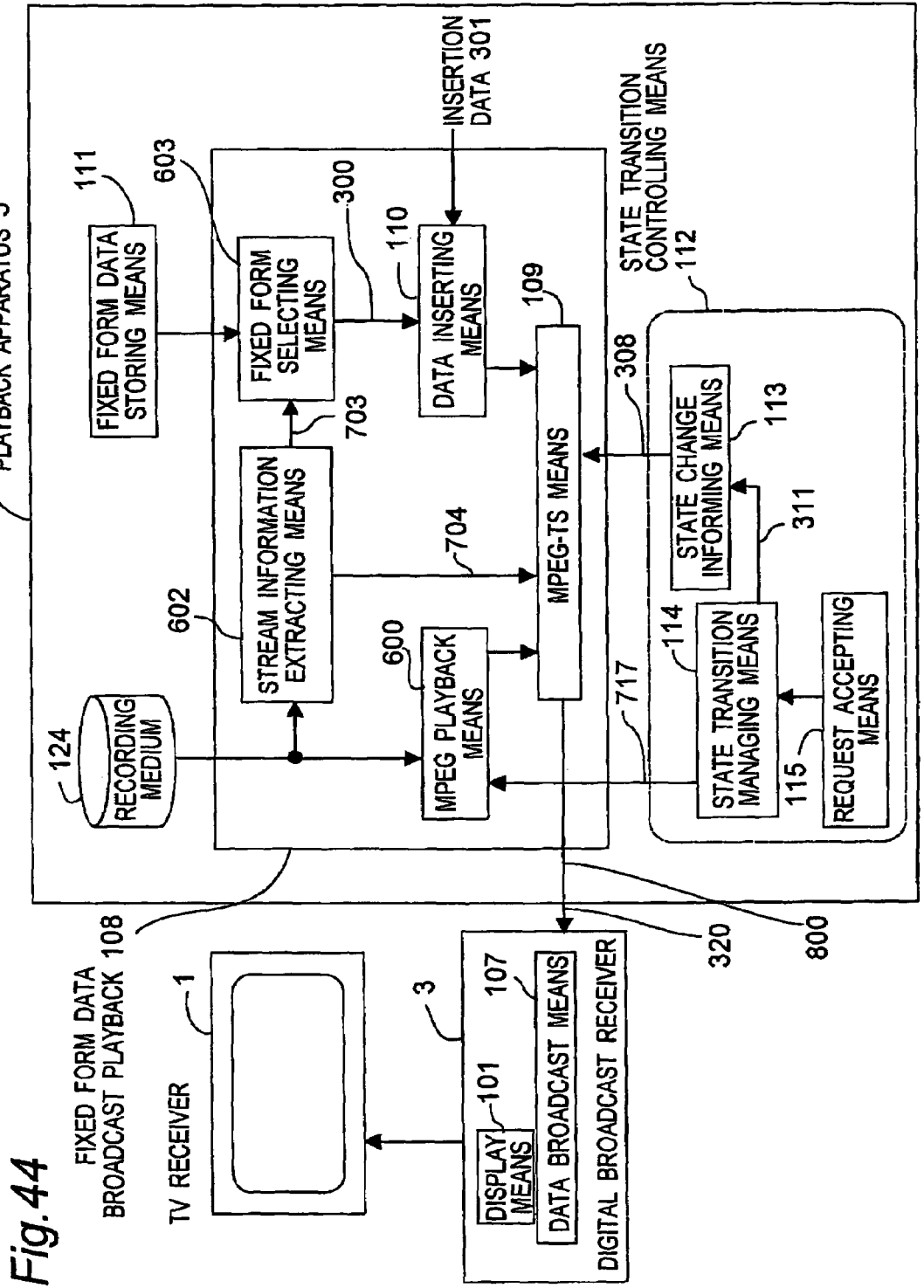
FIG. 44 is a block diagram showing a construction of a fixed form data broadcast playback apparatus in an embodiment 14 of the present invention.

In FIG. 44, the different point from the embodiments 11 and 13 is the presence of a playback control signal 717 transmitted from the state transition managing means 114. The other constructions are the same as those described above, thereby omitting the explanation.

Figure 45:
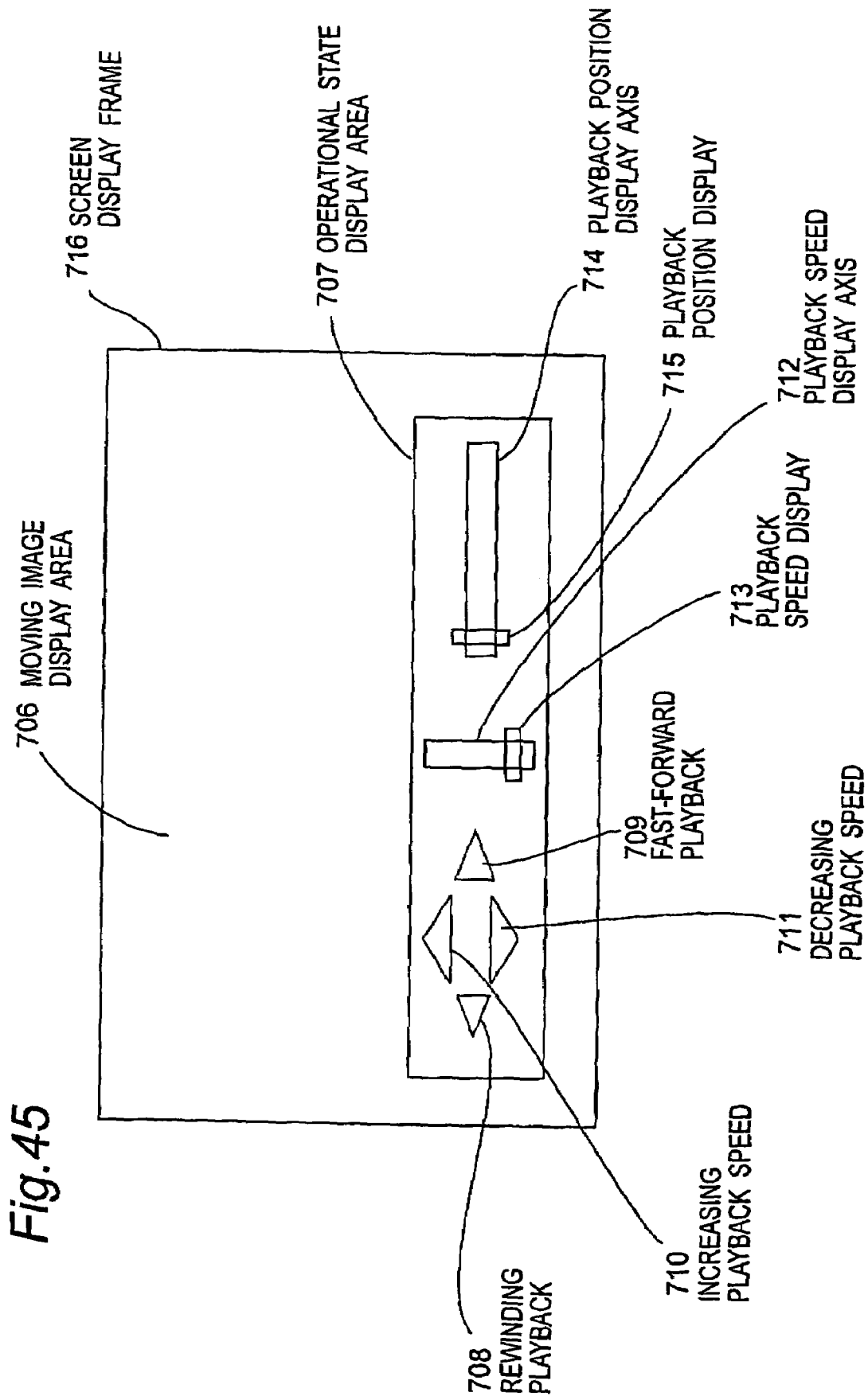
FIG. 45 is a view showing a display example by the fixed form data broadcast playback apparatus.

FIG. 45 is a display example in which the MPEG-TS stream is reconstructed in the construction shown in FIG. 44 and the screen is displayed on the TV receiver 1 in the digital broadcast receiver 3.

In FIG. 45, numeral 706 denotes a moving image display area, 707 denotes an operation state display area and 716 denotes a screen display frame. In the operation state display area 707 in this figure, numeral 708 denotes a display of a state of the rewinding playback, 709 denotes a display of a state of the fast-forward playback, 710 denotes a display of a state of increasing a playback speed, 711 denotes a display of a state of decreasing the playback speed, 712 denotes a playback speed display axis, 713 denotes a playback speed display, 714 denotes a playback position display axis and 715 denotes a playback position display.

The display operation in FIG. 45 will be explained hereinbelow with reference to the construction in FIG. 44.

This display screen is the one supposing the case where the fast-forward playback or rewinding playback is executed. These two playbacks are generically called trick playback hereinbelow.

The request accepting means 115 detects that a "fast-forward button" or the like is pushed down and instructs to the MPEG playback means 600 the start of the processing by the playback control signal 717. The MPEG playback means 600 receiving this instruction starts the playback processing of the image stored in the recording medium 124. Further, at this time, the stream information extracting means 602, fixed form selecting means 603 and data inserting means 110 start the processing of obtaining the fixed form data stored in the fixed form data storing means 111. The I-picture is extracted by the MPEG playback means 600 from the image reproduced from the recording medium 124. This extracted I-picture realizes the trick playback. The fixed form data 300 is transmitted to the MPEG-TS means 109 via the data inserting means 110 simultaneous with this extracting process. The insertion data 301 is not supposed in the case of the display example in FIG. 45. The MPEG-TS stream reproduced by the MPEG-TS means 109 is transmitted to the digital broadcast receiver 3 via the digital interface 320 and executed by the data broadcast means 107 to thereby display the display content shown in FIG. 45 on the TV receiver 1.

Subsequently, the outline of the operation state display area 707 shown in FIG. 45 is explained.

At the first time when the "fast-forward button" is pushed down (not shown), the playback position display 715 is positioned at the left edge of the playback position display axis 714. The playback position display axis corresponds to the length of the program to be reproduced, and the playback position display moves rightward as the playback is going on. Likewise, the playback speed display 713 is positioned at the bottom edge of the playback speed display axis 712 at the first time. The playback speed display axis 712 corresponds to the state of the playback speed, in which the lowest speed corresponds to the bottom edge and the highest speed to the top edge. Likewise, the display of the state of the fast-forward playback 709 shows an active state with a difference color at the beginning. In a case where the playback direction is changed by the following operation, the display of the state of the fast-forward playback 709 shows a non-active state, and alternately, the display of the state of the rewinding playback 709 shows the active state.

When the request accepting means 115 detects that the "upward arrow" button is pushed down (not shown) with the aforesaid display state, it informs the state transition managing means 114 of the detected result. The state transition managing means 114 determines that the push-down of the button means the requirement of the change in the trick playback speed, whereby it transmits the screen operation control code 311 to the state change informing means 113. Further, the state transition managing means 114 simultaneously transmits the playback control signal 717 to the MPEG playback means 600 in order to change the trick playback speed. The screen operation control code 311 is reflected to the actual screen via the state change informing means 113, MPEG-TS means 109 and data broadcast means 107. Specifically, the position of the playback speed display 713 is redisplayed at the upper section by the corresponding increase of the speed and the display of the state of the increase in the playback speed 710 shows an active state during a predetermined period immediately after the button is pushed down. Further, the playback control signal 717 is transmitted to the MPEG playback means 600 for changing the trick playback speed in the MPEG playback means 600.

The trick playback image after the change is transmitted to the digital broadcast receiver 3 via the MPEG-TS means 109 and then displayed on the moving image display area 706 in FIG. 45.

Subsequently, when the request accepting means 115 detects that the "leftward arrow" button is pushed down (not shown) with the aforesaid display state, it informs the state transition managing means 114 of the detected result. The state transition managing means 114 determines that the push-down of the button means the requirement of the change in the direction of the trick playback, whereby it transmits the screen operation control code 311 to the state change informing means 113. Further, the state transition managing means 114 simultaneously transmits the playback control signal 717 to the MPEG playback means 600 in order to change the direction of the trick playback. The screen operation control code 311 is reflected to the actual screen via the state change informing means 113, MPEG-TS means 109 and data broadcast means 107. Specifically, the travelling direction of the playback position display 715 changes to the leftward direction, the color of the display of the state of the fast-forward playback 709 shows the non-active state and the color of the display of the state of the rewinding playback 708 shows the active state. Further, the playback control signal 717 is transmitted to the MPEG playback means 600 for changing the direction of the trick playback in the MPEG playback means 600. The trick playback image after the change is transmitted to the digital broadcast receiver 3 via the MPEG-TS means 109 and then displayed on the moving image display area 706 in FIG. 45.

The state transition managing means 115 has a function of confirming the playback position of the image to be reproduced, and it converts the playback position into the screen operation control code 311. For example, it processes the present playback position into the general-purpose event message at a cycle of one second and transmits the resultant. The fixed form data broadcast that receives this general-purpose event message makes the total recording time of the program to 100% and re-displays the playback position obtained by the general-purpose event message at the position according to this ratio.

As described above, the use of the construction of the embodiment 14 can simultaneously display the operation state and playback state during the trick playback.

Embodiment 15

Subsequently, the embodiment 15 explains a display example of a fixed form data broadcast application realized by providing both of the construction in the embodiment 12 and the construction in the embodiment 13 (corresponding to claims 23 and 26).

Figure 46:
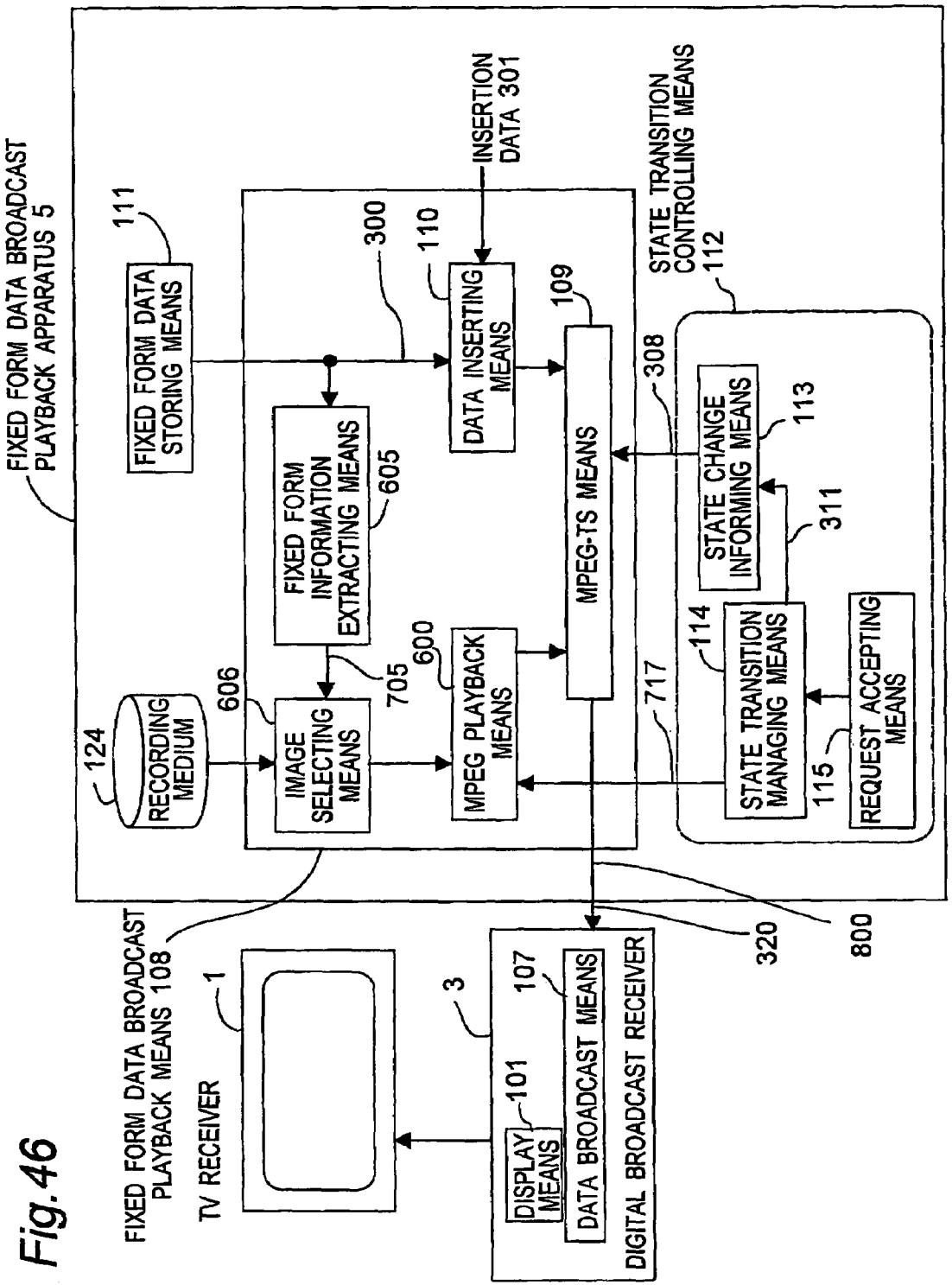
FIG. 46 is a block diagram showing a construction of a fixed form data broadcast playback apparatus in an embodiment 15 of the present invention.

In FIG. 46, the different point from the embodiments 12 and 13 is the presence of a playback control signal 717 transmitted from the state transition managing means 114. The other constructions are the same as those described above, thereby omitting the explanation.

FIG. 47 is a display example in which the MPEG-TS stream is reconstructed in the construction shown in FIG. 46 and the screen is displayed on the TV receiver 1 in the digital broadcast receiver 3.

In FIG. 47, numeral 718 denotes a moving image display area, 719 denotes a program content display area, 720 denotes a program title display area and 721 denotes a cursor.

The display operation in FIG. 47 will be explained hereinbelow with reference to the construction shown in FIG. 46.

This display screen in this embodiment is the one supposing that a list of the program title is displayed by using the fixed form data broadcast and the program image selected by the cursor is displayed on a sub-screen.

The request accepting means 115 detects that an exclusive "program title display button" or the like is pushed down (not shown) and instructs to the MPEG playback means 600 the start of the processing by the playback control signal 717. The MPEG playback means 600 receiving this instruction starts the playback processing of the image stored in the recording medium 124. Further, at this time, the fixed form information extracting means 605, image selecting means 606 and data inserting means 110 start the processing of obtaining the fixed form data stored in the fixed form data storing means 111. The image reproduced from the recording medium 124 is reproduced by the MPEG playback means 600. The fixed form data 300 is transmitted to the MPEG-TS means 109 via the data storing means 110 simultaneous with this playback process. The insertion data 301 is a list of the program title in the case of the display example in FIG. 45. The MPEG-TS stream reproduced by the MPEG-TS means 109 is transmitted to the digital broadcast receiver 3 via the digital interface 320 and executed by the data broadcast means 107 to thereby display the display content shown in FIG. 45 on the TV receiver 1.

Subsequently, the display outline shown in FIG. 47 is explained.

At the first time when the "program title display button" is pushed down, the playback position display 715 is displayed at the left edge of the playback position display axis 714. The playback position display axis corresponds to the length of the program to be reproduced, and the playback position display 715 moves rightward as the playback is going on. Likewise, the cursor 721 indicates the first program of the program list or the program title previously reproduced. Likewise, the program indicated by the cursor 721 is reproduced to be displayed on the sub-screen in the moving image display area 718 at the beginning.

When the request accepting means 115 detects that the "downward arrow" button is pushed down (not shown) with the aforesaid display state, it informs the state transition managing means 114 of the detected result. The state transition managing means 114 determines that the push-down of the button means the requirement of the change of the program to be reproduced, whereby it transmits the screen operation control code 311 to the state change informing means 113. Further, the state transition managing means 114 simultaneously transmits the playback control signal 717 to the MPEG playback means 600 in order to change the program to be reproduced. The screen operation control code 311 is reflected to the actual screen via the state change informing means 113, MPEG-TS means 109 and data broadcast means 107. Specifically, the position of the cursor 721 is displayed so as to indicate the title immediately below the present title. Further, the playback control signal 717 is transmitted to the MPEG playback means 600 for changing the image to be reproduced in the MPEG playback means 600. The playback image after the change is transmitted to the digital broadcast receiver 3 via the MPEG-TS means 109 and then displayed on the moving image display area 718 in FIG. 47. The display manner of the playback position display axis 714 and the playback position display 715 are the same as those explained in the aforesaid embodiment 14, thereby omitting the explanation thereof.

As described above, the use of the construction shown in the embodiment 15 can display the image of the program selected by the cursor on the sub-screen during the display of the program title list.

Embodiment 16

Subsequently, the embodiment 16 explains the BML description method for avoiding the failure of receiving the event message in the data broadcast means 107 of the digital broadcast receiver 3 (corresponding to claim 27).

Figure 49:
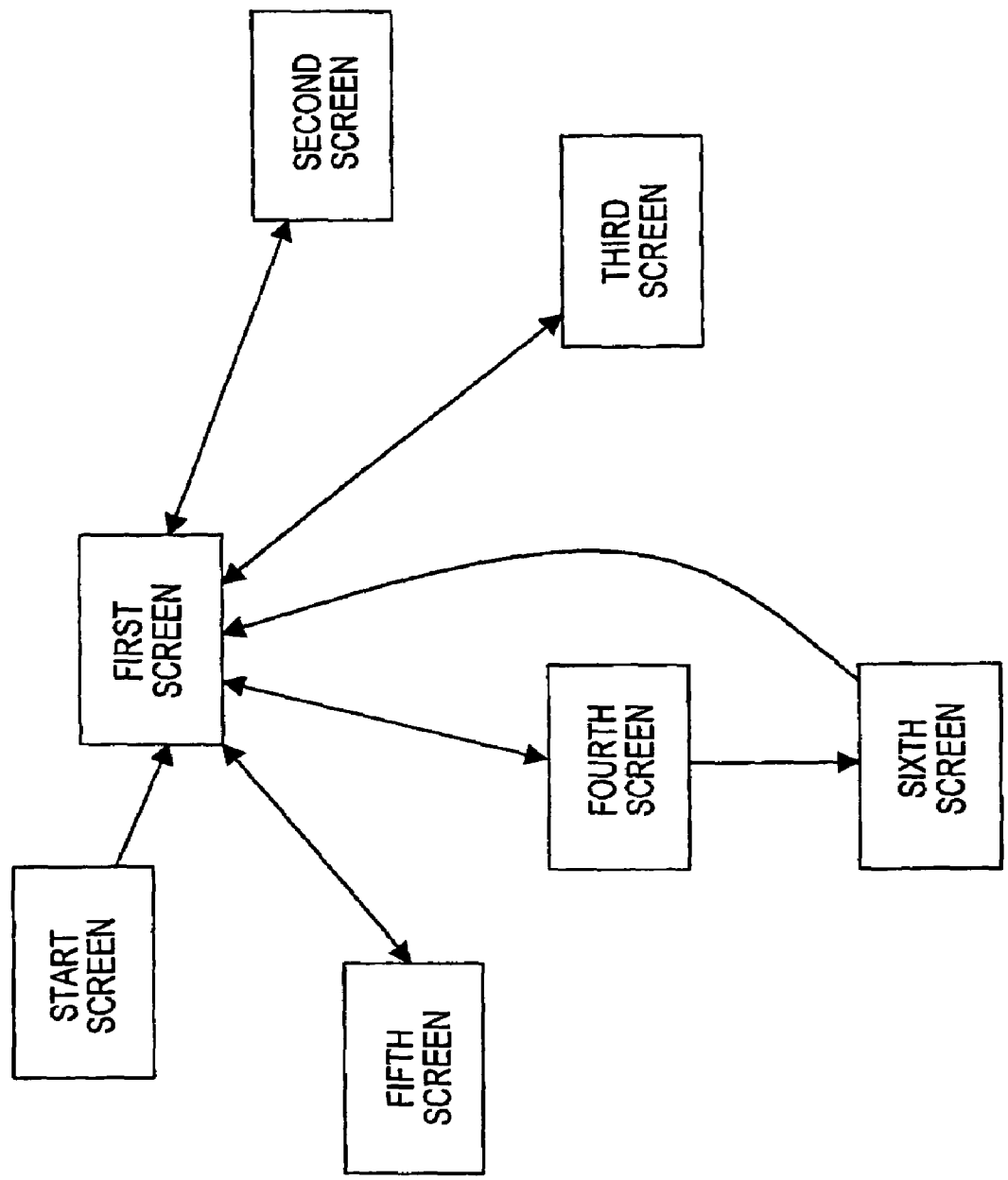
FIG. 49 is a view showing a transition example of a screen upon describing plural screen constructions.

FIG. 48 is an example of composing a plurality of screens by a single BML document, while FIG. 49 is a transition example of a screen upon describing a construction of a plurality of screens.

FIG. 49 is an example for expressing the transition among screens in a case where the display screen realized by the fixed form data broadcast is composed not by a single screen but by a plurality of screens.

The data broadcast means 107 of the digital broadcast receiver 3 displays a start screen when obtaining the fixed form data broadcast, and then, displays a first screen after a predetermined time has elapsed. Each button is allocated such that, when a "blue button", for example, is pushed down during the display of the first screen, the display is moved to a second screen, when a "red button" is pushed down, the display is moved to a third screen, when a "green button" is pushed down, the display is moved to a fourth screen, and when a "yellow button" is pushed down, the display is moved to a fifth screen. The description of the push-down of the button is omitted in the figure. A method for allocating each color button is a mounting specification inherent to the fixed form data broadcast playback apparatus 5, but a different allocating method may be applied. In a case where the plurality of screens are composed, the BML document corresponding to the individual screen is formed and the description is made such that the transition is performed among the BML documents by a script description in the BML document in a general data broadcast. In the case of the BS digital broadcast, a function of launchDocument( ) is prescribed as the description for moving among the BML documents (se Standard ARIB STD-B24 by Association of Radio Industries and Business). However, the transition is made among the different BML documents by using such function, there arises a problem that the event message cannot be received during the transition.

In order to solve this problem, this embodiment 16 shows a manner for describing all of the plurality of screens in one text. The description shown in FIG. 48 is an example of describing three screens in one BML text. The sections encircled by <body> and </body> are those describing the components for the screen display in this figure, and the components of each screen are described at the sections encircled by <div> and </div>. A function for performing the control of the screen is described at the section encircled by <script> and </script>. In the example of FIG. 48, it is supposed that the display or non-display of each screen is controlled in the event_handler( ) function.

Adopting the BML description method as described above can continue the receiving of the event message even if the transition is made among the screens, thereby being capable of avoiding the failure of receiving the event message attributed to the state-transition among screens.

As described above, the use of the construction of this embodiment 16 can solve the seventh subject that "the general-purpose event message is failed to be received in a case where the general-purpose event message is transmitted at a suitable timing" disclosed in the above-mentioned "subjects that the invention is to solve".

Embodiment 17

Subsequently, the embodiment 17 explains a construction for avoiding the failure of receiving the event message with a technique different from the embodiment 16 (corresponding to claim 28).

Figure 50:
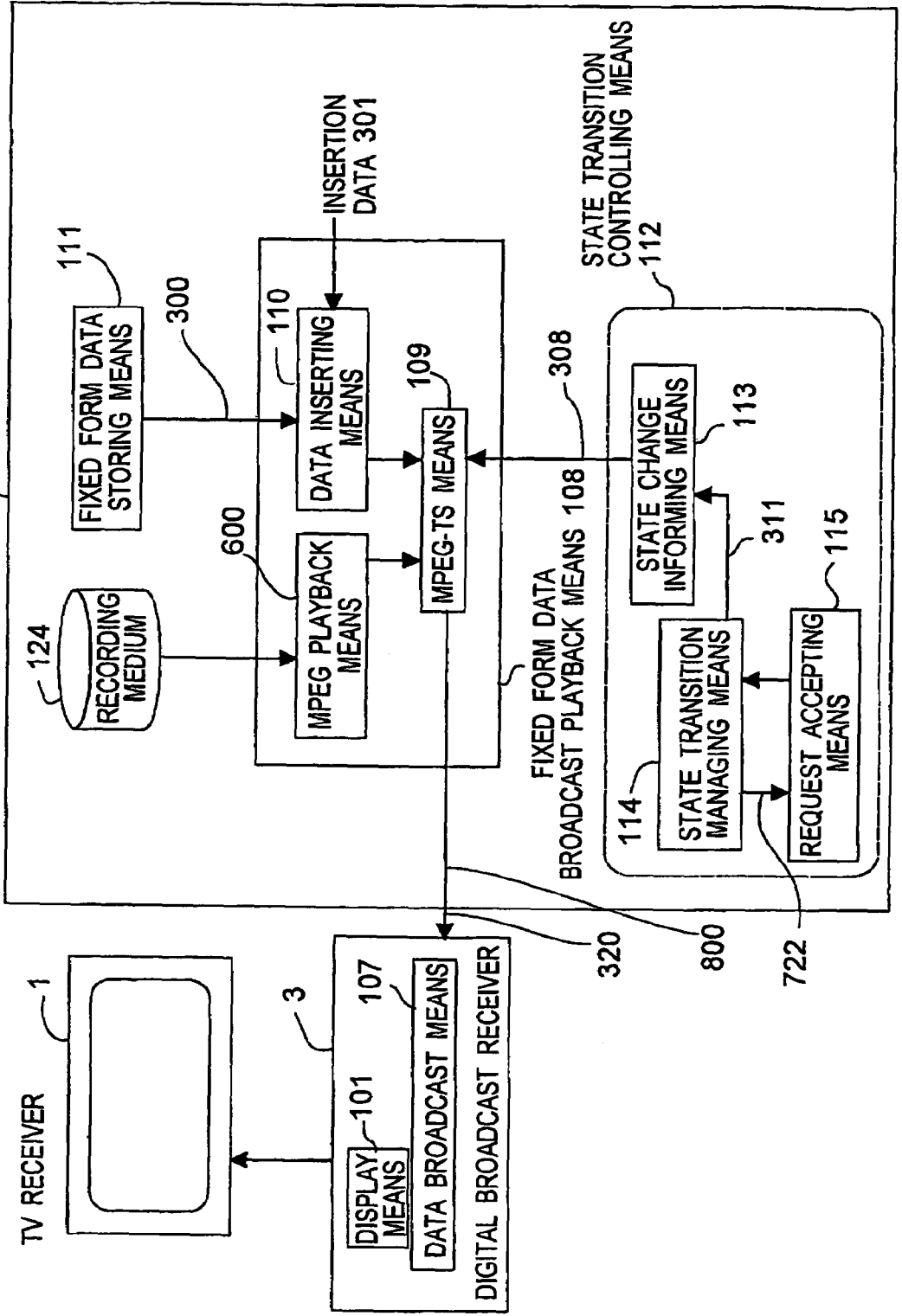
FIG. 50 is a block diagram showing a construction of a fixed form data broadcast playback apparatus in an embodiment 17 of the present invention.

FIG. 50 is a view showing a construction of the embodiment 17. The components are the same as those explained in the embodiment 13 shown in FIG. 42, so that the explanation thereof is omitted here.

The different point between FIG. 50 and FIG. 42 is that the state transition managing means 114 sends a transition state informing signal 722 to the request accepting means 115.

Figure 51:
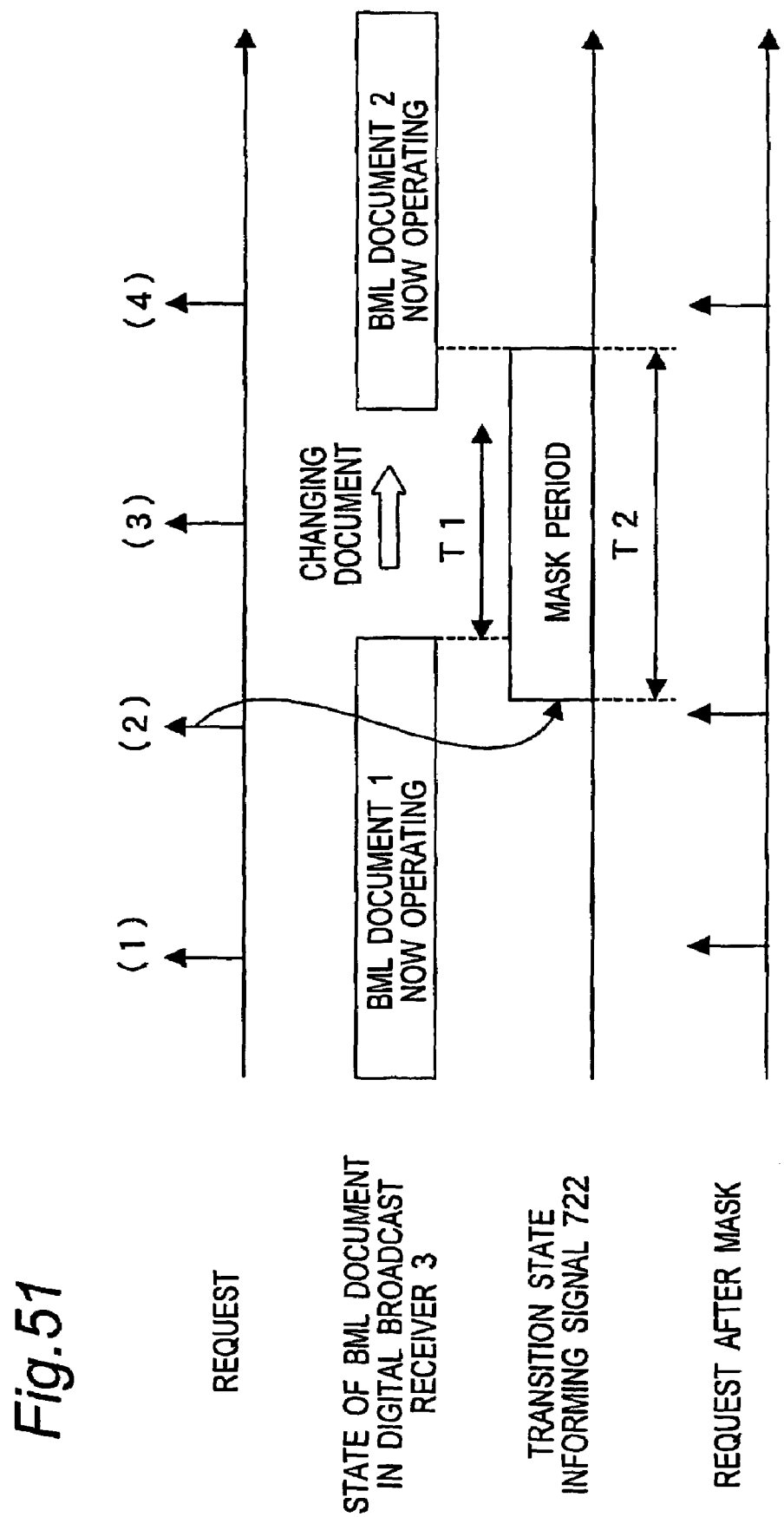
FIG. 51 is a timing chart showing a timing of inhibiting a request acceptance.

The state transition managing means 114 manages the change-over state of the BML document for informing the period required for performing the change-over of the BML document of the request accepting means 115 as the transition state informing signal 722. The request accepting means receiving this signal stops the acceptance of the request during the period represented by the transition state informing signal 722. FIG. 51 is a request acceptance inhibition timing chart showing a timing of the transition state informing signal 722 and the inhibition period. In FIG. 51, arrows shown in the uppermost section are requests detected by the request accepting means 115 with the push-down of the button or the like. A "state of BML document" shown in the second section from the top represents not the state managed by the state transition managing means 114 but how the fixed form data playback stream 800 reproduced at present is operated in the digital broadcast receiver 3. When receiving a request (2), a BML document 1 detects that it means a request for changing the BML document, so that the BML document 1 starts a BML document 2 that should be operated next. In a case where a playback in one direction is only performed by using the digital interface 320, the state transition managing means 114 cannot directly monitor the actual state of the BML document in the digital broadcast receiver 3. Specifically, the state transition managing means 114 cannot be told the actual document change-over time (T1). Therefore, the state transition managing means 114 makes the transition state informing signal 722 into a mask period state after transmitting the request (2), and returns the same signal to a normal state after a lapse of a predetermined time (T2) in this embodiment. This predetermined time (T2) can be realized such that it is set to a value sufficiently greater than the maximum change-over time obtained by investigating the change-over time in the existing BS digital broadcast receiver.

As described above, the use of the construction of this embodiment 16 can solve the seventh subject that "the general-purpose event message is failed to be received in a case where the general-purpose event message is transmitted at a suitable timing" disclosed in the above-mentioned "subjects that the invention is to solve".

Embodiment 18

Subsequently, the embodiment 18 explains a subject occurring in a case where a plurality of screens are prepared that are displayed by the fixed form data playback stream 800, and a construction for solving this subject (corresponding to claim 29).

Figure 52:
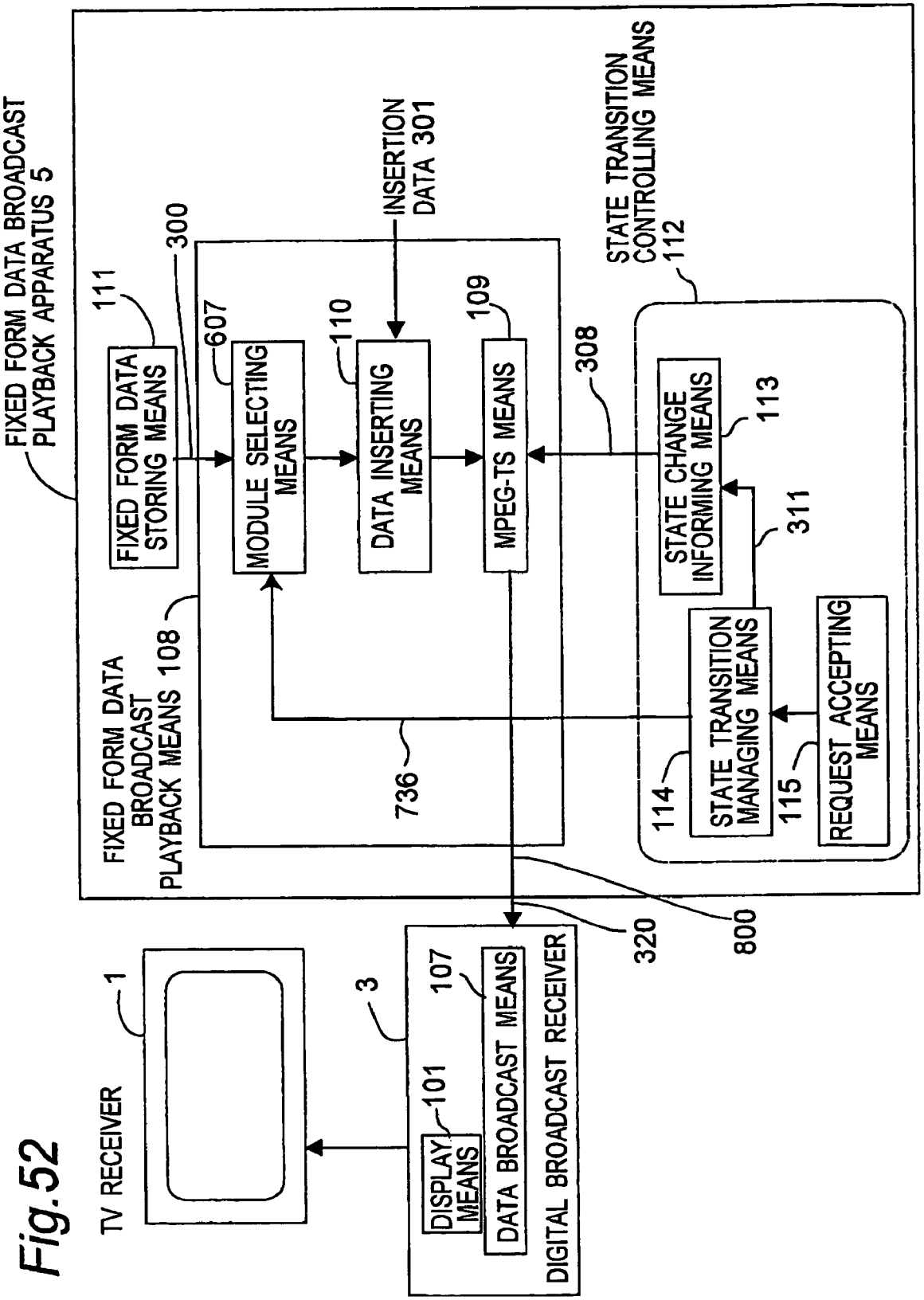
FIG. 52 is a block diagram showing a construction of a fixed form data broadcast playback apparatus in an embodiment 18 of the present invention.

FIG. 52 shows a construction of the embodiment 18. The components are approximately the same as those explained in the embodiment 13 shown in FIG. 42. The components irrelevant to the construction for solving the subject aimed by this embodiment are omitted from the disclosure in FIG. 42.

The different point between FIG. 52 and FIG. 42 is that FIG. 52 is provided with module selecting means 607 and the state transition managing means 114 has a construction of transmitting a module selecting signal 736 to the module selecting means 722.

Figure 53:
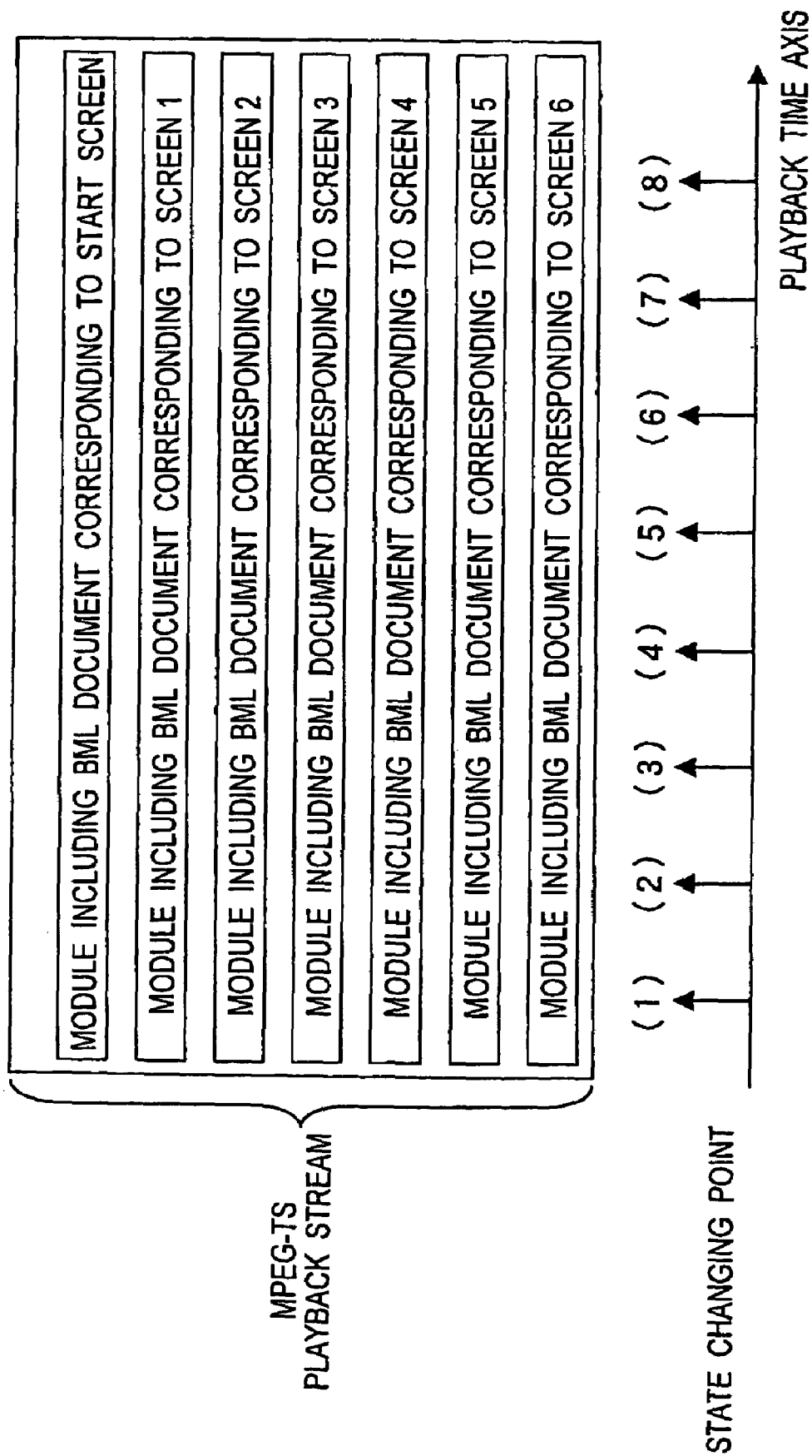
FIG. 53 is a timing chart showing a timing in a case where plural BML documents are arranged in a single band area.

Firstly explained by using FIGS. 48, 49 and 53 used in the embodiment 16 is the subject that this embodiment 18 intends to solve.

There are the following two techniques for realizing the plurality of screens by the BML document as shown in FIG. 49. The first technique is that all screens are described by one BML document as shown in FIG. 48, while the second technique is that the screen is described by a plurality of BML documents. In either technique, the carousel data composed of the DII and DDB explained in FIG. 2 is required to be composed in a predetermined transmission band area (bit rate that can be transmitted). Accordingly, the transmission band area per one screen becomes small as the number of the screen increases. This means that a proportional relationship is established between the increase in the number of the screen and the acquisition time of the data broadcast in the digital broadcast receiver 3. Specifically, the more the screen number increase and the more the total amount of data increases, the longer the data acquisition time becomes, whereby it takes much time to display the screen. FIG. 53 is a timing chart in a case where the plural BML documents are arranged in a single transmission band area. The axis of abscissa in FIG. 53 represents a time change, while a longitudinal width disclosed as the MPEG-TS playback stream represents the transmission band area. Each of the plural screens is described so as to be arranged in approximately same transmission band area in the example of this figure. Arrows shown in the lowermost section mean points of the state change. For example, the data broadcast screen of the digital broadcast receiver 3 moves such that it moves from the start screen to a screen 1 at a changing point (1) as the border, moves from the screen (1) to a screen (2) at a changing point (2) as the border, moves from the screen (2) to a screen (3) at a changing point (3) as the border. When the screen is composed by using the carousel data according to the mechanism of the general data broadcast, the transmission band area that can be allocated per screen becomes narrow, thereby entailing a problem that it takes much time to obtain data in the digital broadcast receiver 3.

In order to solve the aforesaid subject, this embodiment 18 has a construction such that a module (DDB) that is to be required is taken out at the time when it is required for starting the playback.

The operation of the embodiment 18 will be explained by using FIG. 52.

Figure 54:
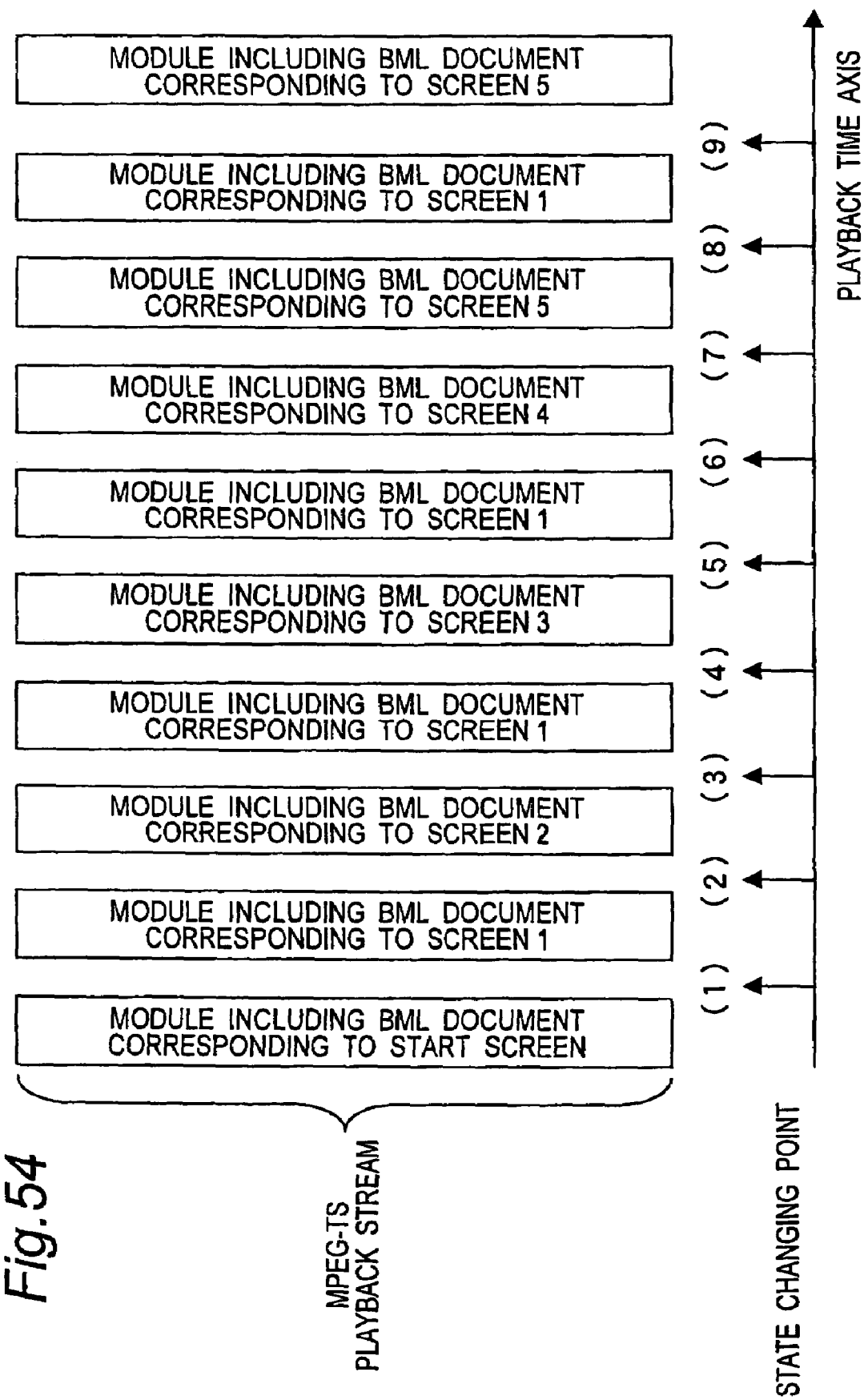
FIG. 54 is a timing chart showing a timing in a case where a corresponding BML is reproduced at the time when it is required.

When receiving the changing point involving the changeover of the screen, the state transition managing means 114 transmits the module selecting signal 736 to the module selecting means 607. The module selecting means 607 selects the corresponding module from the fixed form data storing means 111 according to the module selecting signal 736, and transmits the resultant to the data inserting means 110. The use of the construction of FIG. 52 enables to select and obtain the module to be reproduced at the timing when it is required. FIG. 54 is a timing chart in a case where this function of selecting and obtaining the module is realized. The axis of abscissa represents a time change in FIG. 54, while a longitudinal width disclosed as the MPEG-TS playback stream represents the transmission band area. First, the fixed form data including the BML document corresponding to the start screen is reproduced in the example of FIG. 54, whereby the playback is changed over to the playback of the module including the BML document corresponding to the screen 1 at the state changing point (1) as the border, then, the playback is changed over to the playback of the module including the BML document corresponding to the screen 2 at the state changing point (2) as the border, and then, the playback is changed over to the playback of the module including the BML document corresponding to the screen 3 at the state changing point (3) as the border. As is apparent from the comparison between FIG. 53 and FIG. 54, the use of the construction of the embodiment 18 can reproduce the module to be reproduced at the maximum transmission band area and send it to the digital broadcast receiver 3.

Figure 55:
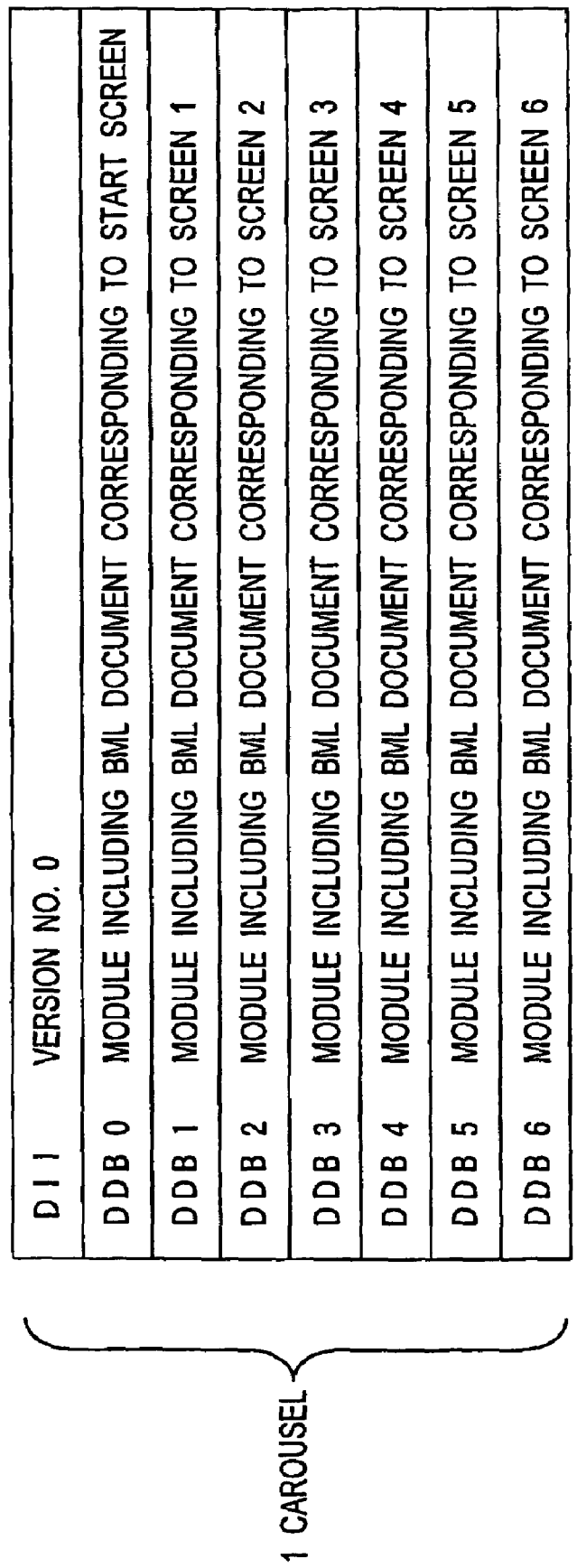
FIG. 55 is a view showing an example 1 of carousel structure.

Subsequently explained by using FIGS. 55 and 56 is a data structure upon selecting and obtaining a module and its detailed processing method.

FIG. 55 is an example of a construction in which modules composing the plural screens is arranged in one carousel, while FIG. 56 is an example of a construction in which the individual module is arranged respectively in the individual carousel. In this embodiment 18, the fixed form data adopting either one of the constructions shown in FIGS. 55 and 56 may be stored in the fixed form data storing means 111. However, the points that require attention are different between each construction for describing the BML document. Further, the operational specification of each component is different in the embodiment 18.

At first, the operation upon using the description in FIG. 55 will be explained.

The carousel data composed as shown in FIG. 55 is supposed to be stored in the fixed form data storing means 111. Moreover, information concerning all modules from DDB0 to DDB6 is supposed to be described in the DII. The module selecting means 607 in FIG. 52 selects and obtains the corresponding module from the fixed form data storing means 111. Specifically, it obtains the DII and DDB0 among the components described in FIG. 55. Further, in a case where the state change occurs to thereby establish a state where the next corresponding module is to be obtained, it obtains the DII and DDB1. As described above, the DII is simultaneously obtained and the obtained DII is taken over up to the following MPEG-TS means 109, whereby the DII can always be included in the fixed form data playback stream 800. Although the DII is obtained every time when the state change occurs in the above-mentioned explanation, the following method may be applied wherein the DII may be obtained at the first time and this may be temporarily stored in the data acquisition means 110 or MPEG-TS means 109 for reuse. When the construction of one carousel shown in FIG. 55 is used, the module concerning the other screen is not included in the fixed form data playback stream 800 during when the specific screen is displayed. Accordingly, normal operation is not assured during this period when the description for obtaining the other module in the BML document is performed.

Subsequently, the operation upon using the description in FIG. 56 will be explained.

The carousel data composed as shown in FIG. 56 is supposed to be stored in the fixed form data storing means 111. Moreover, the DII is supposed to be prepared one by one to each DDB. In other words, each DII has described thereon only information corresponding to each DII. The module selecting means 607 in FIG. 56 selects and obtains the corresponding module from the fixed form data storing means 111. Specifically, it obtains the DII and DDB0 among the components described in FIG. 56. Further, in a case where the state change occurs to thereby establish a state where the next corresponding module is to be obtained, it likewise obtains the DII and DDB1. As described above, the DII corresponding to each module is simultaneously obtained and the obtained DII is taken over up to the following MPEG-TS means 109, whereby the DII can always be included in the fixed form data playback stream 800. When the fixed form data playback stream 800 is reproduced with the construction of the carousel shown in FIG. 56, the carousels different from every screen are joined to be reproduced as apparent from FIG. 56. When the different carousels are continuously reproduced as described above, there may be the case where the data broadcast means 107 of the digital broadcast receiver 3 is reset. In order to avoid this, data event ID (Identifier) described in PMT is required to have a value common in each carousel. Further, it is desirable to continuously increase the version number described in each DII with the state change of the screen. The function for continuously increasing the version number in the DII may be executed in the data inserting means 110, for example.

As described above, the use of the construction of the embodiment 18 can solve the eighth subject that "as the screen construction is increased by the plural BML descriptions, it takes much time to obtain BML in the digital broadcast receiver, and as a result, it takes much time to start the individual BML" disclosed in the aforesaid "subjects that the invention is to solve".

FIG. 57 is a timing chart in the case of using the BML description method explained in the embodiment 16 and the construction in the embodiment 18.

The fixed form data 300 is described by the manner shown in the embodiment 16 at a period before the state changing point. Therefore, the failure of receiving the event message is avoided during this period. When the state changing point involving the screen transition appears next, only the corresponding module is selected to be reproduced as explained in the aforesaid embodiment 18. This combination enables to additionally construct a large-scale application while assuring a response speed with the data broadcast application all together that is intended to be operated at relatively high speed.

Embodiment 19

Subsequently, the embodiment 19 explains a subject occurring in a case where a plurality of screens are prepared that are displayed by the fixed form data playback stream 800, and a construction for solving this subject. It is to be noted that the subject explained here is different from the subject explained in the embodiment 18 (corresponding to claim 29).

Figure 61:
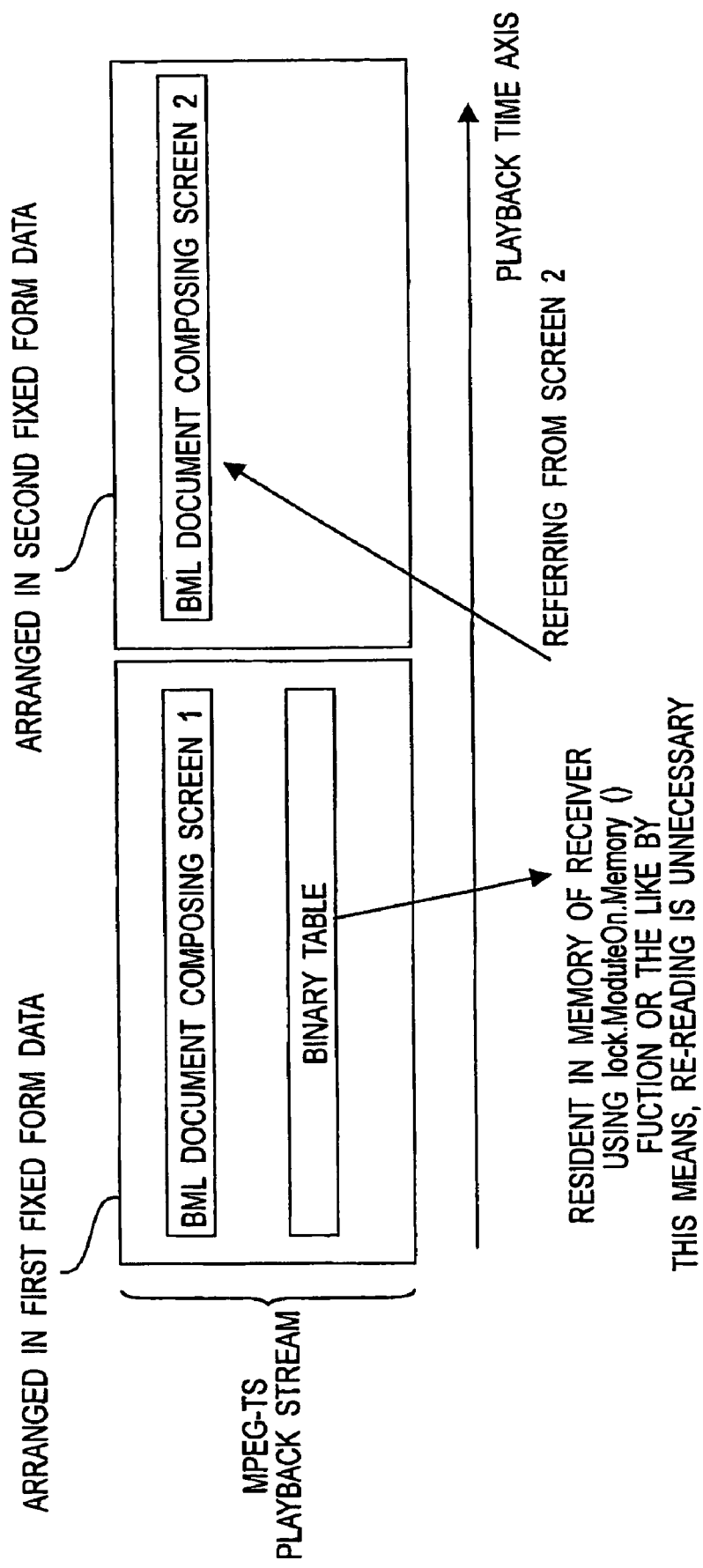
FIG. 61 is a timing chart in a case where data is commonly used among plural BML documents.
Figure 62:
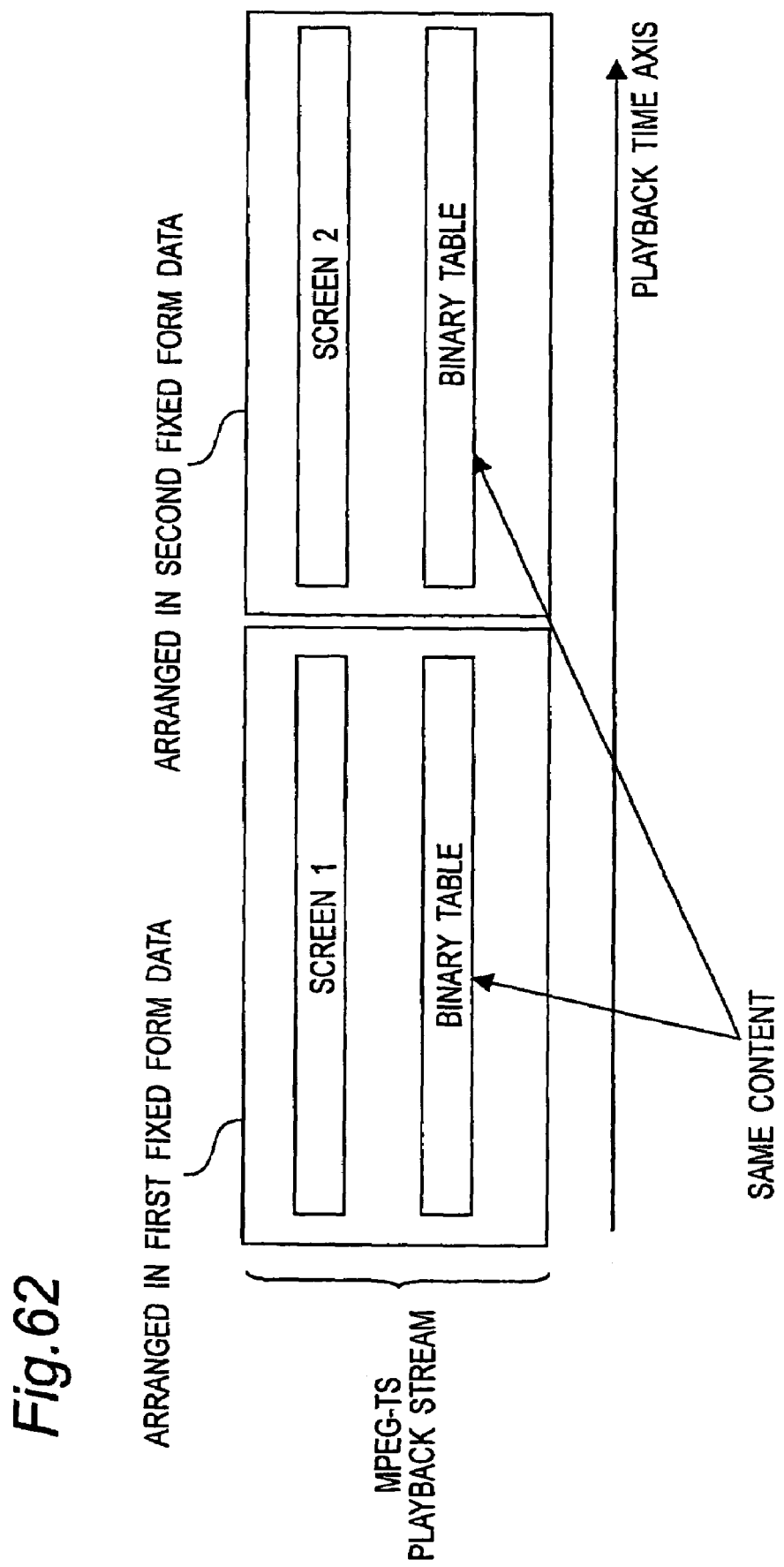
FIG. 62 is a timing chart in a case where the same common data is reproduced in combination with different BML document.

FIG. 61 is a timing chart describing a technique of the case where the plural BML documents have common data, while FIG. 62 is a timing chart in a case where the same common data is reproduced in combination with the different BML document.

Firstly explained by using FIGS. 61 and 62 is a technique for possessing common data among the plural BML documents by utilizing the general data broadcast technique.

The axis of abscissa represents the time change in FIGS. 61 and 62. In FIG. 61, the BML document forming the screen 1 and the binary table are reproduced as the first fixed form data during the first half period. In the case of BS digital broadcasting, the binary table can refer to the data commonly to the BML document that is subsequently started with the script description of the BML document now operating. The execution of LockModuleOn Memory( ) function to the module including the binary table in the script of the BML document composing the screen 1 can handle as common data in the BML document that is started from now on (see Standard STD-B24, Ver. 3.2 by Association of Radio Industries and Business). However, the binary table reproduced in the first half period is not included in the carousel data during the latter half period in the example shown in FIG. 61. With this playback method, when the digital broadcast receiver 3 starts to reproduce the fixed form data playback stream 800 after it enters the latter half period, for example, the binary data to which the BML document composing the screen 2 has to refer is not reproduced, thereby being unable to refer to the binary table. FIG. 62 shows a technique for playback the same binary table in combination with the different BML text in order to avoid such problem. As shown in FIG. 62, the same binary table is reproduced during the first half period and the latter half period, whereby the screen 2 can be displayed while referring to the binary table even if the fixed form data broadcast playback apparatus 5 is connected at the halfway timing after the fixed form data broadcast playback apparatus 5 starts the fixed form data playback. Moreover, there is a method of describing the common data in each BML document by using Array( ) function in place of the binary table without using the binary table.

The technique of possessing common binary data explained with reference to FIGS. 61 and 62 described above is a well-known technique in the process of forming the conventional data broadcast. However, applying the aforesaid technique of possessing common binary data to the fixed form data broadcast playback apparatus 5 entails a problem that dose not conventionally occur. This subject will be explained by using FIG. 63.

Figure 63:
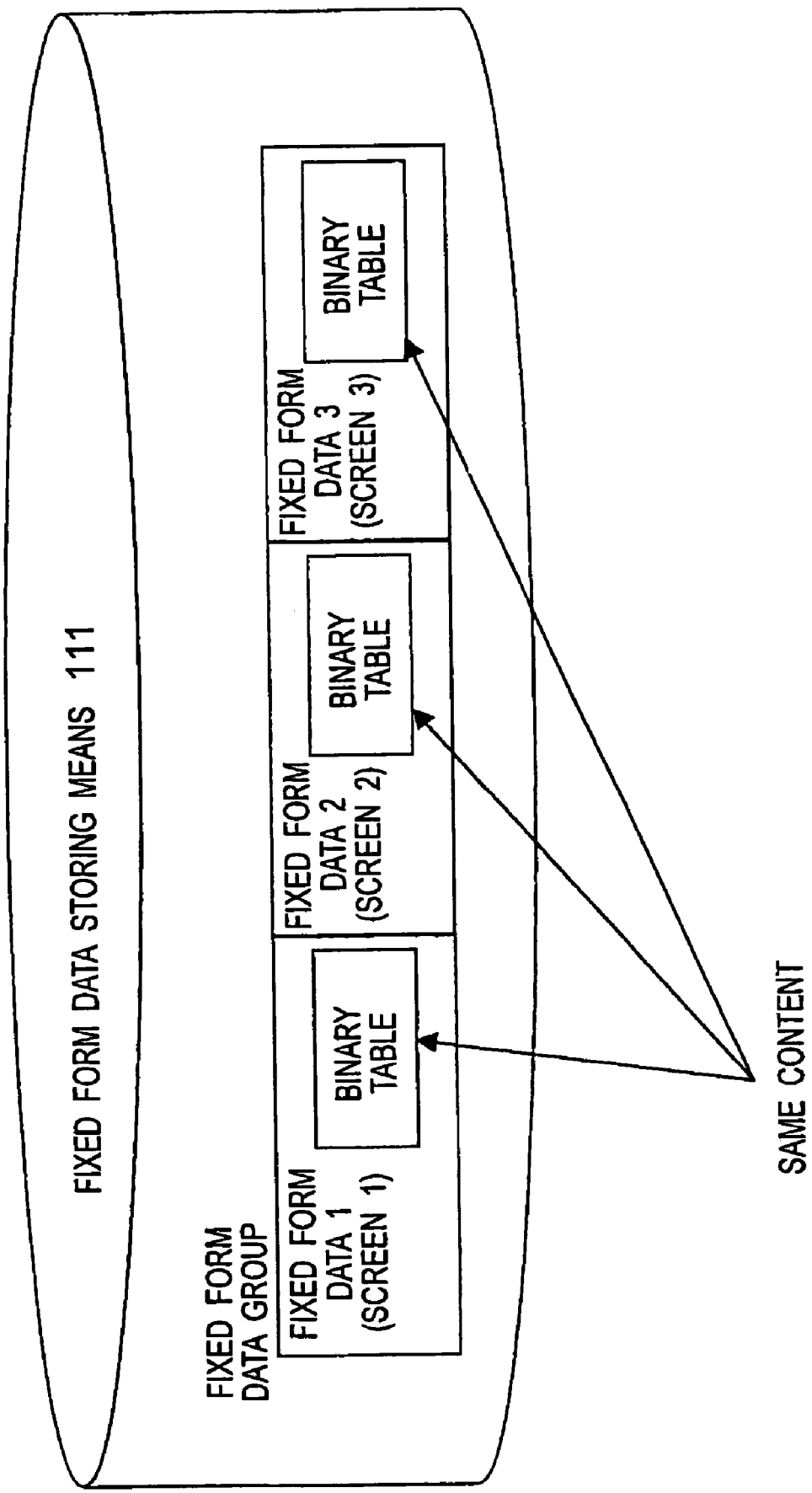
FIG. 63 is a conceptional view showing an example 1 of a fixed form data storing construction.

FIG. 63 shows an example 1 of storing the fixed form data stored in the fixed form data storing means 111.

When the above-mentioned playback shown in FIG. 62 is performed by using the embodiments explained in the embodiments 9 to 18 of the present invention, the fixed form data group shown in FIG. 63 is required as the fixed form data. As shown in this figure, it is required that the fixed form data 1 corresponding to the first screen includes the binary table that is used as the common data, and likewise, that the fixed form data 2 and fixed form data 3 also include the binary table. If the data inserted at the following data inserting means 301 forms the section corresponding to the area of the binary table, there arises a need to rewrite the section corresponding to the binary table every time the start-up operation is executed, thereby entailing a problem that it takes much time to execute the state transition of the screen. Further, there is a method of rewriting the data in the fixed form data storing means 111 in advance, but in this case, the number of the section to be rewritten increases by the number of the screen, thereby entailing a problem that it takes time to rewrite the section.

Figure 58:
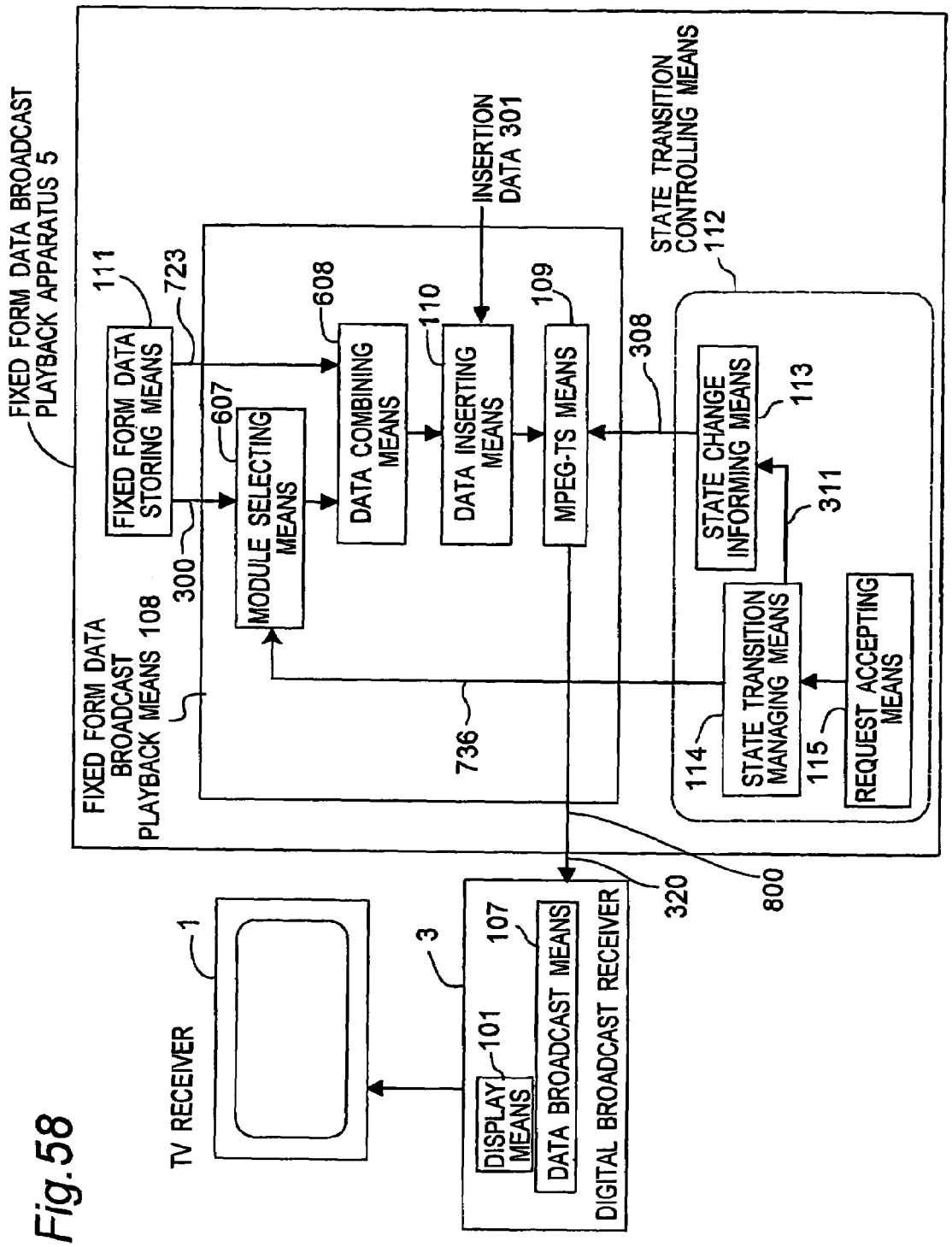
FIG. 58 is a block diagram showing a construction of a fixed form data broadcast playback apparatus in an embodiment 19 of the present invention.
Figure 59:
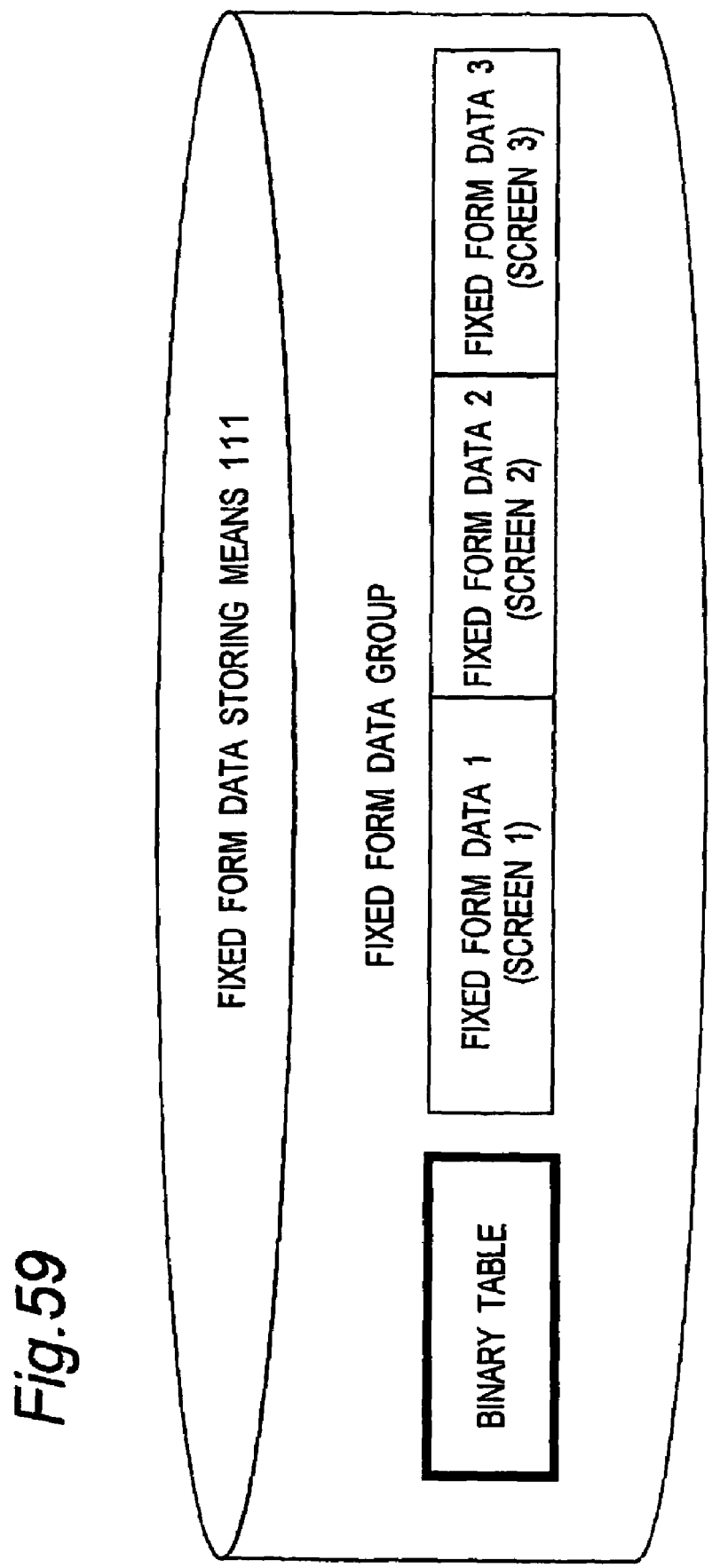
FIG. 59 is a conceptional view showing an example 2 of a fixed form data storing construction.
Figure 60:
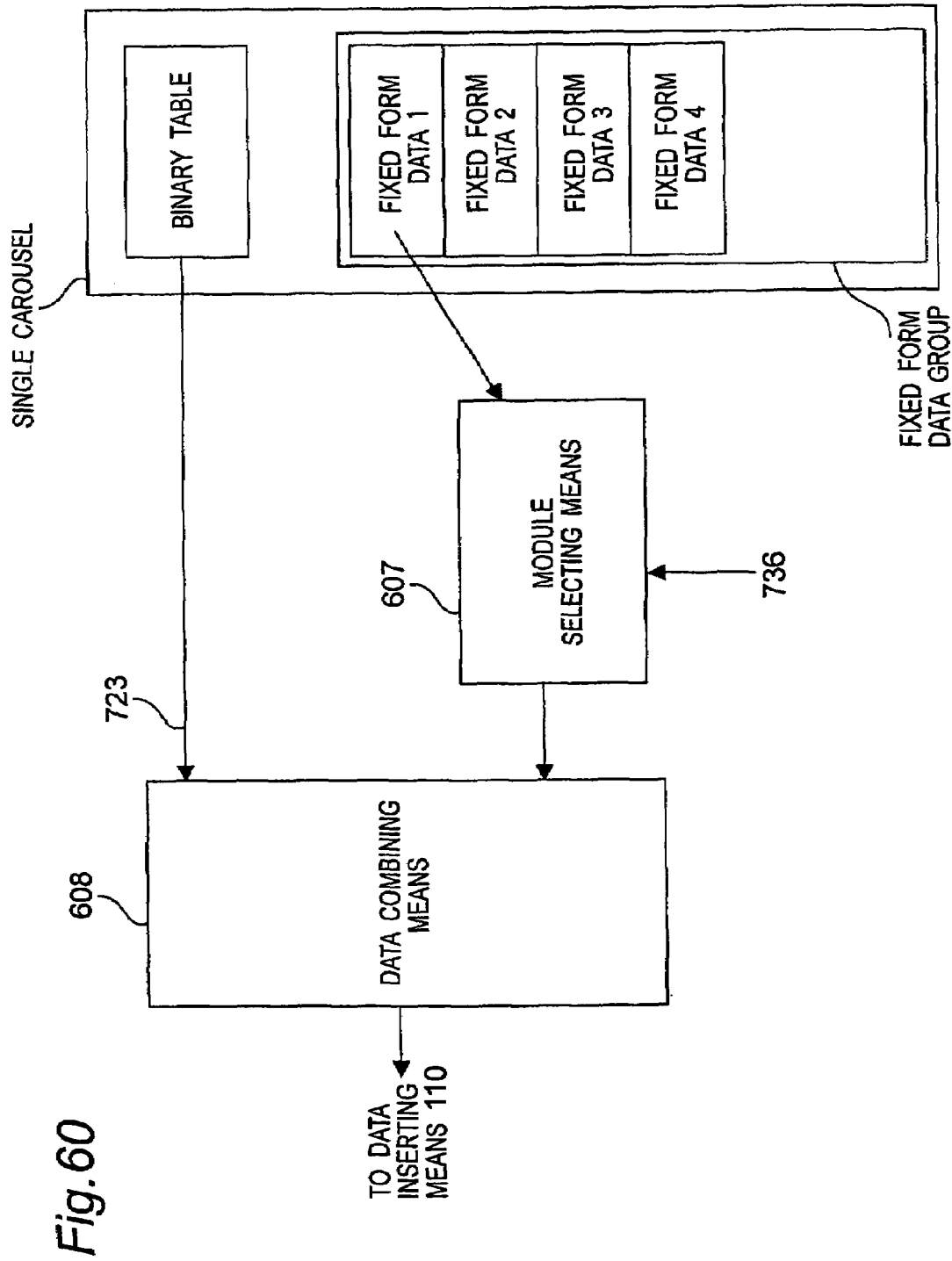
FIG. 60 is a conceptional view for explaining the operation of data combining means 608.

FIG. 58 is a view showing a construction of the embodiment 19 for solving the above-mentioned problems. FIG. 59 is an example 2 of storing the fixed form data used in the embodiment 19. FIG. 60 is a supplementary explanatory view concerning the points of the embodiment 19 different from the other embodiments.

The operation of the embodiment 19 will be explained by using FIGS. 58, 59 and 60.

In the embodiment 19, the fixed form data group having the structure shown in FIG. 59 is stored in the fixed form data storing means 111. The fixed form data group comprises an independent binary table and each of fixed form data 1, fixed form data 2, fixed form data 3 or the like corresponding to the respective screen construction.

FIG. 60 relates to the embodiment 19 in FIG. 58, wherein the basic construction for solving the subjects is only extracted and separately disclosed. As shown in the right side of FIG. 60, the fixed form data 1, 2, 3, or the like is called the fixed form data group. The point that FIGS. 59 and 60 are different from FIG. 62 is that the binary table is not present in the individual fixed form data but single binary table is only independently present.

The operation of the embodiment 19 will be explained by using FIGS. 58 and 60.

In FIG. 58, numeral 1 denotes a TV receiver, 3 denotes a digital broadcast receiver, 108 denotes fixed form data playback means, 111 denotes fixed form data storing means, 112 denotes state transition controlling means, 607 denotes module selecting means and 608 denotes data combining means.

In this figure, the constructions other than the state transition controlling means 114, module selecting means 607 and data combining means 608 are approximately same as those explained in the embodiment 10, so that the explanation thereof is omitted. The fixed form data storing structure shown in FIG. 59 is disclosed at the right side in FIG. 60. The fixed form data shown in his figure is supposed to be described by the BML document corresponding to ne screen construction. Further, the fixed form data 1, fixed form data 2, fixed form data 3 . . . is supposed to correspond to the aforesaid DDB0, DDB1, DDB2 . . . in FIG. 27. Further, the binary table is likewise supposed to correspond to a predetermined DDB. The description concerning the DII explained in the embodiment 18 is omitted for simplification.

The fixed form data group having the structure shown in FIGS. 59 and 60 is stored in the fixed form data storing means 111 shown in FIG. 58.

In this figure, the request accepting means 115 receives the first starting request and delivers its instruction to the state transition managing means 114. Then, the state transition managing means 114 makes a determination for selecting the module including the BML document corresponding to the screen that is firstly displayed, and transmits the module selecting signal 736 to the module selecting means 607. The module selecting means 607 receiving this signal obtains the fixed form data 1 corresponding to the corresponding module from the fixed form data storing means. The data combining means 608 obtains the binary table from the fixed form data storing means 111, while obtains the corresponding fixed form data 1 from the module selecting means, and combines these. The combined fixed form data is reproduced to the digital broadcast receiver 3 via the data inserting means 110 and MPEG-TS means 109.

Subsequently, when the screen change-over request is received by the request accepting means 115, the state transition managing means 114 detects this, and instructs to the module selecting means 607 the acquisition of the module that should be displayed next. When receiving this instruction, the module selecting means 607 obtains the fixed form data 2 that is the corresponding module from the fixed form data storing means 111. The data combining means 608 performs hereafter the operation same as that described above, whereby the fixed form data playback stream 800 including a new screen construction is reproduced.

As described above, the use of the construction of the embodiment 19 enables to allocate the data common among the BML documents to single binary data, whereby it is enough to once rewrite the section. As a result, the playback start of the fixed form data playback stream can be speeded up.

Although this embodiment 19 omits the description relating to the detail structure of the carousel data, either one of the structures shown in FIG. 55 and FIG. 56 disclosed in the embodiments 18 may be applied.

Embodiment 20

Subsequently, the embodiment 20 explains a construction for speeding up the start of displaying the screen displayed by the fixed form data playback stream 800.

Firstly disclosed is an outline of the screen display in the conventional data broadcast and its subject.

In a case where the digital data broadcast is displayed on the screen via the data broadcast means 107, the data broadcast means 107 firstly obtains the DII and DDB from the data broadcasted with the carousel structure, thereby displaying the BML document described in the DDB0 at the beginning. At this time, a general TV receiver 1 clearly indicates that it is now operating by displaying that it is now on data acquisition. It is to be noted that the display showing that it is now on data acquisition is a processing at the digital broadcast receiver 3, not started from the BML document. Further, in a case where the background image is composed of JPEG image (Joint Photographic Coding Experts Group), it takes time to obtain the DDB including the JPEG image, and consequently, it takes time to display the JPEG image, so that it is well-known that the time up to the completion of the final display is extremely long. On the other hand, a general digital broadcast receiver 3 has a function of displaying the MPEG image that is the main stream of the digital broadcast at relatively high speed. By utilizing this, the MPEG image is sometimes used as the background screen of the digital data broadcast. If the MPEG image is used as the background screen, the display of the background screen is completed at the time approximately same as the time for completing the main stream of the digital broadcast, resulting in decreasing the time for the display of the BML document on which the main body of the digital broadcast is disclosed, which means that the time from the display start to the display completion is speeded up.

However, in the case of a device that records the digital data broadcast and reproduces the same, the playback of the MPEG image is continued with the time passage, so that the playback thereof is stopped at the termination of the recording. Specifically, such recording and/or playback apparatus has a problem that the background screen cannot be continuously displayed.

The embodiment 20 shows a construction for solving this problem and capable of speeding up the display of the background screen as well as capable of performing the continuous display.

Figure 64:
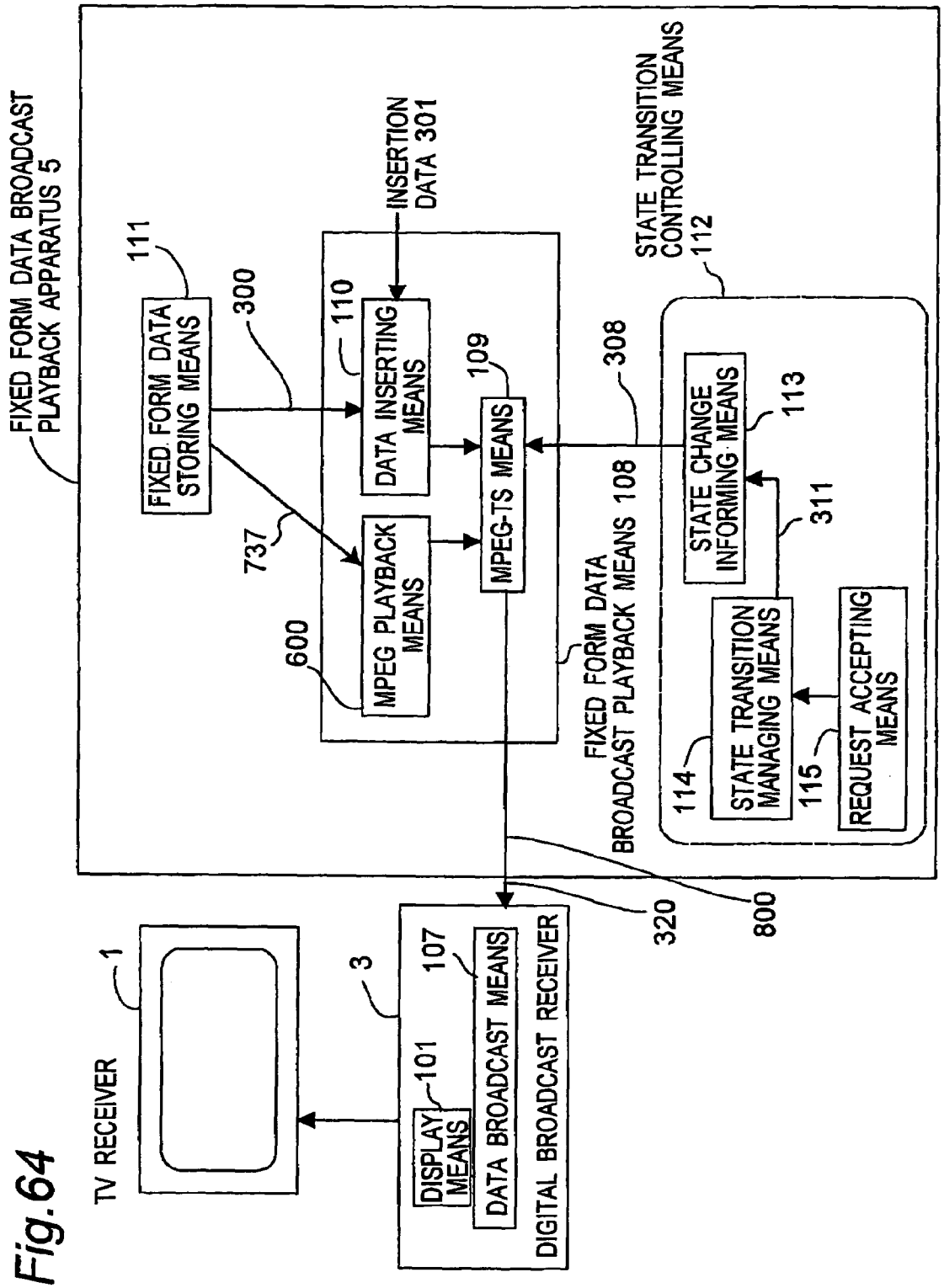
FIG. 64 is a block diagram showing a construction of a fixed form data broadcast playback apparatus in an embodiment 20 of the present invention.
Figure 65:
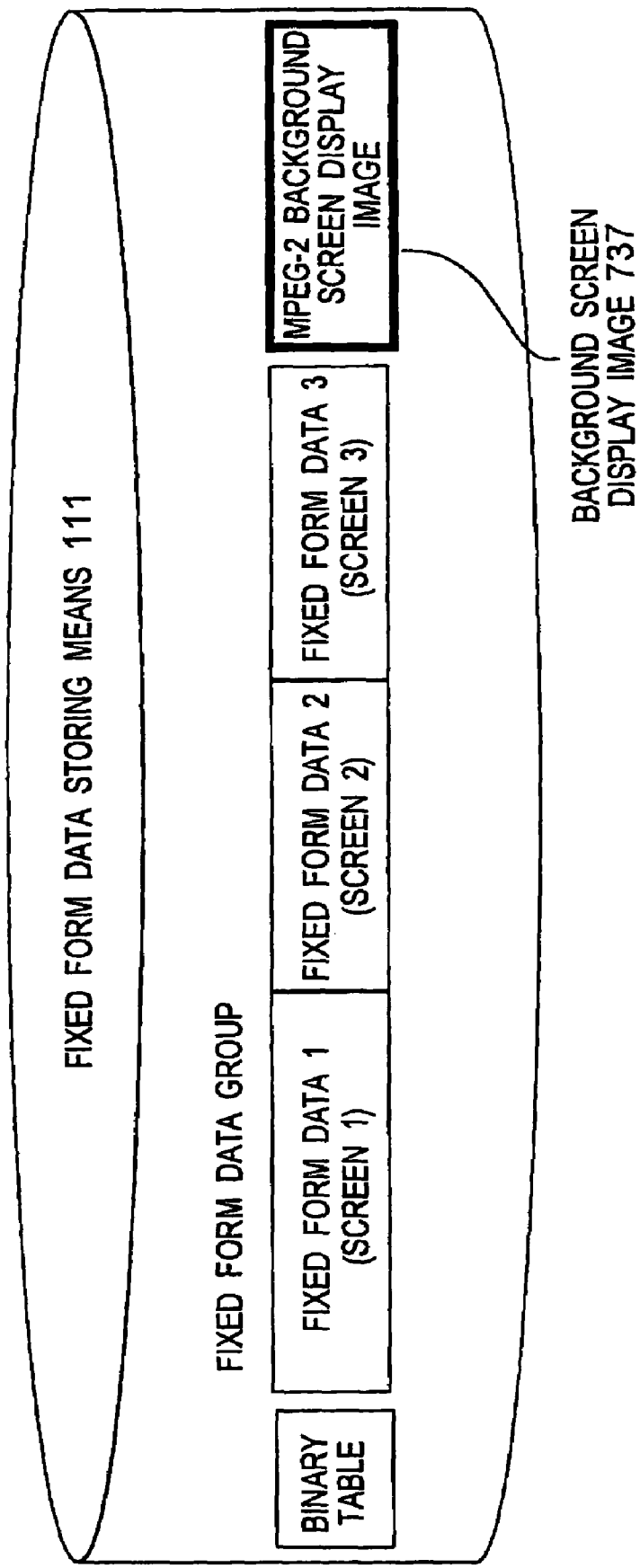
FIG. 65 is a conceptional view showing an example 3 of a fixed form data storing construction.

FIG. 64 shows a construction of the embodiment 20. The components are approximately same as those explained in the embodiment 13 shown in FIG. 42. The components irrelevant to the construction for solving the problem that is aimed by the present embodiment are omitted from the disclosure in FIG. 43. The point that FIG. 64 is different from FIG. 42 is that the MPEG playback means 600 obtains image data from the fixed form data storing means 111. FIG. 65 is an example 3 of the structure of storing the fixed form data used in the embodiment 20.

The operation of the embodiment 20 will be explained hereinbelow with reference to FIGS. 64 and 65.

As shown in FIG. 65, the fixed form data storing means 111 newly has, in addition to the construction explained by using FIG. 5 of the embodiment 19, a background screen display image 737 of MPEG-2. This image may be an image of plural frames composed of I-picture, B-picture and P-picture maintaining the GOP (Group of Pictures) structure of MPEG-2 or may be only I-picture.

The MPEG playback means 600 in FIG. 64 obtains the background screen display image 737 from the fixed form data storing means 111. Further, the MPEG playback means 600 repeatedly reproduces the obtained image and transmits it to the following MPEG-TS means 109. The MPEG-TS means 109 multiplexes the repeatedly reproduced image, handled like the main stream image of the digital broadcast, with the fixed form data, thereby producing the fixed form data playback stream 800. When obtaining the fixed form data playback stream 800, the digital broadcast receiver 3 extracts from the stream the background screen display image 737 corresponding to the main stream image of the digital broadcast, and displays the resultant on the TV receiver 1 as a moving image. On the other hand, the digital broadcast means 107 obtains the carousel data included in the fixed form data playback stream 800, produces the data broadcast screen described by the BML document and displays the resultant on the TV receiver 1.

Figure 66:
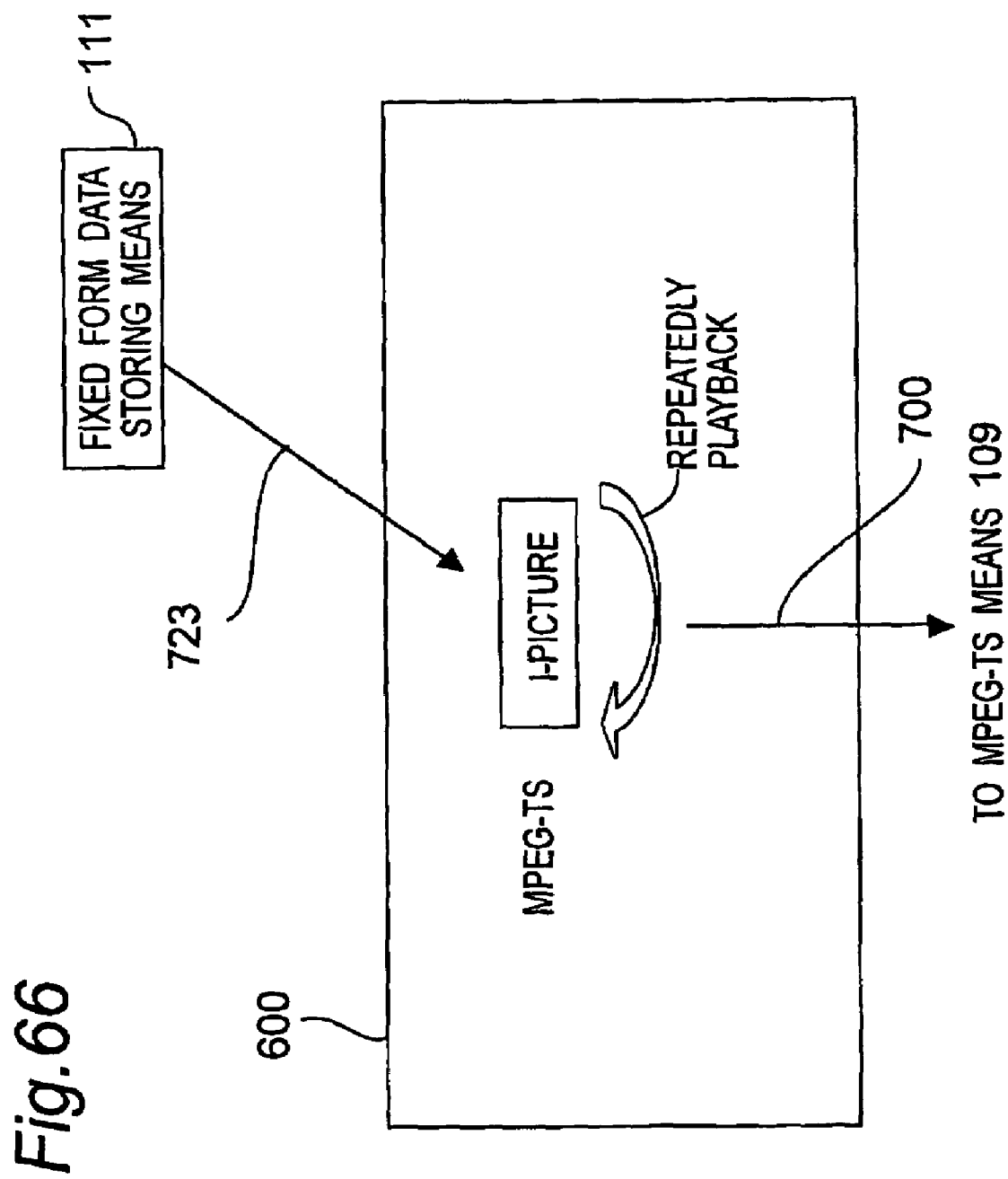
FIG. 66 is a conceptional view showing an embodiment of MPEG playback means.

Subsequently, the operation of the MPEG playback means 600 will be explained by using FIG. 66. This figure shows an example of using the I-picture as the background screen display image 737. The MPEG playback means 600 obtains the I-picture from the fixed form data storing means 111 and repeatedly reproduces the same picture. The image repeatedly reproduced is transmitted to the MPEG-TS means 109.

As described above, incorporation of the function of repeatedly playback the background image as shown in the construction of the embodiment 20 enables to continuously display the background image at high speed.

As described above, the use of the construction of the embodiment 20 can solve the ninth subject that "it takes time to start and display the data broadcast" disclosed in the above-mentioned "subject that the invention is to solve".

Embodiment 21

Subsequently, the embodiment 21 explains a construction for operating a different function other than the fixed form data broadcast function that is a basic function in cooperation with the screen displayed on the TV receiver 1 (corresponding to claim 31).

The operation of the data broadcast application is described in the BML document to be managed in the general digital data broadcast. On the other hand, the screen state displayed by the BML document is all managed by the state transition managing means 114 arranged in the fixed form data broadcast playback apparatus 5 in the construction explained in the embodiments 9 to 20 of the present invention. This embodiment 21 shows a technique of constructing a control screen that operates external functions by newly adding to this state transition managing means 114 a function of controlling these external functions.

Figure 67:
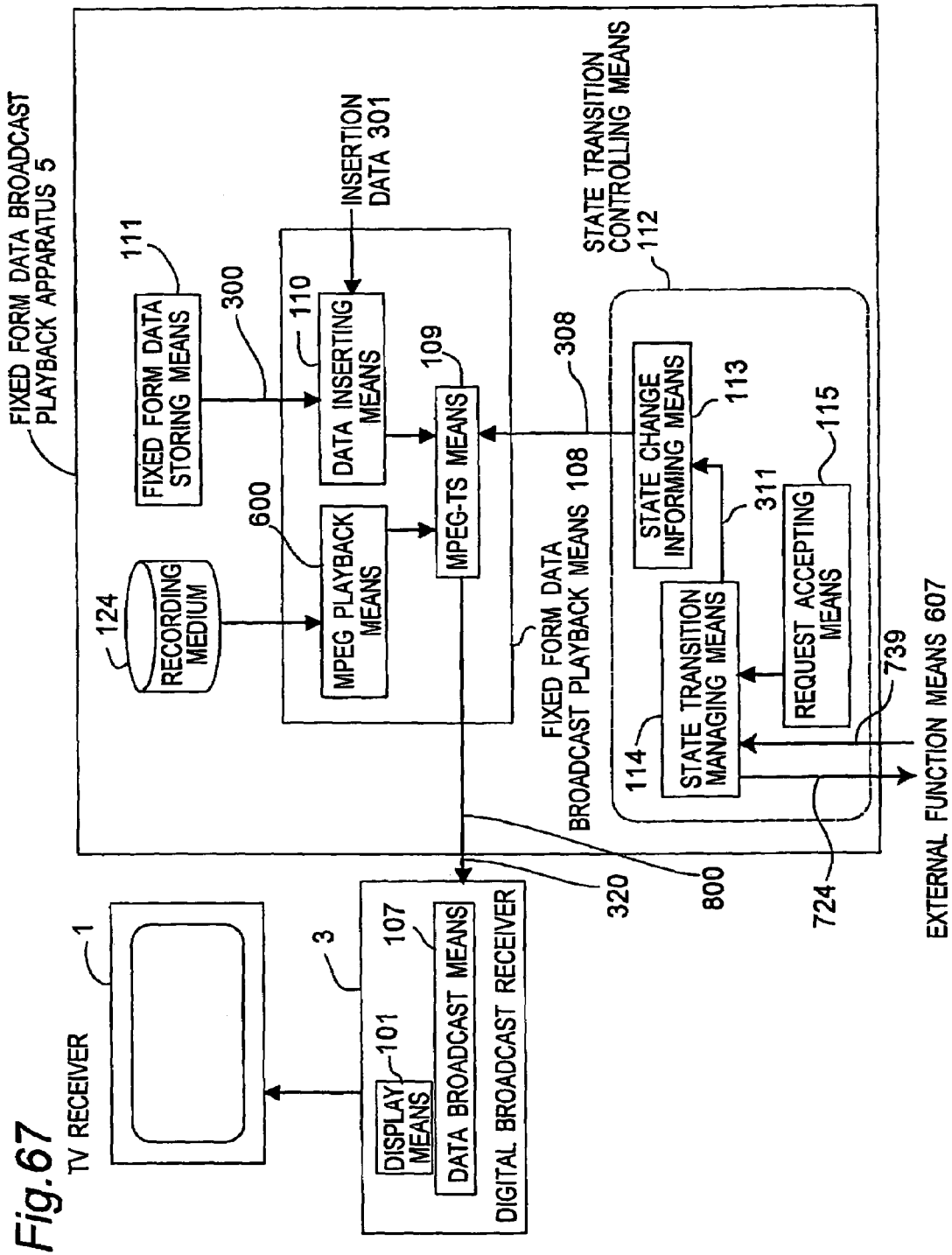
FIG. 67 is a block diagram showing a construction of a fixed form data broadcast playback apparatus in an embodiment 21 of the present invention.

FIG. 67 shows a construction of the embodiment 21. The components are approximately same as those explained in the embodiment 13 shown in FIG. 42. The explanation about the constructions having the same operations are omitted here.

Figure 68:
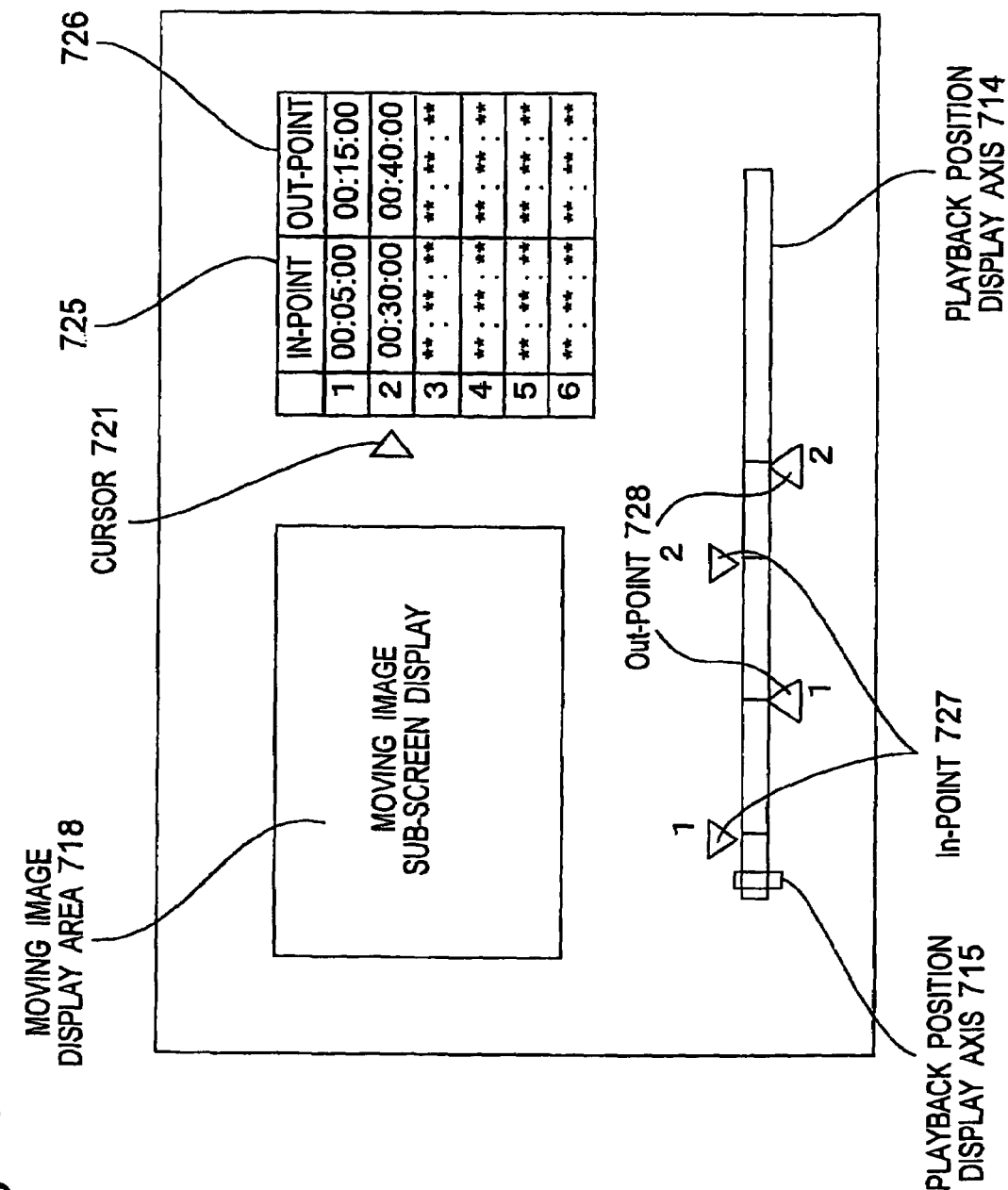
FIG. 68 is a view showing a screen example 1 of an operation of an application.
Figure 69:
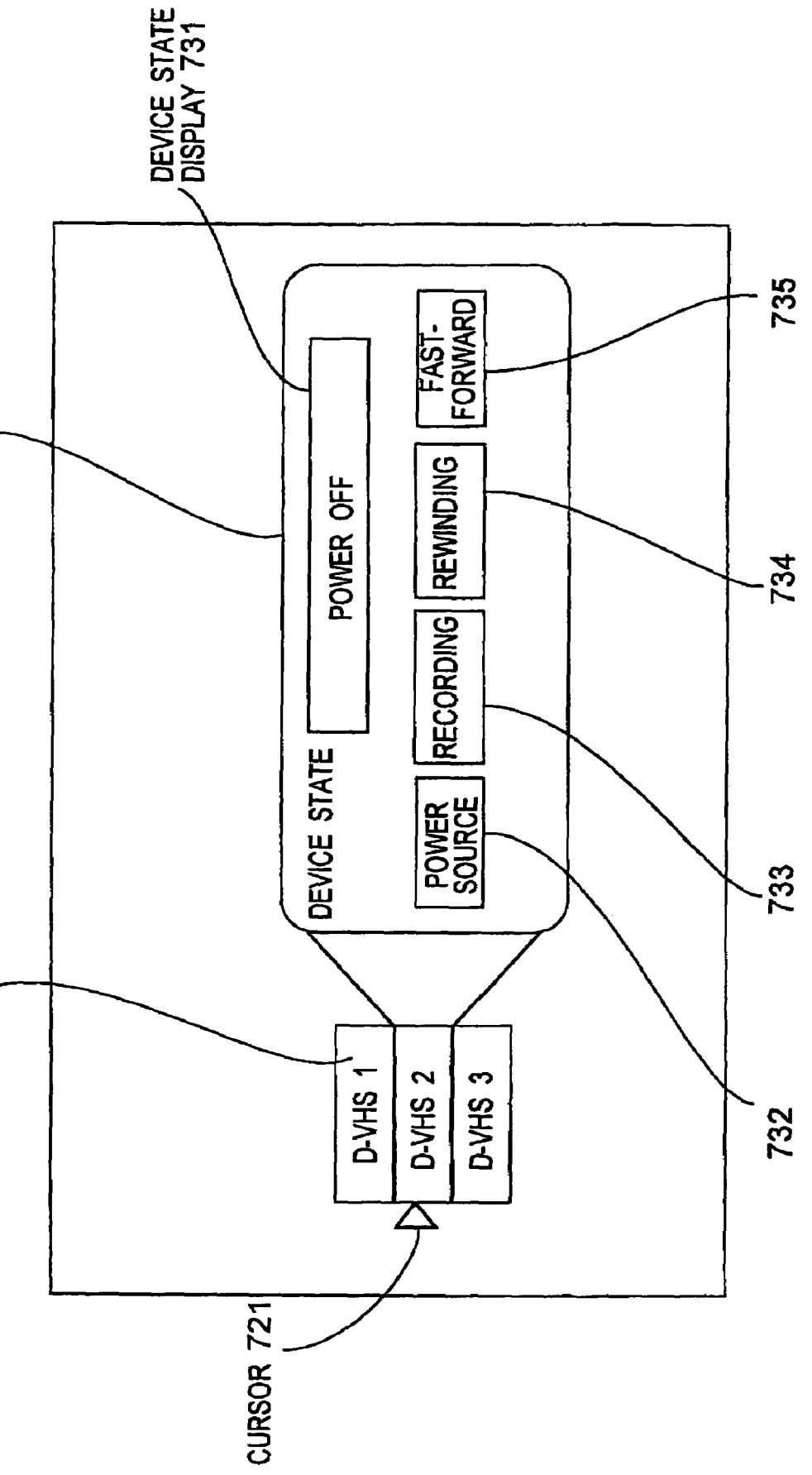
FIG. 69 is a view showing a screen example 2 of an operation of an application.

The different point between FIG. 67 and FIG. 42 is that the state transition managing means 114 newly has the function of controlling the external functions. FIG. 68 is a screen example 1 showing an operation of an application in a case where a function for designating In-point and Out-point is prepared as the external function, while FIG. 69 is a screen example 2 showing an operation of an application in a case where a function for controlling external devices such as D-VHS or the like is prepared as the external function.

The example of the application operation will be explained by using FIG. 68.

In FIG. 68, numeral 718 denotes a moving image display area, 725 denotes a display section of hour, minute, second at In-point, 726 denotes a display section of hour, minute, second at Out-point, 721 denotes a cursor, 714 denotes a playback position display axis, 715 denotes a playback position display, 727 denotes an In-point position display and 728 denotes an Out-point position display.

The display operation of FIG. 68 will be explained hereinbelow by using the construction shown in FIG. 67.

The fixed form data playback apparatus 5 shown in FIG. 67 reproduces the fixed form data having the display screen shown in FIG. 68 as the fixed form data playback stream 800. The image in the moving image display area 718 in FIG. 68 is displayed on the moving image display area 718 by the procedure same as that of the operation explained in the above-mentioned embodiment 9. At this time, the image to be displayed is supposed to be a single recorded program. Since the aspect ratio and pixel number of the image become constant values in a general single program, the embodiment 11 shown in FIG. 36 may further be applied to this embodiment. The cursor 721 is firstly set to a predetermined number in order to designate the In-point and Out-point in the single program. The In-point and Out-point corresponding to the line designated by the cursor 721 are set by referring to the screen. The playback position display axis 714 corresponds from the start point to the end point of the program displayed on the moving image display area 718. The playback position display 715 represents on the playback position display axis 714 the playback position of the moving image displayed on the moving image display area 718. When the image on the moving image display area 718 reaches the screen where In-point is intended to be set, the In-point is instructed by utilizing a remote controller device or a button prepared on the device (not shown). This instruction is detected by the request accepting means 115 and informed of the state transition managing means 114. The state transition managing means 114 receiving this instruction informs the external function realizing means 607 by the external function control instruction 724 that there is a designation of the In-point. The state transition managing means 114 obtains information about the hour, minute and second at the In-point from the external function operating state 739 and transmits this to the data broadcast means 107 via the state change informing means 113 and MPEG-TS means 109. When the fixed form data now operating obtains the information about the hour, minute and second at the In-point from the data broadcast means 107, it displays the obtained information in the corresponding section on the screen. On the other hand, the designation of the Out-point is performed by the same manner as the designation of the In-point. The In-point and Out-point designated as described above are given to the external function realizing means 607 and utilized. The example of the method for utilizing these points includes the case where the playback is started from the In-point set at the beginning of the program and completed at the Out-point upon playback the corresponding program. Such playback enables a function of selecting and playback only a necessary section in the program (not shown). The selecting and playback function is different from the function of the fixed form data broadcast playback apparatus 5 shown in FIG. 67, so that it is disclosed here as the external function realizing means 607. This external function realizing means 607 may be provided in the same device, or may be provided at the physical external side as a different device.

Subsequently explained by using FIG. 69 is an example of operating an application that controls the external devices with reference of the construction shown in FIG. 67.

FIG. 69 is an example in which, in a case where the external device such as D-VHS or the like is further connected via the digital interface 320, the display screen for operating such external device is displayed with the fixed form data playback stream 800.

In FIG. 69, numeral 729 denotes a list of externally connecting devices that is connected via the digital interface 320 such as IEEE1394, 721 denotes the cursor, 730 denotes a device controlling panel corresponding to the device indicated by the cursor, 731 denotes a device state display, 732 denotes a power source button display, 733 denotes a recording button display, 734 denotes a rewinding button display and 735 denotes a fast-forward button display.

In the case of the application shown in FIG. 69, means for controlling the external device is supposed to be provided to the external function realizing means 607 via the digital interface 320. The external function realizing means 607 firstly obtains the type and state of the device connected to the digital interface 320 (not shown). Further, the fixed form data broadcast playback apparatus 5 shown in FIG. 67 reproduces the fixed form data having the display screen shown in FIG. 69 as the fixed form data playback stream 800. At first, the cursor 721 is set to the predetermined external device for selecting the external connecting device that is to be operated. The device is controlled by referring to the device control panel 730 corresponding to the external device selected by the cursor 721. Here, assuming case is that the D-VHS is connected as the external device. When the corresponding D-VHS is turned off, the external function realizing means 607 informs the state transition managing means 114 of this by the external device operation state 739. The state transition managing means 114 receiving the notice informs the data broadcast means 107 that the power is turned off by way of the screen operation control code 311. The fixed form data broadcast operated at the data broadcast means 107 detects this and displays "Power OFF" on the device state display 731. In a case where the device state display 731 shows that the power is OFF, the user (operator) starts this device by pushing down the operation button or the like corresponding to the power source button display 732. The movement of the operation button is detected by the request accepting means 115, managed by the state transition managing means 114 and reported to the external function realizing means 607. Further, the movement of this operation button is simultaneously reported to the fixed form data broadcast and reflected to the color changing of the power source button display. The external function realizing means 607 issues a command via the digital interface 320 to thereby turn on the power source of the connected D-VHS (not shown). Moreover, it can rewind or fast-forward the D-VHS tape by referring to the device state display 737 by the same procedure.

As described above, realizing the operation of the application shown in FIG. 69 can realize a function for storing the recorded program in the external device in the digital broadcast recording apparatus provided with the fixed form data broadcast playback apparatus 5. Additionally, this function, when used together with the screen example 1 showing the operation of the application explained in FIG. 68, can extend to a function for selecting only the required section in the image and storing the resultant in the external device such as D-VHS or the like.

As described above, the state transition managing means 114 is provided with the means for issuing the external function control instruction 724 to the external function realizing means 607 and detecting the operation state of the external function and means for sending an instruction to the fixed form data broadcast that currently performs the screen display, whereby not only a simple state display but also a complicated new application can be realized.

As described above, the use of the construction of the embodiment 21 can solve the subject that "the conventional data broadcast cannot start an external program other than the program described in the data broadcast with an optional combination" disclosed in the above-mentioned "subject that the invention is to solve".

The present invention was explained by using the embodiments 1 to 21 as described above. The fixed form data broadcast playback apparatus and the fixed form data broadcast recording and/or playback apparatus explained in each embodiment may be widely applied to a general device such as a sound device, home appliance such as washing machine or the like, door phone or the like, other than the image recording device used in the embodiments.

Moreover, although the remarkably effective point realized by the present invention is that the conventional digital broadcast receiver can be utilized, a new function and new service can be realized by using the conventional digital broadcast receiver together with a newly developed digital broadcast receiver.

Although the terms used in BS digital executed in Japan is basically used as the terms for digital broadcasting, it does not mean that the effect of the invention is limited in Japan. In a case where the same condition as the present invention is technically established, the present invention may be applied to digital broadcasting that is considered or executed in foreign countries.

Although the construction explained in the embodiments 1 to 21 of the present invention is effective when independently used, various functions can be realized by combiningly using each embodiment as disclosed in some examples.

Effect of the Invention

As apparent from the above-mentioned description, the present invention can provide a fixed form data broadcast playback apparatus or fixed form data broadcast recording and/or playback apparatus that can perform a screen display or can be operated by using the apparatus of the invention, even if a digital broadcast receiver is not provided with a new control software, i.e., it can only control an old-fashioned external device.

Further, the present invention can provide a fixed form data broadcast playback apparatus or fixed form data broadcast recording and/or playback apparatus that is simply operated with a remote controller same as the one used for the digital broadcast receiver.

Moreover, the present invention can provide a fixed form data broadcast recording and/or playback apparatus that has a function of obtaining a program title and selectively displaying the obtained one even from the digital broadcast receiver that does not have means for informing a recording and/or playback apparatus of the program title.

Additionally, the present invention can newly provide a storage broadcasting service having the content equal to the existing storage datacasting service even if a receiver is the one not applied to the storage broadcasting.

Further, the present invention provides an effect of simplifying the operation since the operation screen and operation environment of the remote controller is unified.

Further, the apparatus of the present invention can multiplexingly display a recorded image and its operation state with a new representation even if a digital broadcast receiver does not have a new control software, i.e., it can only control an old-fashioned external device.

Moreover, the present invention can assuredly perform a transmission of a general-purpose event message transmitted for renewing the state of the screen, whereby a stable state transition of the screen can be realized in the digital broadcast receiver 3.

Additionally, according to the present invention, plural BML documents can be described, thereby being capable of speeding up the start-up of the BML document.

Further, according to the present invention, an MPEG image can be repeatedly reproduced as a background image, whereby the start of the display is remarkably speeded up and the continuous display can be performed.

Moreover, an external program other than the function as the fixed form data broadcast playback apparatus of the present invention can be optionally combined to be operated. Specifically, the function of the digital content recording and/or playback device can be extended by utilizing a screen realized by the fixed form data broadcast.

As described above, the present invention is fully explained by the preferred embodiments, but the invention is not limited to these, and it is obvious for the one skilled in the art that any modifications and revisions are possible within the technical scope of the present invention disclosed in the following claims.

What is claimed is:

1. A fixed form data broadcast transmitting apparatus, comprising:
   a fixed form data storage that stores fixed form data for displaying a screen of a data broadcast;
   a fixed form data broadcast transmitter which receives the fixed form data from the fixed form data storage, comprising:
   a data inserter that inserts predetermined data in a rewriting object data portion of the fixed form data, the predetermined data showing an internal state of the fixed form data broadcast transmitting apparatus, the fixed form data comprising prescribed form data of the data broadcast that is arranged in a structure wherein each rewriting object data portion has a fixed length area corresponding to the rewriting object data portion; and
   an MPEG transport streamer that makes the fixed form data having the predetermined data inserted thereto into an MPEG transport stream in such a manner as a carousel system and transmits the resultant to a digital broadcast receiver as playback data of the fixed form data broadcast via a digital interface connected to the digital broadcast receiver; and
   a state transition controller, separate from the fixed form data broadcasting transmitter, that controls display content of the transmitted fixed form broadcast data by transmitting a control code to the digital broadcast receiver via the digital interface.

2. A fixed form data broadcast transmitting apparatus according to claim 1, wherein the fixed form data storage comprises a rewritable medium.

3. A fixed form data broadcast transmitting apparatus according to claim 1, wherein the inserted predetermined comprises at least one selected from photographic data, character data, image data, and music data.

4. A fixed form data broadcast transmitting apparatus according to claim 1, wherein the inserted predetermined data is recorded to one of a memory card and an optical disc, which is connected to the fixed form data broadcast transmitting apparatus.

5. A fixed form data broadcast transmitting apparatus according to claim 1, wherein the state transition controller comprises:
   a request acceptor that accepts a request for a transition;
   a state control manager that manages an operation state of a fixed form data broadcast; and
   a state change informer that informs a change in an operation state.

6. A fixed form data broadcast transmitting apparatus according to claim 5, wherein the request acceptor comprises:
   a remote control signal receiver that receives a remote control signal for the digital broadcast receiver; and
   an analyzer that analyzes the remote control signal.

7. A fixed form data broadcast transmitting apparatus according to claim 1, wherein a state change informer utilizes an event message transmission system of the data broadcast.

8. A fixed form data broadcast transmitting apparatus according to claim 1, wherein the fixed form data broadcast transmitter selectively makes the predetermined data among the fixed form data into the MPEG transport stream based upon the instruction from the state transition controller.

9. The fixed form data broadcast transmitting apparatus according to claim 1, wherein the digital interface comprises an IEEE 1394 interface.

10. A fixed form data broadcast transmitting apparatus, comprising:
    a fixed form data storage that stores fixed form data for displaying a screen of data broadcast;
    a fixed form data broadcast transmitter which receives the fixed form data from the fixed form data storage, comprising:
    a data inserter that inserts predetermined data in a rewriting object data portion of the fixed form data, the predetermined data showing an internal state of the fixed form data broadcast transmitting apparatus, the fixed form data comprising prescribed form data of the data broadcast that is arranged in a structure wherein each rewriting object data portion has a fixed length area corresponding to the rewriting object data portion; and
    an MPEG transport streamer that makes the fixed form data having the predetermined data inserted thereto into an MPEG transport stream in such a manner as a carousel system and transmits the resultant to a digital broadcast receiver as playback data of the fixed form data broadcast via a digital interface connected to the digital broadcast receiver;
    a recording medium that records a program transmitted in the form of the MPEG transport stream;
    a program information obtainer that extracts program information from an MPEG transport stream signal; and
    a state transition controller, separate from the fixed form data broadcasting transmitter, that controls display content of the transmitted fixed form broadcast data by transmitting a control code to the digital broadcast receiver via the digital interface,
    wherein the program information is used as an insertion data.

11. A fixed form data broadcast transmitting apparatus according to claim 10, wherein the fixed form data or the predetermined data inserted to the fixed form data corresponds to download data extracted from the MPEG transport stream.

12. A fixed form data broadcast transmitting apparatus, comprising:
    a fixed form data storage that stores fixed form data for displaying a screen of data broadcast;
    a recording medium on which an MPEG image is recorded;
    a fixed form data broadcast transmitter which receives the fixed form data from the fixed form data storage, comprising:

a data inserter that inserts predetermined data in a rewriting object data portion of the fixed form data, the predetermined data showing an internal state of the fixed form data broadcast transmitting apparatus, the fixed form data comprises prescribed form data of the data broadcast that is arranged in a structure wherein each rewriting object data portion has a fixed length area corresponding to the rewriting object data portion;

an MPEG extractor that takes out the MPEG image from the recording medium; and an MPEG transport streamer that makes the fixed form data having the predetermined data inserted thereto into an MPEG transport stream in such a manner as a carousel system, makes the obtained MPEG image into an MPEG transport stream, and transmits the resultant to a digital broadcast receiver as playback data via a digital interface connected to the digital broadcast receiver, wherein the playback data comprising playback data of the fixed form data broadcast and the MPEG image are simultaneously displayed; and a state transition controller, separate from the fixed form data broadcasting transmitter, that controls display content of the transmitted fixed form broadcast data by transmitting a control code to the digital broadcast receiver via the digital interface.

13. A fixed form data broadcast transmitting apparatus according to claim 12, wherein the MPEG extractor extracts an I-picture from the MPEG image taken out from the recording medium.

14. A fixed form data broadcast transmitting apparatus according to claim 12, wherein the MPEG transport streamer extracts, among all MPEG images which are extracted by the MPEG extractor, only a transport stream packet having a packet ID corresponding to the MPEG image and rewrites the packet ID to a specified value.

15. A fixed form data broadcast transmitting apparatus according to claim 12, further comprising:

a stream information extractor that extracts information about an aspect ratio and pixel number of the MPEG image recorded in the recording medium; and a fixed form selector that selects the fixed form data corresponding to the MPEG image.

16. A fixed form data broadcast transmitting apparatus according to claim 12, further comprising:

a fixed form information extractor that extracts information about an aspect ratio and pixel number of the fixed form data stored in the fixed form data storage; and an image selector that selects an image corresponding to the fixed form data.

17. A fixed form data broadcast transmitting apparatus according to claim 12, wherein the state transition controller comprises a request acceptor, which has a function of inhibiting an acceptance of a request with a cycle not more than the predetermined cycle.

18. A fixed form data broadcast transmitting apparatus according to claim 12, wherein the fixed form data storage stores fixed form data composed of a plurality of BML documents, and the state transition controller has a function of setting a period, when a transmission of a general-purpose event message is inhibited, wherein the period is longer than a period for moving among the BML documents.

19. A fixed form data broadcast transmitting apparatus according to claim 12, wherein the fixed form data broadcast transmitter has a function of selecting the fixed form data to be reproduced according to an instruction from the state transition controller.

20. A fixed form data broadcast transmitting apparatus according to claim 12, wherein the playback data of the form data broadcast comprises MPEG image data, reproduced from the recording medium and repeatedly sent as a background image.

21. A fixed form data broadcast transmitting apparatus according to claim 12, wherein the state transition controller has a function of controlling an other applicator.

22. The fixed form data broadcast transmitting apparatus according to claim 12, wherein the digital interface comprises an IEEE 1394 interface.

* * * * *